United States Patent [19]
Maves et al.

[11] Patent Number: 6,125,442
[45] Date of Patent: Sep. 26, 2000

[54] METHOD, SYSTEM AND DATA STRUCTURES FOR COMPUTER SOFTWARE APPLICATION DEVELOPMENT AND EXECUTION

[75] Inventors: Walter Maves, Toronto; Fred McGuirk, North York; James Bennett, Scarborough; Matthew Clarke, Burnaby, all of Canada

[73] Assignee: Maves International Software, Inc.

[21] Appl. No.: 08/990,181

[22] Filed: Dec. 12, 1997

[51] Int. Cl.[7] ................................... G06F 9/45
[52] U.S. Cl. ..................... 712/220; 712/223; 712/226; 712/227
[58] Field of Search ............... 345/302; 707/515; 712/223, 226, 227

[56] References Cited

U.S. PATENT DOCUMENTS

| | | | |
|---|---|---|---|
| 4,695,977 | 9/1987 | Hansen et al. | 379/93.14 |
| 5,237,684 | 8/1993 | Record et al. | 709/302 |
| 5,295,222 | 3/1994 | Wadhwa et al. | 395/703 |
| 5,379,432 | 1/1995 | Orton et al. | 709/303 |
| 5,386,559 | 1/1995 | Eisenberg et al. | 707/201 |
| 5,430,875 | 7/1995 | Ma | 709/302 |
| 5,519,867 | 5/1996 | Moeller et al. | 709/17 |
| 5,546,301 | 8/1996 | Agrawal et al. | 700/23 |
| 5,677,997 | 10/1997 | Talatik | 706/45 |
| 5,680,619 | 10/1997 | Gudmundson et al. | 707/515 |
| 5,854,929 | 12/1998 | Van Praet et al. | 717/5 |

FOREIGN PATENT DOCUMENTS

| | | |
|---|---|---|
| 0228053A2 | 7/1987 | European Pat. Off. . |
| 0453152A2 | 10/1991 | European Pat. Off. . |
| WO 96/31828 | 10/1996 | WIPO . |

OTHER PUBLICATIONS

Search Report for International Application No. PCT/IB 97/01659.

*Primary Examiner*—James P. Trammell
*Assistant Examiner*—Cuong H. Nguyen
*Attorney, Agent, or Firm*—White & Case LLP

[57] ABSTRACT

A method, system and data structures for software development and execution includes a Run Time Event Manager and a set of Models. A Model is a type of data structure that contains no code but an ordered set of references to other Models, to Methods, or other Objects. Models are made accessible to the Run Time Event Manager by registering them upon satisfaction of a set of conditions. In one embodiment of the invention, the Run Time Events Manager is a fetch-execute loop implemented in code that, upon each loop, operates upon one of a set of Models, checks external I/O conditions and, subject to such conditions, may process different or Variant Models, rather than standard or Paradigm Models associated with default conditions. Also, an Elastic Database may be implemented according to the invention that permits dynamically extensible database functionality.

11 Claims, 38 Drawing Sheets

| Model : Menu-Model Definition | | |
|---|---|---|
| {objectid}.name$ | Reference name to this object | 1012 |
| {objectid}.descriptn$ | Description of this object | 1013 |
| {objectid}.condition$ | Condition that must be met for the Run Time Events Manager to execute this object | 1014 |
| {objectid}.objecttype | Tells the Run Time Events Manager the type of object<br>1. Method<br>2. Tool Usage<br>3. Model | 1015 |
| {objectid}.module$ | Module for Tool Usage, Method or Model | 1016 |
| {objectid}.repository$ | Repository for Tool Usage or Method | 1017 |
| {objectid}.method$ | Method to execute | 1018 |
| {objectid}.toolusage$ | Tool usage to execute | 1019 |
| {objectid}.model$ | Model to execute | 1020 |
| {objectid}.performflg | Tells the Run Time Events Manager how to access this object<br>0-Object is called-passing in the Model data specified in modelvars<br>1-Object is Performed-passing in all Model data | 1021 |
| {objectid}.modelvars$ | List of Model variable to be passed into the Method, tool usage or Model | 1022 |
| {objectid}.obj_vars$ | List of object variables to be populated from the Model variable (specified in modelvars) | 1023 |

FIG. 4B

| | | |
|---|---|---|
| \{objectid\}.\{model_variable\}_\{type of variable\}.usage$ | Usage for this variable being passed in the Method, tool usage or Model<br>-model_variable - each data variable specified in \{objectid\}.modelvars$<br>-type of variable:<br>C for character variable<br>N for Numeric variable<br>-Usage<br>I for variables passed in only<br>B for variables passed in and back out<br>F for variables passed in as default value specified and back out | 1024 |
| \{objectid\}.\{model_variable\}_\{type of variable\} | Default value passed into the Method, tool usage or Model | 1025 |
| \{objectid\}.action$ | Attachment action for this object<br>1-Pre-Process Object<br>2-Parent Object<br>3-Post-Process Object | 1026 |
| \{objectid\}.parentname$ | Name of the parent object, if the object is a pre- or post-process | 1027 |
| \{objectid\}.parent_obj$ | Object ID of the parent object, if pre- or post-process | 1028 |
| \{objectid\}.designname$ | Type of Model Design object | 1029 |
| \{objectid\}.mandatory | If this object is an input, tells the input if the entry is mandatory or not<br>0- Not mandatory<br>1-Mandatory | 1030 |
| \{objectid\}.preprocs$ | List of pre-process objects for this parent object | 1031 |
| \{objectid\}.postprocs$ | List of post-process objects for this parent object | 1032 |

Model : Menu-Model Definition, cont'd — 1000C

FIG. 4C

Model : Menu_example
Model: menu
Modified by: developer (date)

| | | | |
|---|---|---|---|
| /-clr_select | Clear selectVal | (method) | —172 |
| /-menu_activ | Menu Activity | (method) | —173 |
| /-menudflt | Menu Defaults | (method) | —174 |
| /-menu_displ | Load and Display Menu | (method) | —175 |
| /-save_vals | Save old values | (method) | —176 |
| selectVal | Menu Selection | (input) | —177 |
| \-menuselect | Validate Menu Selection | (method) | —178 |
| \-menusecure | Verify menu security | (method) | —179 |
| \-exit_menu | Exit menu with request | (method) | —180 |
| exit | -exit | -Exit | —181 |
| \menuf4 | -method | -menu exit - set | —182 |
| EOL | EOL | -End of List | —183 |

| | | | |
|---|---|---|---|
| action | Action - menu selection | (data) | —184 |
| blank_5 | 5 spaces | (data) | —185 |
| cmdcompany | Company | (data) | —186 |
| company | Company Code | (data) | —187 |
| menu_desc | Menu Description | (data) | —188 |
| oldmenudsp | Previously displayed menu - company+submenu+page | (data) | —189 |
| pagedisply | Page Display | (data) | —190 |
| selectval | Menu Selection | (data) | —191 |
| short_name | Company Short Name | (data) | —192 |
| status | Status | (data) | —193 |
| submenu | SubMenu - system | (data) | —194 |
| terminal | Terminal Number | (data) | —195 |
| tilde | Displayed Tilde - set in aim_slmenu.menudflt | (data) | —196 |
| tilde2 | 2nd Displayed Tilde - set in in aim_slmenu.menueflt | (data) | —197 |
| time | Time | (data) | —198 |

| Model: menu | Model : Menu_example | |
|---|---|---|
| | Menu | |
| Variant: track_a1 | Log all menu selections in A1 company | ← 171A |
| Condition: COMPANY$="A1" | | |
| Modified by: developer (date) | | |

| /-clr_select | Clear selectVal | (method) |
|---|---|---|
| /-menu_activ | Menu Activity | (method) |
| /-menudflt | Menu Defaults | (method) |
| /-menu_displ | Load and Display Menu | (method) |
| /-save_vals | Save old values | (method) |
| selectVal | Menu Selection | (input) |
| \-menuselect | Validate Menu Selection | (method) |
| \-menusecure | Verify menu security | (method) |
| \-track_a1 | Write to log file | (toolusage) ← 179A |
| \-exit_menu | Exit menu with request | (decision) |
| exit | -exit | -Exit |
| \menuf4 | -method | -menu exit - set |
| EOL | EOL | -End of List |

| action | Action - menu selection | (data) |
|---|---|---|
| blank_5 | 5 spaces | (data) |
| cmdcompany | Company | (data) |
| company | Company Code | (data) |
| menu_desc | Menu Description | (data) |
| oldmenudsp | Previously displayed menu - company+submenu+page | (data) |
| pagedisply | Page Display | (data) |
| selectval | Menu Selection | (data) |
| short_name | Company Short Name | (data) |
| status | Status | (data) |
| submenu | SubMenu - system | (data) |
| terminal | Terminal Number | (data) |
| tilde | Displayed Tilde - set aim_slmenu.menudeflt | (data) |
| tilde2 | 2d displayed tilde - set in in aim_slmenu.menudflt | (data) |
| time | Time | (data) |

FIG. 5A

Variant Model Information

! -- This variant is loaded when COMPANY is 'A1'. It adds a toolusage to write the data OPERATOR, TIME and SELECTVAL to a log file after each menu selection.
This object gets executed before the DECISION called EXIT_MENU ! ---------------List of Objects to add to Paradigm Model---------------
AIM_LVRTEM.TRACK_A1.P_EXT_LIST$="M0200167TOR1___0000000000306001_"

! -----------Where to INSERT this object in Processing Sequence --------
! -- Attached to parent 'selectval' as a PostProcess, insert at 'exit_menu_"
M0200167TOR1___0000000000306001_.PARENTNAME$="selectval "
M0200167TOR1___0000000000306001_.ACTION$="3"
M0200167TOR1___0000000000306001_.ATTACH_OBJ$="M0200167TOR1___0000000000428101_"

! -------------------Details about this object-------------------
M0200167TOR1___0000000000306001_.DESCRIPTN$="Write to log file"
M0200167TOR1___0000000000306001_.OBJECTTYPE=2
M0200167TOR1___0000000000306001_.PARENTOBJ$-"M0200167TOR1___0000000000399501_"
M0200167TOR1___0000000000306001_.PARENTNAME$="selectval "
M0200167TOR1___0000000000306001_.DESIGNNAME$="toolusage "
M0200167TOR1___0000000000306001_.MODULE$="aim"
M0200167TOR1___0000000000306001_.REPOSITORY$="database"
M0200167TO$1___0000000000306001_.METHOD$="write "

M0200167TO$1___0000000000306001_.MODEL_VARS$=
""""aim_logfile""",""write"",ZOPRINFO$(1,6),TIME$,SELECTVAL$"
M0200167TOR1___0000000000306001_.OBJ_VARS$=
"AIM_SYLFN$,AIM_SYREQUEST$,OPERATOR$,TIME$,SELECTVAL$"
M0200167TOR1___0000000000306001_.OPERATOR_C.USAGE$="I"
M0200167TOR1___0000000000306001_.TIME_C.USAGE$="I"

FIG. 5B

Base File: Logical File Name: sam_client
Description: Client Names and Addresses
Data Source Table Name: sam_dbclient Base Record:

| Field Name | Description | Type | Size |
|---|---|---|---|
| client | Client Code | Char | 6 |
| name | Client Name | Char | 50 |
| country | Country Code | Char | 2 |
| street | Street Address | Char | 50 |
| city | City Name | Char | 50 |

FIG. 11

Variation Set: Number: 0001
Description: Canadian Information

Condition: Base Record Field Name: country
Base Record Field Value: CA

Variation Set Record:

| Field Name | Description | Type | Size |
|---|---|---|---|
| postal_cd | Postal Code | Char | 6 |
| province | Province Code | Char | 2 |

Variation Set: Number: 0002
Description: U.S. Information

Condition: Base Record Field Name: country
Base Record Field Value: US

Variation Set Record:

| Field Name | Description | Type | Size |
|---|---|---|---|
| zip_code | ZIP Code | Num | 9 |
| state | State Code | Char | 2 |

FIG. 12

METHOD, SYSTEM AND DATA STRUCTURES FOR COMPUTER SOFTWARE APPLICATION DEVELOPMENT AND EXECUTION

FIELD OF THE INVENTION

The present invention relates to the field of computer programming and, more particularly, to computer software application development and execution.

BACKGROUND

The development and modification of computer application software entails the writing of code or software objects ("objects") using a programming paradigm, examples of which are third generation languages ("3GL"), fourth generation languages ("4GL") or Object Oriented Development ("OOD") methodologies. One of the critical limitations of these conventional methodologies is that their use in software development and modification requires the developer actually to modify code. This is a troublesome limitation not only from the point of view of the labor involved with such coding, but also with regard to the coordination of effort in the software development and testing process.

The emergence of Object Orientation as a dominant programming methodology in recent years has facilitated software development efforts by providing highly modular, natural and re-usable programming constructs. By way of background, the term "object," as used by those skilled in the art of object oriented software or programming refers to software elements in the form of data structures that can communicate or invoke one another by sending a message from one to the other. Objects that respond to the same messages are said to be of a common "class." An object "class" describes and implements all the methods that capture the behavior of "instances" (i.e., objects) of the class. The state or structure of the instances of a class are specified by a template, which may specify that an object's state includes other objects. The modularity thus introduced by OOD lends itself to a divide and conquer problem solving approach that has enabled easier debugging, permitted a higher fidelity model of real world problems or environments, and allowed the generation of reusable code. Nevertheless, the requirement to write and test code persists.

A computer "application" is a program with which a computer user interacts to perform a task, and is distinguished from system or other software that creates a functional environment in which application software is designed to run. A developer of computer application software, then, is concerned with supporting user-interaction and achieving a user's objectives.

In many application environments, and particularly where the software is developed on a custom basis, the user's needs evolve. The application software intended to meet those needs preferably also would be capable of evolving. However, the modification of application software using existing approaches—even the modular approach provided by OOD—requires writing or modifying computer code, debugging the code, and doing so with minimal disruption to the use of the application. This goal, however, has proved to be elusive.

In addition to problems associated with the need to write and integrate new code in order to develop or modify software applications, another problem with existing methods of software application development or modification is that such coding also must accommodate the processing of external events, such as user input/output (I/O) or other occurrences. However, since such user I/O or other events may vary widely between one user-environment and another (e.g., graphical user interface ("GUI") as opposed to character input), the ability to accommodate such disparate external events with existing techniques requires either (1) a time consuming process of custom software development, complete with debugging, or (2) developing a set of code with sufficient contingency-handling ability to be able to operate in the variety of then-known application environments. In either case, a massive coding and testing process is required for each local application environment, only to have either to live with the shortcomings in the software that attend evolution in the application environment, or go through an arduous re-coding and debugging process once a change in such external event conditions occurs.

SUMMARY OF THE INVENTION

The present invention is directed to a method, system and data structures for the development (including design, build, test, maintenance and modification) as well as execution of computer application software that alleviates many of the application design, test and modification problems encountered by users of existing techniques.

Most notably, the present invention can eliminate the need for coded application programs by replacing code with a Run Time Events Manager and libraries of late-binding, re-usable Models, Methods or other objects, described in detail below. In place of program source or object code or any form of late-binding or dynamic-binding run-time application code that serves as the application, an embodiment of the present invention provides a single, application-independent software entity, referred to herein as a Run Time Events Manager ("RTEM") and described below. The RTEM is a single controlling entity that is present during the running of any application developed in accordance with the present invention. The RTEM continually determines what the computer does by invoking whichever available means is most appropriate given the state of the application and input/output ("I/O") at any given time. The RTEM, however, does not actually implement the functionality that it determines is appropriate, but only invokes the means—including objects, application-specific objects, and Tools—necessary for implementing that functionality. (A "Tool," as that term is used in this document, refers to procedural code that allows or provides access to low level or operating system functions; for example a database access ("DBAC") Tool described below reads and write information to a database. "Toolusage," as that term is used in this document, refers to a model design object allowing access to a Tool, i.e., that provides interface definitions for a Tool, such as parameters to do a READ or WRITE using DBAC). These objects and Tools (which include Methods, I/O Tools, or other software constructs capable of implementing functionality in a computer) do not operate independently of the direction of the RTEM. In other words, they are most preferably invoked by the RTEM, and only by an RTEM, to implement what the RTEM has invoked them to do.

Objects and Tools, in order to be invoked by the RTEM to implement a function, must be made available to the RTEM according to a registration process, an example of which is described below. According to the invention, for example, no object or Tool can be registered for use by the RTEM that contains directives that would transfer control away from the RTEM. Thus, for example, an operator using an application being run by the RTEM can be protected from inadvertently exceeding any imposed privileges, or otherwise endangering the integrity of an application as a consequence of a requested, but forbidden, action. Moreover, the RTEM repeatedly checks for external events such as operator interactions and is therefore capable of immediate interaction with the operator, such as by providing information, accepting instructions, enabling application tasks, keeping track of time, or other functions.

In an embodiment of the present invention, the RTEM is a module that manages all run-time events and carries out all communications with an operator. An "event" may be defined as any planned happening, most notably including those that occur in carrying out an application in its prescribed way. According to the present invention, the RTEM is preferably the only software with which an operator of an application communicates directly, even when the operator appears to be communicating directly with the application itself. The RTEM relays information from the operator into an application event that the information is intended to effectuate. The RTEM also relays information out of the application back to the operator.

In addition to mediating between the operator and the application, the RTEM in an embodiment of the present invention mediates all events during a run-time task, since, as mentioned (and as described in detail below), an object (such as a Method) or a Tool cannot invoke or communicate with another object. The RTEM does so, according to the present invention, by repeatedly examining and processing "Models" in order to carry out the logic associated with an application that is captured in the Models. Each Model designates a process associated with an application. A Model most preferably includes only data, not executable objects (whether in whole or in part). The data in a Model provides the RTEM that is processing the Model with information necessary to determine the rules, Tools, forms and application-specific objects the RTEM must invoke to cause a run time event associated with application processing to occur.

In an embodiment of the present invention, a Model is a list of references to objects as well as data that set forth processing associated with an application; however, the RTEM, as described below, depending upon the state of the application or external conditions at a given time, may ignore, alter and/or add to all or any parts of the processing schema represented by a Model when appropriate. In the absence of relevant, valid and admissible superseding information, a Model will be followed absolutely by the RTEM at run-time.

According to the present invention, Models that are invoked and examined by the RTEM include Paradigm Models and Variant Models associated with a given Paradigm Model. Paradigm Models describe "standard" processing associated with an application. Variant Models describe variations on the "standard" processing. Both types of Models must be registered after undergoing evaluation to determine whether their form, including their constituent data, complies with constraints associated with processing by the RTEM 10 according to the present invention. Whereas a Paradigm Model may set forth a set of rules for a portion of an application, a Variant Model represents a sub-set of rules indicating that, under certain conditions, the standard or paradigmatic way of processing may be superseded by altered, variant rules.

In an embodiment of the invention, a Variant Model refers only to what is different or at variance between itself and a Paradigm Model with which it is associated; the RTEM 10, as described, then monitors application and external run-time events and, as conditions change, it identifies and examines Variant Models that "apply" under those conditions and invokes those Variant Models that apply. According to the present invention, when the Models are registered as a precondition to being made available to the RTEM, the set of conditions under which a Variant Model's logic is to be invoked at run time are identified and stored for future use by the RTEM.

Also according to the present invention, Variant Models to be associated with a Paradigm Model can be created and registered without modifying the Paradigm Model or other Variant Models to create any references in the Model to the Variant Model. Modifying an application by creating new Models minimizes the need to re-test existing Models, as well as the incidence of destabilization during the modification process. Any number of alternative Variant Models can be independently created to supersede the corresponding parts of a Paradigm Model without introducing a risk of interference between the logic associated with each Model. This capability, in turn, facilitates testing; Models can be tested independently and the functioning of previously developed Models need not be re-tested. In terms of practical software development, independent development/ maintenance teams can create Variant Models without knowledge of what other such teams are working on. Also, customization work done at a local site where the software had been deployed will not be harmed by upgrades created by the original (non-local) authors and, consequently, will not have to be re-done at upgrade time. Furthermore, multiple conflicting requests for modification of the same application logic can be fulfilled simultaneously by non-coordinated development or maintenance teams or individuals. Accordingly, consolidated testing may be reduced or eliminated.

In an embodiment of the present invention, the RTEM also uses Tools to re-shape and re-format peripheral outputs and inputs, including persistent data storage (database), external (I/O) mediums, such as screens and reports, and electronic data interchange processes (such as conventional "EDI"). To do so, the RTEM uses Tools, as well as sets of Tools referred to herein as "Supertoolkits," to handle such peripheral inputs and outputs: (1) a Database Access Controller ("DBAC") (a Tool) and (2) an User I/O ("UIO"), both of which are further described below. A "Supertoolkit," as the term is used herein, refers to a collection of Tools. For instance, the RTEM accesses the UIO Supertoolkit to perform all presentation to the user, including an input tool, which retrieves information from the user via the keyboard, and also includes presentation tools to display the information on the form in different formats (i.e., GUI or character)). The presentation Tools may include input, display text and screen Tools, which may be implemented according to methods known to those skilled in the art.

The RTEM, in an embodiment of the present invention, is also, in a sense, a Tool that loads Models and invokes other Tools, Models and Methods to perform the actions required for a particular application (i.e., it invokes the presentation layer tools to display data on the visual form or invokes the database access tool (DBAC) to retrieve information from the database.

In an embodiment of the present invention, a DBAC is invoked by the RTEM to enable logical deposit and retrieval of data between a session using the RTEM and whatever persistent database(s) are involved. In such an embodiment, persistent storage is viewed as tables that can have different complements of data elements per row (i.e., more elements, fewer elements, different elements) or even have more tables or fewer tables, depending upon the Variant Models with which the RTEM is working at any given moment in the course of a given application session. This view of persistent storage may be referred to herein as an "Elastic Database."

The DBAC in an embodiment of the present invention is invoked by the RTEM to bridge the gap between an application's logical "elastic" view of storage and the actual RDBMS' (inelastic) rows and columns. The DBAC manages the storage and retrieval of elastic data rows across multiple conventional RDBMS-controlled tables. The same registration process (described below) that is used for Models also handles all other objects. The registration process enables the definition of the elastic (or variant) relationships in a manner not present in conventional RDBMS. The logic of the DBAC may be distributed between client and server tasks for purposes of efficiency. A pre-existing table need not be, and most preferably is not, modified to accommodate subsequent variations, such as by logically joining variant information with some or all of its rows.

According to the present invention, variant file relationships can be retrofitted into a database on-the-fly, in real-time, without disrupting normal production. The DBAC under the control of the RTEM is used to mediate all interactions between the application and the underlying database. This means that the RTEM can intervene in what is otherwise a normal interaction between an application and its Elastic Database and can vary that interaction without the need to modify either the application or the database by way of accommodation. Thus, for example, the RTEM can enable a "test session" that would allow the use of a production database "in-situ" while concurrent live production processes are altering it, without interfering with and corrupting live data, even while the application being tested includes writes and updates to its database.

In an embodiment of the present invention, an RTEM may do optional Assertion or validity testing, whether the application is in test or production mode. Specifically, the RTEM can check all variables and mandatory conditions prior to and subsequent to the invocation of every Model and Method, and even every step (i.e., element) of a Model.

Non-destructive testing requires that objects that are new, Variant or modified be registered for testing as part of a named project. Such test objects can only be invoked by the RTEM during a session the run-status of which has been specified as "test" and which has been associated with an appropriate project identification during the project definition. New and modified objects most preferably are not accessed in production unless they have gone through registered test sessions.

In an embodiment of the present invention, during a test session, all "writes" are redirected to one of the test directory databases named in the test project. All "reads" first try a test directory, the tables for which are set up by the DBAC on-the-fly as necessary, and then try a production database. All read-only production records that are used in the test are also reproduced in the test directory, even if such records require a data format change as a testing precondition. This approach enables a high fidelity record of the test session and allows it to be continued later or redone from scratch with minimal effort.

In an embodiment of the present invention, the UIO is used by the RTEM to mediate the interaction between an application and its user I/O. This user I/O includes I/O that lies beyond the confines of the computer and associated network, and includes screen forms, data input devices, electronic data interchange ("EDI") processes and other I/O.

An application according to the present invention need not be designed or modified to take I/O concerns into account, and does not have to include any logic relating to this functionality. This approach represents an improvement over conventional techniques, which more closely depend upon the application itself. The present approach permits, for example, insertion of flexible, variant I/O behavior as a function of conditions at a particular time.

Accordingly, the present invention also provides for a new method for the development of application software that permits new capabilities to be added to deployed software with minimal or no code changes and disruption of user activities typically associated with conventional application software development.

The present invention also provides for computer software capable of exhibiting extreme differences in its processing behavior, and the particular data it processes, depending upon requirements in the local environment in which the software is running.

The computer storable data structures and methods according to the present invention, and the methods for software development that they permit, according to the present invention, also permit non-uniform data structure to be defined. as a set of logical data structure each of which is normalized and defined in a conventional database. In one embodiment of the present invention, a system for running applications software implemented on a computer having a processor, a memory, and a storage medium, comprises a plurality of Models and a Run Time Events Manager stored in the storage medium. The Models each contain data including references to one or more Objects and the Run Time Events Manager is adapted for loading into memory from the storage medium a selected one of the plurality of Models, reading the data of the selected Model, and when a reference to an Object is read, invoking and executing a suitable Tool to provide the Object.

The present invention provides for a Run Time Events Manager for execution by a computer that carries out processing activities associated with instructions and responses to events external to the computer and communicated to the computer through external input and output. The computer includes a storage medium for storing a set of Models accessible to the Run Time Events Manager. The Run Time Events Manager comprises a means for loading a Model from a library of Models, a means for determining whether a Model is appropriately invoked given the state of the computer and the Run Time Events Manager, a means for invoking the Model, if determined to be appropriate given the state of the computer and the Run Time Events Manager, and a means for invoking (i.e., carrying out the intent of) the Model.

The present invention also provides for a method for developing computer application software utilizing a Run Time Events Manager. The method comprises steps including creating a plurality of Models, where each such Model includes at least one of the following: i. a reference to a Model; ii. a reference to Methods; iii. data; and iii. input or output instructions. An additional step includes testing the Model to ensure that no Method referred to in a Model can: (1) invoke another Object, whether a Model, a Method, or a Tool; or (2) do input/output (I/O), either to the screen, file or any other device or object. Also, the Models that pass muster under the test are registered to permit access by the Run Time Events Manager.

The present invention also provides for the creation of a library of Objects registered for use by a Run Time Events Manager. The registration process comprises the steps of invoking an Object based on a unique identifier for the Model, scanning the contents of the Object for the presence of contents that are restricted, and only if an Object contains no restricted contents, registering the Object as part of the library.

The present invention also provides for a database system implemented on a computer having a processor, a memory, and a storage medium, comprising a Base File and a Variation Set, with the system programmed to implement a Variation Set Run Time Map adapted for determining which Variation Set applies to a particular Base Record of the Base File. The Variation Set contains records having at least one additional field corresponding to a Base Record.

The present invention also provides for a method for operating a database system having a Base File and a Variation Set. The method comprises steps including loading a Base Record, checking the Variation Set Run Time Map for the presence of a Variation Set corresponding to the Base File, and retrieving data from the Variation Set if the Variation Set is present.

Accordingly, it is an object of the present invention to provide a method, system and data structures for developing and modifying application software that eliminates the need to write code to implement functionality associated with the application.

It is a further object of the present invention to provide a method, system, and data structures for developing, testing and executing application software using a Run Time Events Manager in connection with a set of Models.

It is a further object of the present invention to provide a method, system and data structures for developing, testing and executing application software using a Run Time Events Manager and a set of Models, in which the Models have been registered for access by the Run Time Events Manager according to a process that precludes operations including the calling of a non-registered object or the calling of a Method by another Method.

It is a further object of the present invention to provide a method, system, and data structures for developing, testing and executing application software using a Run Time Events Manager in connection with a set of Models, in which the set of Models includes Paradigm and Variant Models.

It is a further object of the present invention to provide a method, system and data structure for the implementation of an "Elastic Database" which permits the extension of a Base Record in a Base File with additional fields in a Variation Set.

It is a further object of the present invention to provide a method, system and data structures for developing, testing and running application software using a Run Time Events Manager in connection with a set of Models, in which one of the Models provides a means of integrating legacy software into a newly-developed application.

Other objects and advantages of the present invention will be apparent to a person skilled in the art in view of the following description.

BRIEF DESCRIPTION OF THE DRAWINGS

FIG. 4B shows further definition for a first portion of a data structure of a Model, showing detailed processing information for the Model.

FIG. 4C shows further definition for a second portion of the data structure of a Model (continued from FIG. 4B), showing additional detailed processing information for the Model.

FIG. 5 shows a specific example of a Model according to the present invention for implementing a menu for an application.

FIG. 5A shows a specific example of a Variant Model according to the present invention.

FIG. 5B shows a table that holds Variant Model information.

FIG. 11 shows an illustrative example of a Base File and Base Record for an Elastic Database.

FIG. 12 shows an illustrative example of two Variation Set definitions for an Elastic Database.

DETAILED DESCRIPTION

Figure 1:
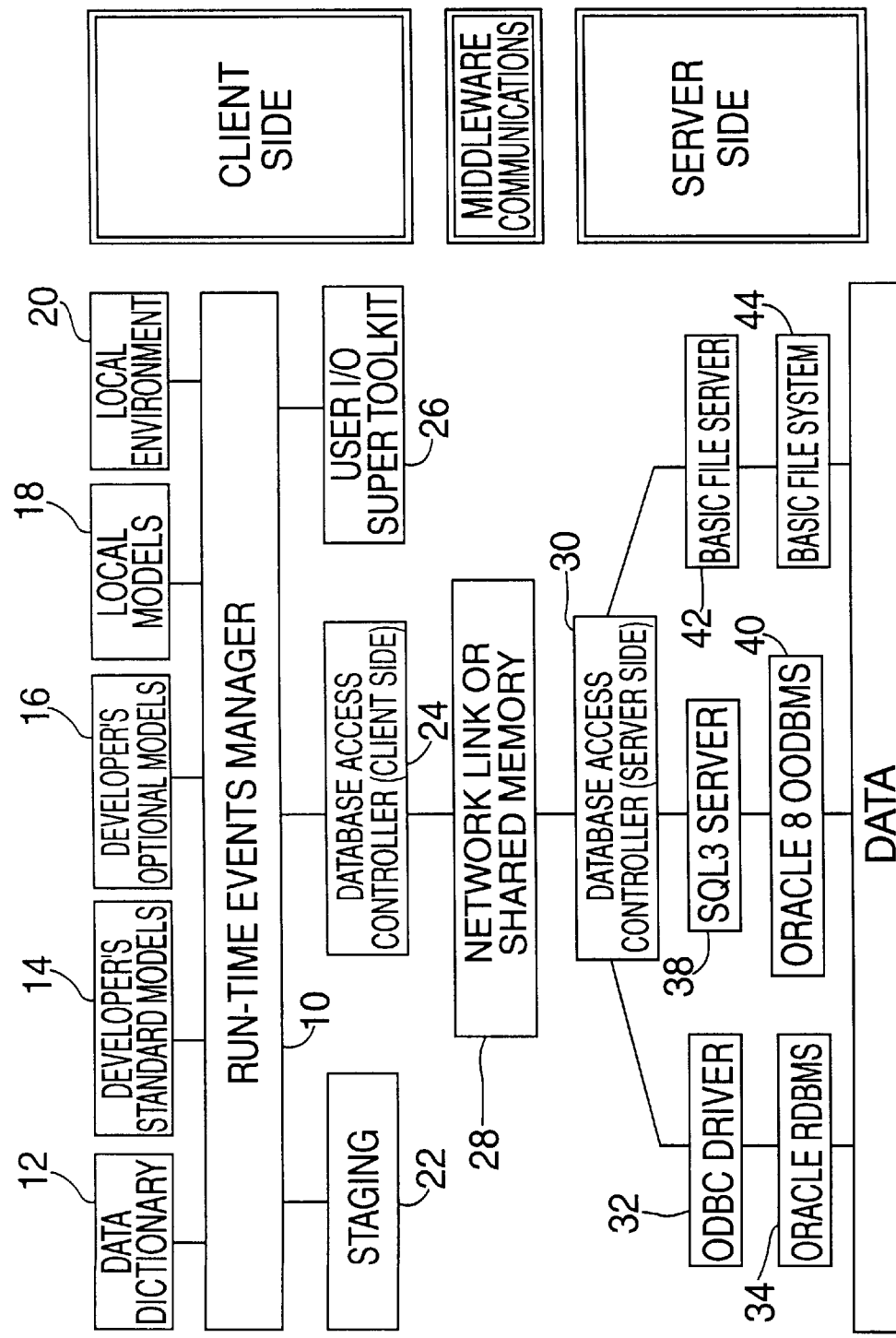
FIG. 1 shows the architecture of an embodiment of a system according to the present invention.
Figure 8:
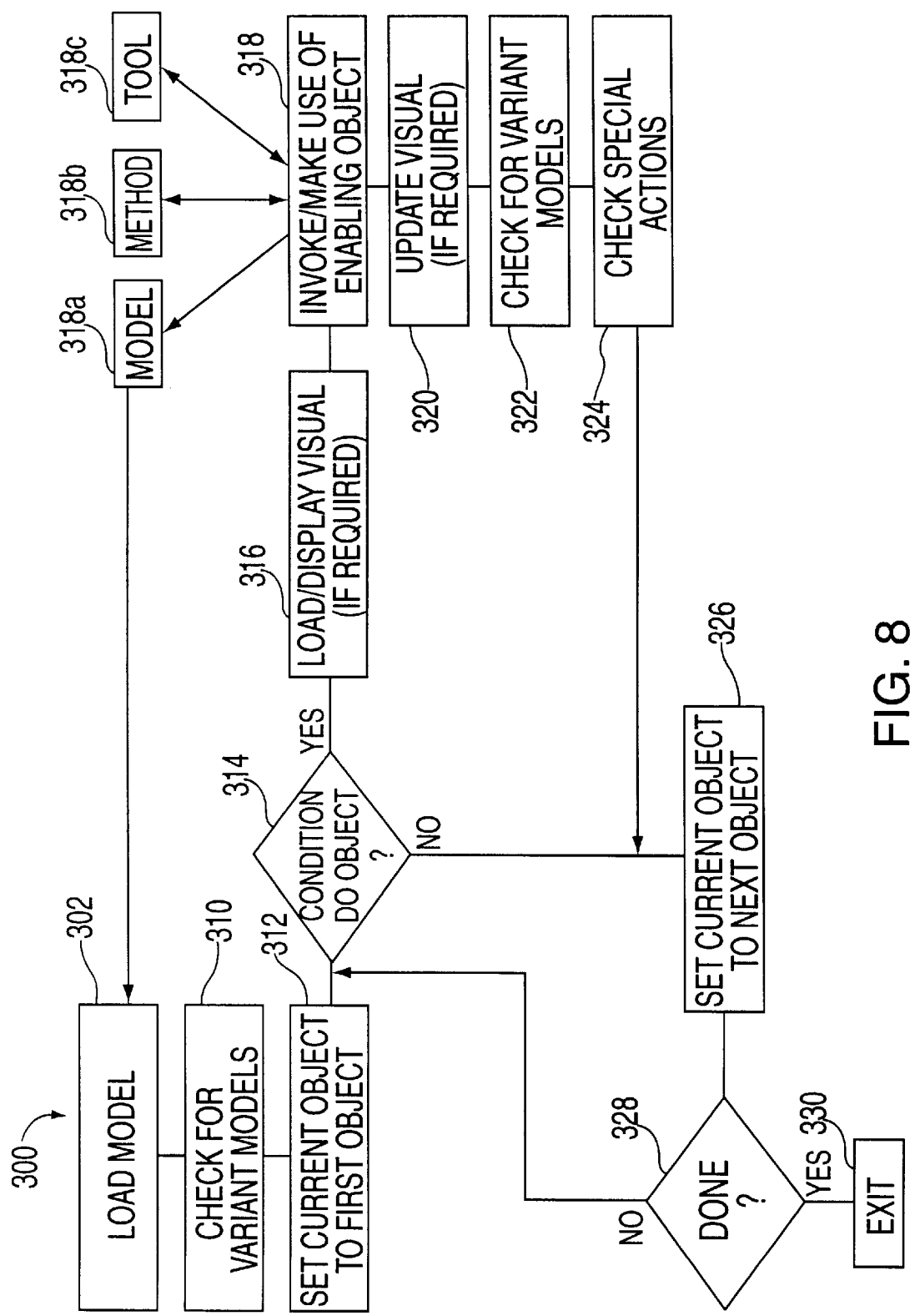
FIG. 8 shows a flowchart describing the operation of an embodiment of a Run Time Events Manager in an embodiment of the present invention.
Figure 9:
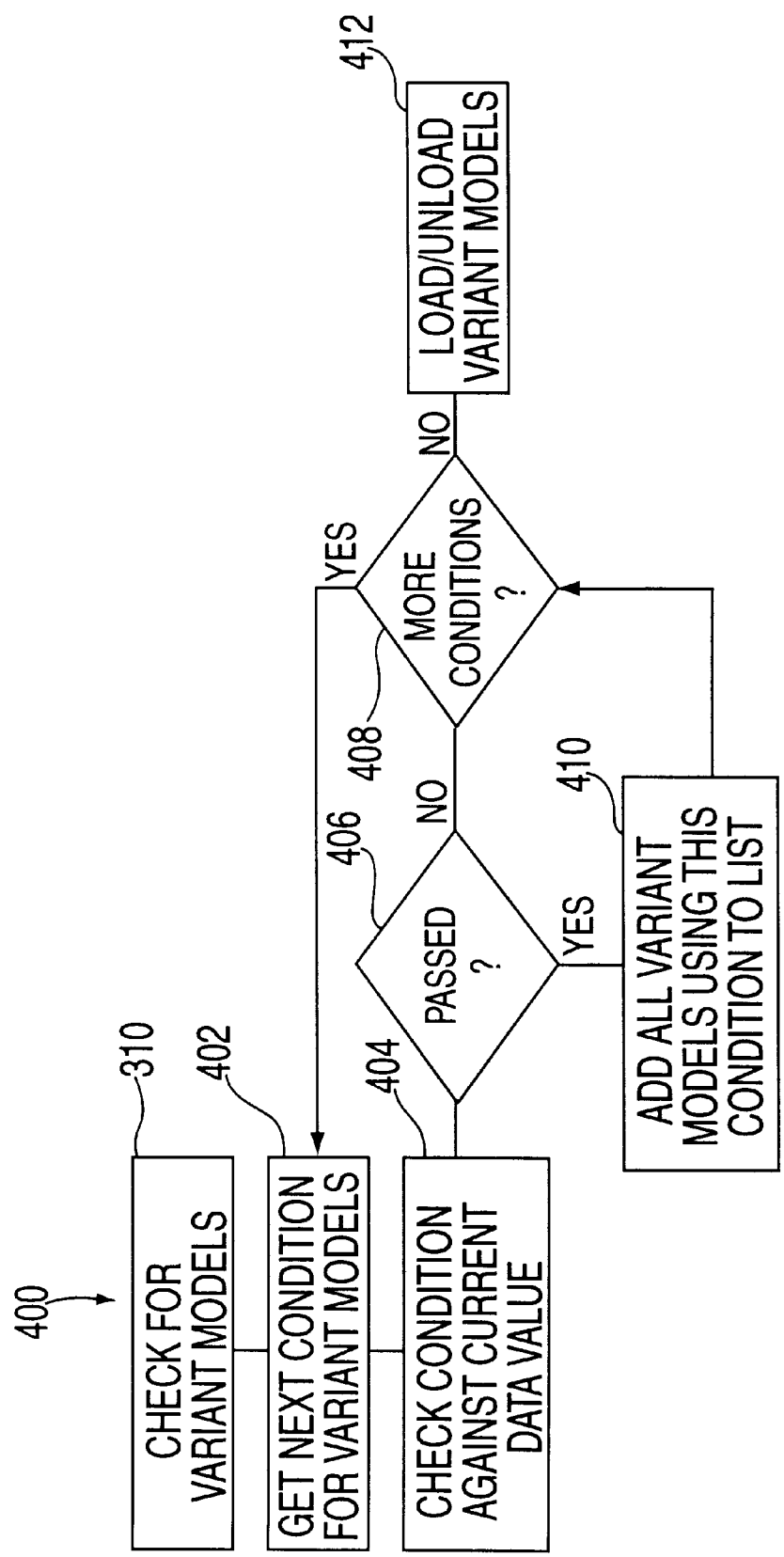
FIG. 9 shows a flowchart describing a portion of the processing of the embodiment of the Run Time Events Manager of FIG. 8 relating to variant Models.
Figure 10:
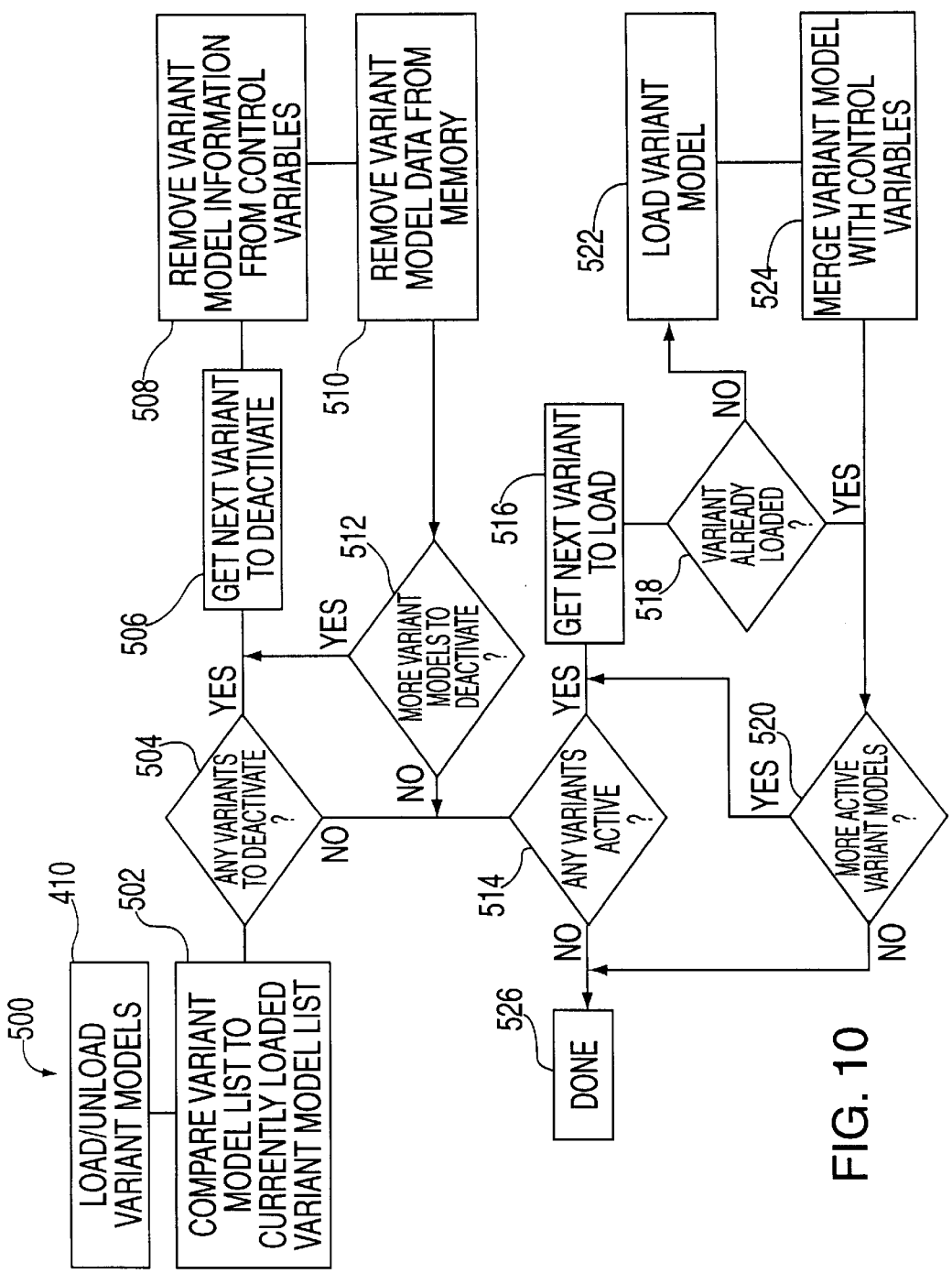
FIG. 10 shows a flowchart describing a portion of the processing of the embodiment of the Run Time Events Manager of FIGS. 8 and 9 relating to the loading and unloading of variant Models.

FIG. 1 shows the architecture of an embodiment of a system according to the present invention. A Run Time Events Manager ("RTEM") 10, described in detail below in connection with FIGS. 8–10, is a set of procedures responsible for executing all processing associated with an application. RTEM 10 has access to various data and objects, including data dictionary 12, standard Models 14, developer's optional Models 16, local Models 18 and local environment 20. "Standard" or "Paradigm" Models 14 are those provided by the authors of a particular application as carrying out the processing associated with that application and provide the rules that specify how the application is to be done. Standard or Paradigm Models 14 provide the ultimate defaults for application processing. Developer's "Optional" Models 16 are provided by application authors as alternatives to all or part of the Standard or Paradigm Models in order to account for processing which, although alternative to the Standard or Paradigmatic processing, nevertheless will be invoked by the application. As an example, in a logistics application setting, where a Model for the Setup of a Product has been provided, an additional, Optional Model may be provided that is executed to capture input and update different files only under certain conditions, such as if a Road Transportation module were turned on. Local Models 18 are those that are specific to the site where the application software has been deployed and has been uniquely configured to suit application requirements at that site. For example, Local Models would include processing relating to the local site, e.g., relating to equipment, operators, etc. at that site. Local environment 20 represents the data and conditions describing the particular setting in which an application will operate.

RTEM 10 also has access to a set of controllers. A first of these controllers is staging 22, which carries out data processing according to Models processed by the RTEM 10 as described below. All registered objects that comprise an application (e.g., Models, Methods, Data, text, etc.) and all supporting objects, such as Tools, are referred to as "staging." Staging 22 provides a cross-reference between every object and every other object involved with it, to permit objects to be accessible and understandable to developers, developed according to methods known to those of skill in the art.

A second controller to which RTEM 10 has access is a database access controller ("DBAC")(client side) 24. The DBAC (client side) 24 permits RTEM 10 to gain access to data through, if necessary, middleware constituting, for example, a network link or shared memory 28. In addition, DBAC (server side) 30 permits interfacing with commercially available or proprietary database software as necessary according to the Models comprising a given application. For example, RTEM DBAC (server side) 30 can interact with Open Database Connectivity ("ODBC") Driver 32 and Oracle® RDBMS 34, or with SQL3 Server 38 and Oracle® 8 Object Oriented Database Management System ("OODBMS") 40, or with BASIC File Server 42 and BASIC File System 44, or with any suitable database software. Through the foregoing database software, RTEM 10 has access to Data 36 residing on a file server (not shown). Organization of the code and data comprising the RTEM 10 and the objects and data to which the RTEM has access is described in connection with FIG. 3, below.

A third controller that RTEM 10 has access to in the illustrated embodiment of the present invention is User I/O ("UIO") 26, which is preferably a Supertoolkit. The UIO 26 is used by RTEM 10 to mediate the interaction between an application and its "external" inputs and outputs in order that the Models that make up an application (or the objects referred to in those Models) need not do so. External inputs and outputs are intended here to refer to those that are beyond the confines of the computer and associated network, including screen forms, data input devices and electronic data interchange ("EDI") processes.

An application developed and running in accordance with the illustrated embodiment of the present invention (in which a RTEM 10 has access to the functionality of the UIO 26) need not be designed or modified to take into account where its working memory data is retrieved from, or where it is sent. Such an application thus does not need to include logic that places. data onto a screen form or onto a report document or into an EDI process, for example; nor does it need to interact with a device or process that exchanges data with the application. In addition, data structures created according to the present invention preferably do not contain procedural or declarative code that could permit a developer to circumvent these rules.

In an embodiment of the present invention, UIO 26 determines, for example, when and where information is refreshed on a screen. It determines whether the I/O should be graphical or character mode. As well, it determines what human language to use. Any such external events are appropriately handled by UIO 26. The underlying application Models need not be designed or modified to accommodate this functionality of the UIO 26. The mediation of user I/O by the RTEM 10 using a UIO 26 permits flexible insertion of variant I/O behavior as a function of conditions at a particular time, rather than being rigidly dictated by an application.

Figure 2:
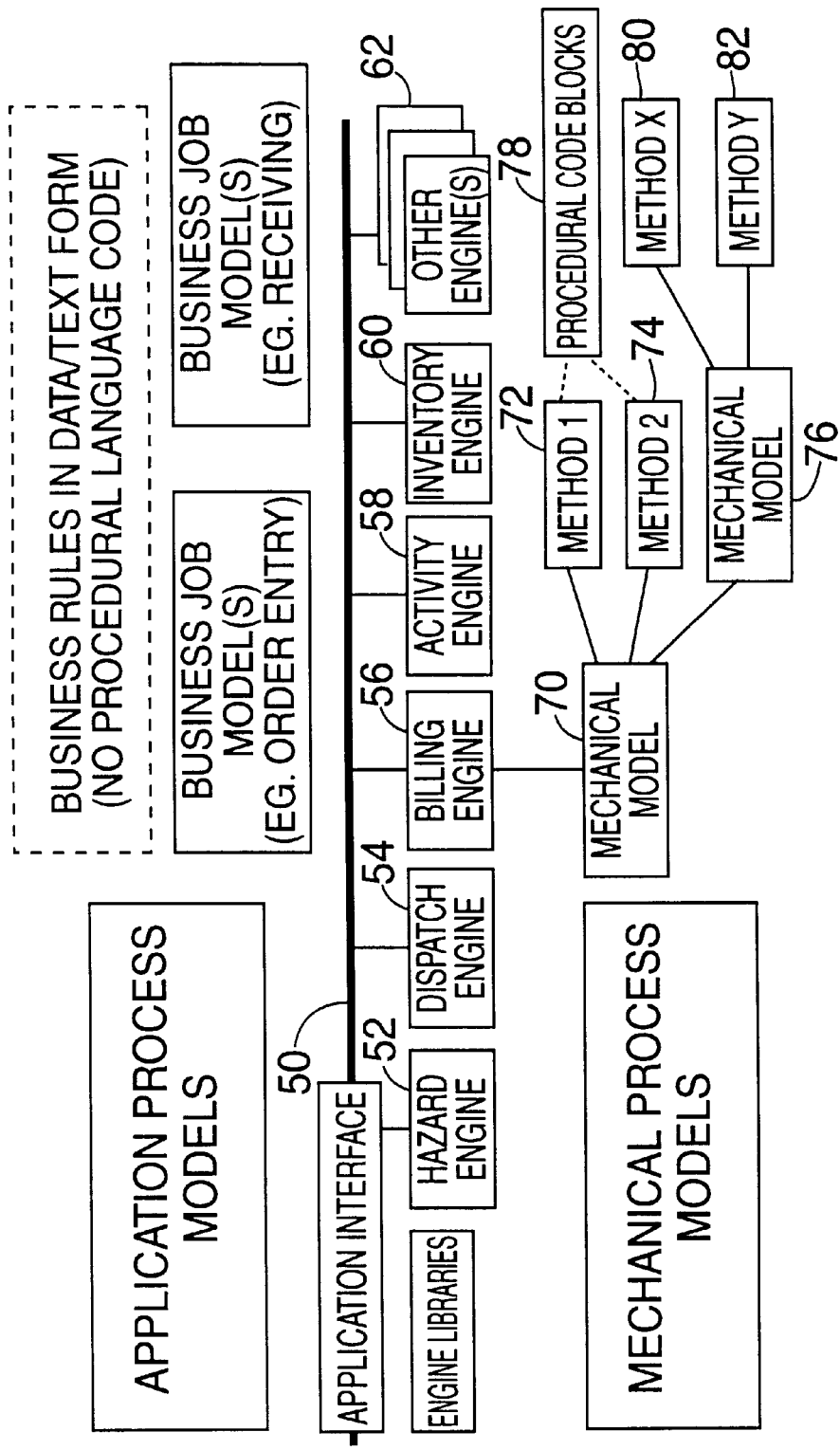
FIG. 2 shows an embodiment of an application interface and an example of a set of Model libraries, or engines, according to the present invention.

FIG. 2 shows an embodiment of an application interface and an example of a set of Model libraries, or engines, according to the present invention. In the terminology of the present invention, a "Model" is a software object containing data specifying rules for the application environment and, most preferably, no code. A Model, in other words, is a packet of data that sets forth a list of the processing that is to take place for a particular subset of the application(s) with which the Model is associated. The processing includes the specification of Rules, including Business or application process rules and mechanical rules. A Model, when invoked by the Run Time Events Manager, described in detail below, causes the invocation of free-standing, re-usable, registered, publicly instantiated objects, including "Methods," other Models, or Tools. For an example in the logistics software setting, a Model associated with reading all Holds against a Product and which determines the extent to which the Holds affect availability of the Product could include in its list:

1. Set pointer in Hold file to first record for this Product;
2. If current record is for Product:
3. Read current record;
4. Accumulate net effect on Available Products;
5. Go to 2.

Also as described in part above, and further described below, the Models can be of several varieties, which maximizes the flexibility of applications that are built using the Models and run by the RTEM 10.

The term "Method," as used herein, refers to a block of procedural code created to accomplish a particular purpose, analogous to a subroutine in a conventional program. In accordance with the present invention, Methods are used that are "free-standing," re-usable, registered, and publicly instantiated. In other words, each Method stands alone in a Library in which its presence is registered. A method is registered, as described in greater detail below in connection with FIG. 6, so that it becomes an accessible part of the Library that may be invoked by the RTEM 10 at an appropriate time, as specified by a Model. According to the present invention, Objects such as Methods can include Parents, Pre-Processes and Post-Processes, as will be further defined below.

FIG. 2 shows the logical environment for two basic types of Models and an application interface 50 between them. Models comprise two primary types: Application Process (or Business Rule) Models and Mechanical Models. These two types differ in the level of abstraction to which they are directed. Application Process or Business Rule Models carry out processes particular to an application. For example, in a logistics application, an Application Process or Business Rule Model might specify the processing for order entry or for receiving of goods. The logic associated with an Application Process or Business Rule Model is specific to only one application job and, in general, is not reusable in any other context. Mechanical Models, on the other hand, in general carry out processes at a lower level of abstraction and may be reusable in different application contexts. In a logistics setting, for example, a Mechanical Model might calculate available stock or record the time taken to move stock from place A to place B in a warehouse.

A "Library," as used herein, is a set of Objects that has been organized and made accessible to the RTEM 10. An "engine" is a library of late-binding, re-useable Models and methods, in particular, a collection of Mechanical Process Models and Methods that work together. In the example of FIG. 2, a set of engines (52–62, even) for a logistics-related application are shown in relation to interface 50 for that application. A Hazard Engine 52 is defined as a group of Mechanical process Models having to do with handling hazard events. Dispatch engine 54 is a group of Mechanical process Models having to do with dispatching. Billing Engine 56 is a group of Mechanical process Models having to do with performing a billing function, and so forth, respectively, for Activity Engine 58, Inventory Engine 60 and Other Engine(s) 62.

In FIG. 2, a portion of the contents of only one of the engines is shown. Specifically, Billing Engine 56 has a Mechanical Model 70, which in turn contains a reference to a Method 1, 72, and Method 2, 74, both of which Methods can invoke at least a subset of Procedural Code Blocks 78. Mechanical Model 70 also contains a reference to another Mechanical Model, 76, which itself contains references to two Methods, Method X 80 and Method Y, 82. The imposition of constraints on the form of the Model and Methods is described in connection with FIG. 6.

Figure 3:
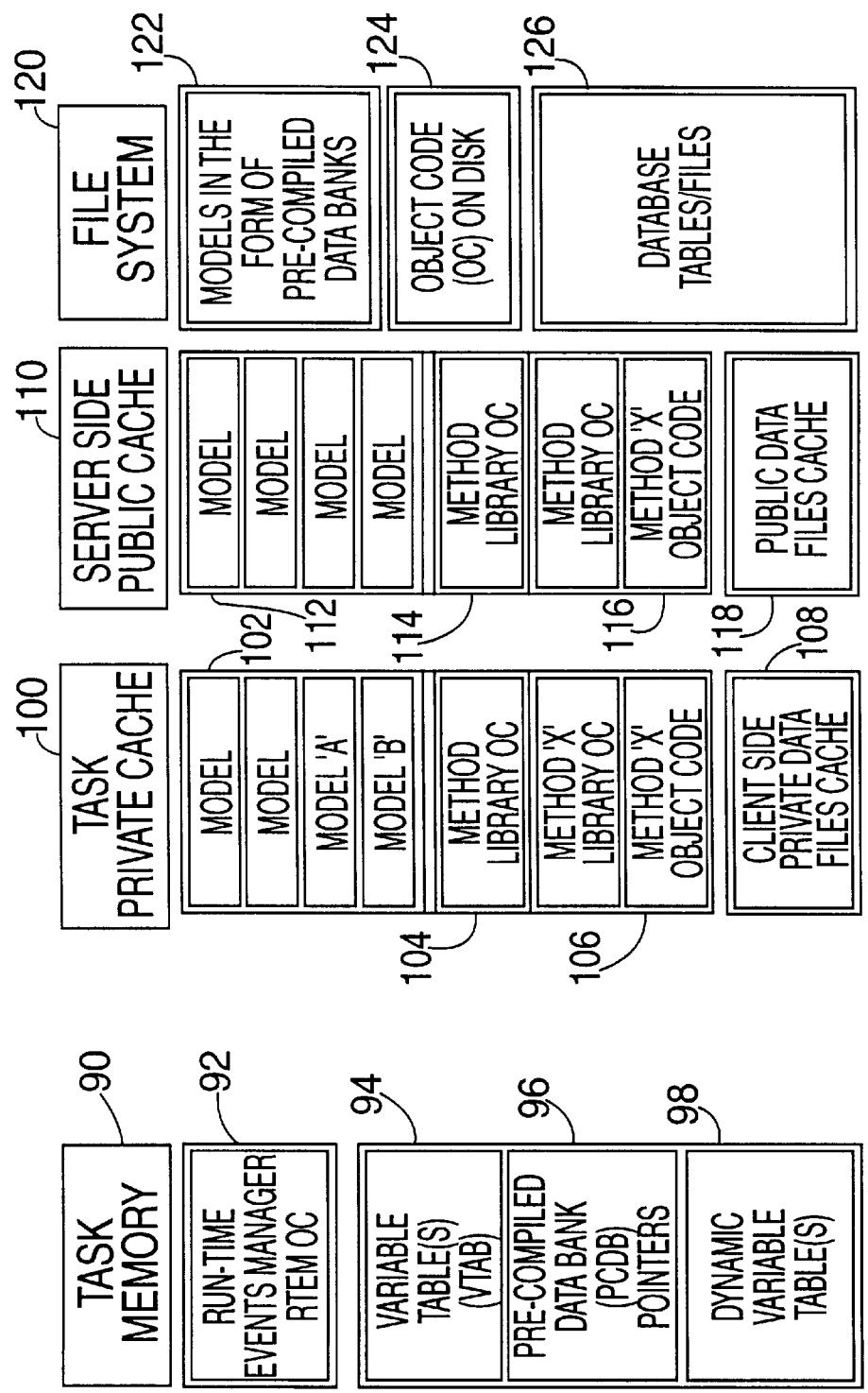
FIG. 3 shows the organization of a Run Time Events Manager, Models, Methods and data in accordance with an embodiment of the present invention.

FIG. 3 shows the organization of a Run Time Events Manager, Models, Methods and data in accordance with an embodiment of the present invention. In this embodiment, memory comprises four parts: task memory 90, task private cache 100, server side public cache 110 and file system 120. Task memory 90 includes in one portion object code 92 of the RTEM 10. In another portion, task memory 90 includes one or more variable table(s) ("VTAB") 94, including pre-compiled data bank ("PCDB") pointers 96 and dynamic variable tables 98. Each Model according to the present invention comprises data, as illustrated below in FIGS. 4 and 5, and is stored in a pre-compiled data bank that the RTEM 10 loads at the time of invoking the Model. The data in the model is formatted so that the RTEM can invoke the Model based on the data, which is most preferably pre-compiled so that the language in which the RTEM 10 is programmed can readily understand its contents and, based on an extension or other data identifying the type of each object referred to, retrieve such objects from an appropriate location. Task private cache 100 includes a set of Models 102, Method Library object code 104, and a client side private data files cache 108. Server Side Public Cache 110 includes a set of Models 112, Method Library Object Code 114; and a public data files cache 118. Finally, File System 120 contains Models 122 in the form of pre-compiled data banks 122 (which are pointed to by PCDB pointers 96), object code on disk 124, and database tables/files 126.

The RTEM 10 (shown in FIG. 1) links into the Tasks's VTAB 94 the memory block of Model 'A' (see reference numeral 102), which is either in the Client Side Private Cache 108 or the Server Side Public Data Files Cache 118. The data in Model 'A' is in the form of a PCDB pointer (see reference numeral 96), which is a segment of VTB 94. Accordingly, only a few machine instructions are required, regardless of the size and complexity of the Model, to actively link it into the VTAB 94.

Assume, for example, that a step 1 (not pictured) of Model 'A' invokes Model 'B'. Given that only one Model can be active at any particular time, as described in greater detail below, the RTEM 10 "pushes" Model 'A' down (in the sense of a stack machine) and leaves it passively linked. Then RTEM 10 actively links Model 'B''s PCDB pointer (see reference numeral 96).

Further, assume that a step 1 (not pictured) of Model 'B' directs that Method 'X' at 106, which is object code, be executed. In this event, the RTEM 10 moves the execution pointer to Method 'X,' which is in either the Task Private Cache 100 or Server Side Public Cache 110. Method 'X' is then executed.

When all the Steps of Model 'B' are done, the RTEM 10 "pops" Model 'B,' leaving Model 'A' actively linked and the step pointer at step 2.

Figure 4:
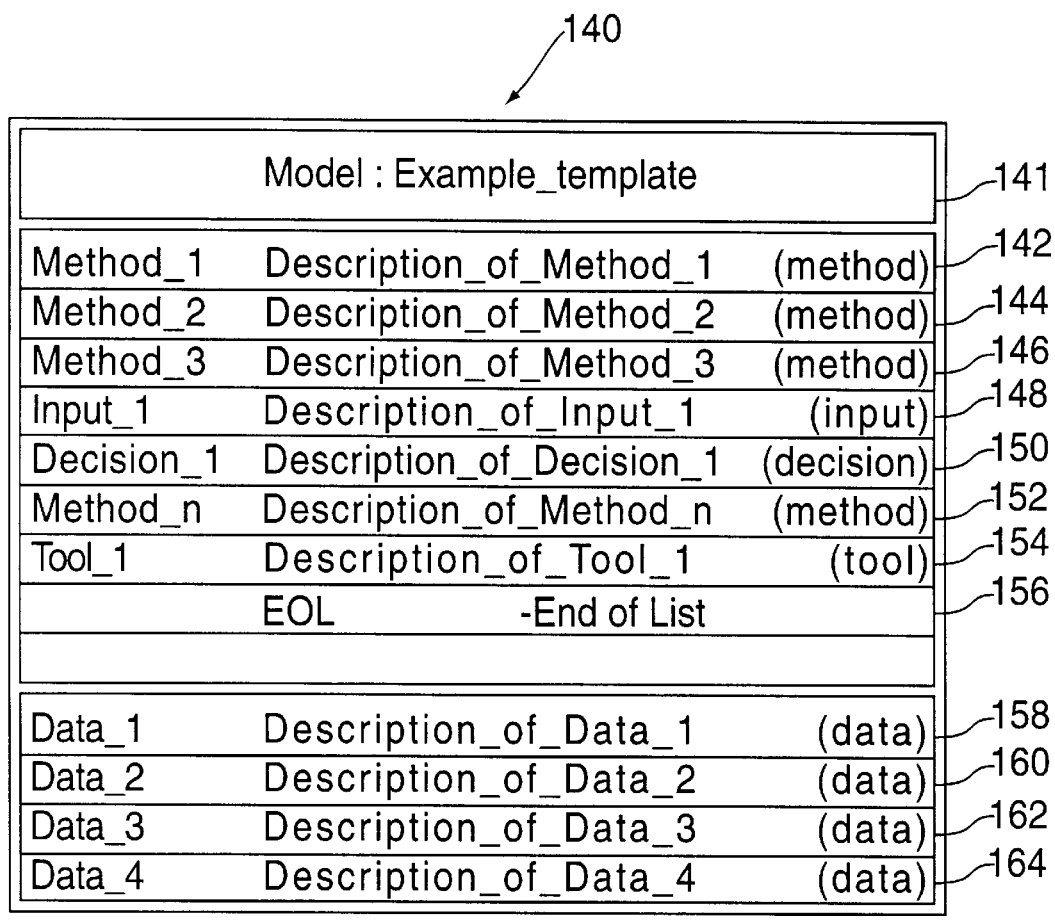
FIG. 4 shows an example template showing the form of an embodiment of a Model according to the present invention.

FIG. 4 shows an exemplary Model template 140 that illustrates the form of an embodiment of a Model according to the present invention. The Model template 140 has a header 141 including a unique identifier ("ID") for the Model (here, Example_template) and to which PCDB pointer points (see reference numeral 96). Although not shown, the header 141 is followed by a set of data that, essentially, forms a list of objects and then of non-object data. In general, the objects include Methods, Input/Output instructions, Decision instructions, Tools and Data. Each element in the list in Model Template 140 may include the unique ID of the Method, which is used to invoke the Method from an appropriate library, and which may be a character string (e.g. 32 characters), a unique language name providing a description of the method, and, shown in parentheses, a type indicator (e.g., (method), (input), (decision), (data), etc.).

Each element is listed in the order in which it is to be invoked according to the function of the Model. In the Model specified by template 140, for example, Method_1 142, Method_2 144, and Method_3 146 are run first, in succession. When Method_3 146 is complete, Input_1 148 runs, followed by Decision_1 150, Method_n and Tool_1 154. Processing continues in this sequence until an EOL (end of List) 156 is detected. Data elements, listed in Model Template 140 as Data_1 158, Data_2 160, Data_3 162 and Data_4 164 are available to the Methods and other objects listed in the Model.

Figure 4A:
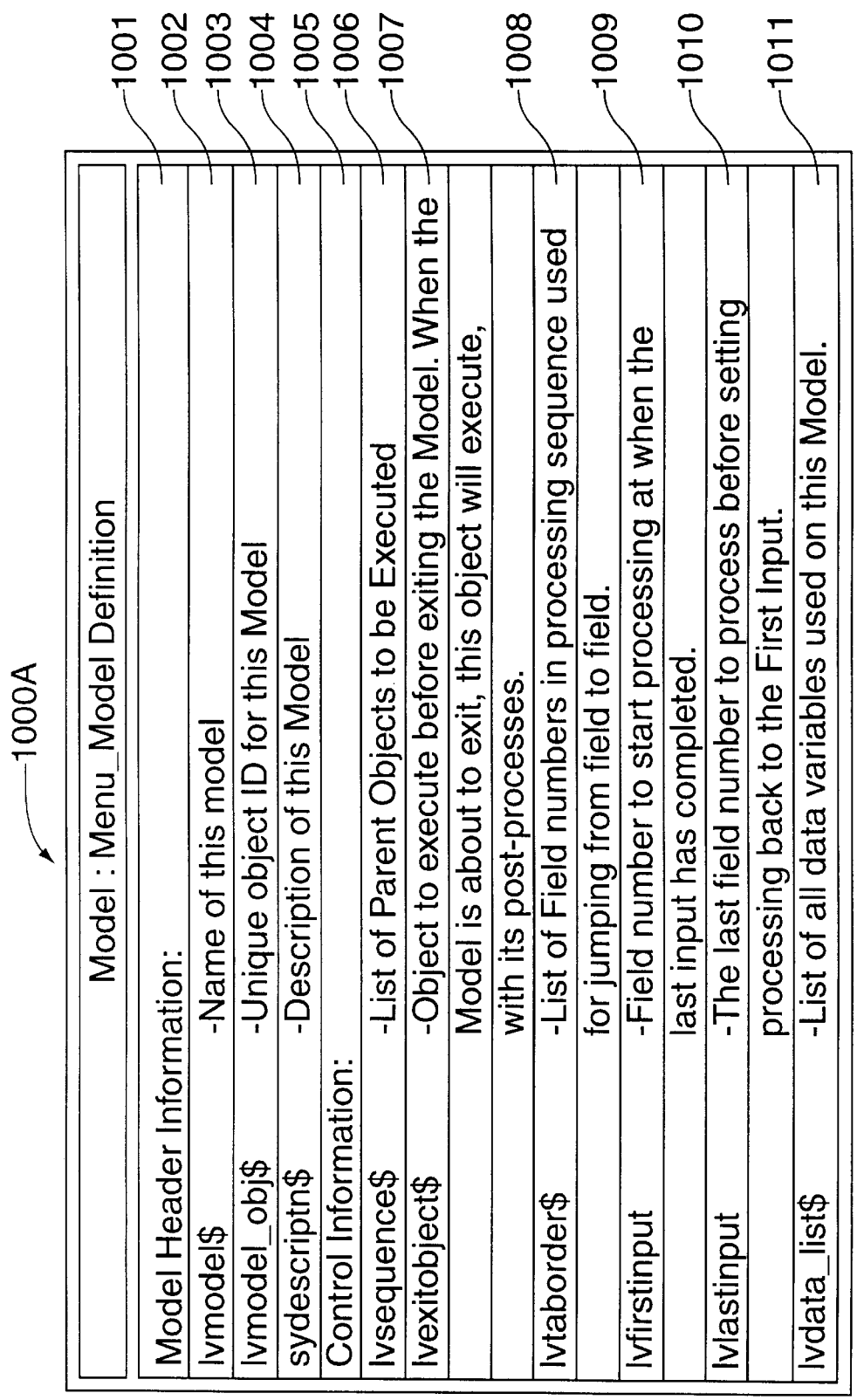
FIG. 4A shows an example of another template for a Model, and with greater detail than in FIG. 4.

FIG. 4A shows an example of another template 1000A for a Model, showing greater detail than in FIG. 4. Here, the Model Header Information 1001 includes a number of descriptors: lvmodel$ 1002 identifies the name of the Model; lvmodel_obj$ 1003 identifies a unique object ID for the Model; sydescriptn$ 1004 provides a description of the Model. Template 1000A also contains various Control Information 1005: lvsequence$ 1006 provides a list of Parent objects to be executed; lvexitobject$ 1007 identifies an object to execute before exiting the Model (when the Model is about to exit, this object will execute with its Post-Processes); lvtaborder$ 1008 provides a list of field numbers in processing sequence used for jumping from field to field; lvfirstinput 1008 provides a field number to start processing at when the last input has been completed; lvlastinput 1010 provides the last field number to process before setting processing back to the first input; and lvdata_list$ 1011 provides a list of all data variables used on this Model.

FIG. 4B shows further definition for a first portion 1000B of a data structure showing detailed processing information for a Model. Specifically, it provides an identification of a number of objects that define the Model: {objectid}.name$ 1012 provides a reference name to the object that is the Model; {objectid}.descriptn$ 1013 provides a description of this object; {objectid}.condition$ 1014 sets forth a condition that must be met for the RTEM 10 to execute this object; {objectid}.objecttype 1015 informs the RTEM 10 of the type of the present object (1: Method; 2: Tool Usage; or 3: Model); {objectid}.module$ 1016 identifies a module for Tool Usage, Method or Model; {objectid}.repository 1017 identifies a Repository for Tool Usage or Method; {objectid}.method$ 1018 identifies a Method to execute; {objectid}.toolusage$ 1019 identifies a Tool Usage to execute; {objectid}.model$ 1020 identifies a Model to execute; {objectid}.performflg 1021 instructs the RTEM 10 how to access this object (0 indicates the object is called, passing in the Model data specified in modelvars, while 1 indicates that the object is performed, passing in all Model data); {objectid}.modelvars$ 1021 provides a list of Model variables to be passed into the Method, Tool Usage or Model; and {objectid}.obj_var$ 1023 sets forth a list of object variables to be populated from the Model variable (specified in modelvars).

FIG. 4C shows further definition for a second portion of the data structure of a Model (continued from FIG. 4B), showing additional detailed processing information for the Model. In particular, it includes: {objectid}.{model_variable}_{type of variable}.usage$ 1024, which identifies the usage for this variable being passed in the Method, Tool Usage or Model. Model_variable sets forth each data variable set forth in {objectid}.modelvars$; {type of variable} identifies the following: C indicates character variable; N indicates numeric variable; Usage: I indicates variables passed in only; B indicates variables passed in and back out; F indicates variables passed in as default value specified and back out.

{objectid}.{model_variable}_{type of variable} 1025 identifies a default value passed into the Method, Tool Usage or Model. {objectid}.action$ 1026 identifies attachment action for this object (1: a Pre-Process object; 2: a Parent object; or 3: a Post-Process object). {objectid}.parentname$ 1027 identifies the name of the parent object, if the object is a pre or Post-Process. {objectid}.parent_obj$ 1028 specifies the object ID of the Parent Object, if a Pre-Process or a Post-Process object; {objectid}.designname$ 1029 identifies the type of model design object; {objectid}.mandatory 1030 indicates that, if the object is an input, indicates to the input if the entry is mandatory or not (0, if not mandatory; 1, if mandatory); {objectid}.preprocs$ 1031 identifies the list of Pre-Process objects for this Parent object; and {objectid}.postprocs$ 1032 identifies the list of pos-process objects for this parent object.

FIG. 5 shows a specific example 170 of a Model (specifically, a Paradigm Model) according to the present invention for implementing a menu for an application. Following the header 171 for Menu_example are a set of 12 objects, including eight methods, an input and an exit. One object in this Model, selectval, is a "parent" object. Those that precede the parent (indicated also by a forward slash (/)) are called Pre-Processes; those that follow the parent (indicated by a backslash (\)) are called Post-Processes.

When the Model is invoked, the clr_select method 172 is run; this clears a variable that holds a value of a menu item to be selected. The menu_activ Model 173 sets (in an application context involving logistics) the current date, operator, terminal, company, system used for tracking menu activity, after which the menudflt 174 method sets default values, such as the initial menu to display if no selection has been made. The Method menu_displ 175 loads and displays the menu. Method save vals 176 saves old values, after which selectval 177 reads and stores values selected by a user. The Model menuselect 178 validates menu selections made by the user. The next object in the Model that is invoked is menusecure 179, which verifies menu security. If an operator using the menu enters an invalid selection or selects another menu to display, processing repeats at the Method clr_select 172. This is accomplished by the method menusecure 179 passing a special request (reference numeral 324 in FIG. 8) to the RTEM 10. If a valid selection was made (Valid Job), the Model then runs exit (object) 181, which sets a control variable to tell RTEM 10 it has finished executing the Menu Model (all Post-Processes to exit 181 will be processed before RTEM 10 actually leaves the Model).

If the operator chooses to exit the application environment, he or she presses an appropriate pre-designated key (in this example, the F4 key) at the menu selection input (SelectVal 177). This sends processing to the exit 181, which sets a control variable to tell RTEM 10 it has finished processing the Menu Model (all Post-Processes to exit 181 will be processed before RTEM 10 actually leaves the Model). The Method menuf4 182 is conditional on the operator pressing the F4 key in the menu selection input (SelectVal 177). Menuf4 182 checks a system configuration flag to see if the Menu Model should back up one level in the menu display if not already at the top level, exit the Menu Model if at the top level, or exit the Menu Model if the system configuration flag is set to immediately exit the Menu Model without moving up to previous levels of the menu display. If the menu4f 182 method decides to move up one level in the menu display, the control variable (for telling RTEM 10 it has finished executing the Menu Model), which was set at exit 181, is reset and the selected menu to display is set to the previous menu. Processing then continues at the Method clr_select 172.

The data variables associated with Model Menu_example 170 includes: action 184, which stores the menu selection; blank_5 185, which stores 5 spaces; cmdcompany 186, which stores the name of a company; company 187, which stores a company code; menu_desc 188, which stores a menu description; oldmenudsp 189, which stores the identity of the menu previously displayed; pagedisply 190, which stores a page display; selectval 191, which stores a menu selection; short_name 192, which stores a short name for a company; status 193, which stores a status value; submenu 194, which stores a sub-menu for the system; terminal 195, which identifies a computer terminal; tilde 196; tilde2 197; and time 198, which stores a particular time.

FIG. 5A shows a Variant Model 170A based on the Paradigm Model 170 of FIG. 5. The Variant Model 170A is nearly identical to Paradigm Model 170. However, it includes processing absent from Paradigm Model 170, specifically a Post-Process, track_a1 179A, which writes menu interactions to a log file after verifying menu security. The header 171A of Variant Model 170A indicates that the Model is a Variant and identifies it by name. In addition, the header lists the condition(s) (in this example, there is only one) necessary for the Variant Model 170A to "apply" and thus to be loaded for potential invocation. In this case, the condition necessary for the track_a1 Variant Model 170A is that the company code be equal to A1. The Model Run Time Variation Table (which may also be referred to as a Run Time Variation Map) is the same structure as the DBAC 24, 30 Run Time Variation Table, discussed below in connection with the Elastic Database.

The table or map, where one variation applies to the Model, is as follows:

| Variation | Condition | Evaluation Code |
|---|---|---|
| track_a1 | When company = "A1" | 1 |

A corresponding Run Time Expression table is as follows:
(COMPANY$="A1")

Where data in memory after Base Record is read:
COMPANY$="A1"
Using the Run time expression table, a Run Time Evaluation Code is generated. In this example, where
(COMPANY$="A1"),
the Run Time Evaluation Code will be "1". This Run Time Evaluation Code is compared against the table shown able to determine which Variations are active. The active variations are those that have a "1" in the same position as the Run Time Evaluation Code.

| Run Time Evaluation Code | Variation | Variation Table | Active? |
|---|---|---|---|
| 1 | track_a1 | 1 | Yes |

A Variant Table corresponds to the Model run-time information. This Variant Table companion file stores a table of all conditions that activate all Variant Models. For the above example, the Variant Table is as follows:
LVRTEM.VAR_CHECK$="(COMPANY$="A1")"
LVRTEM.VAR-TABLE$="1"
LVRTEM.VARIATIONS$="track_a1"

To clarify the naming convention in the embodiments described herein: LV (used immediately above) refers to local variable class; other prefixes are used for other variable classes, such as SY (system variables); DD (data dictionary); DB (data base); LL (local label); RT (routine).

A detailed, commented version of a Variant Model 170A is shown in FIG. 5B, indicating that the Variant Model is loaded when COMPANY is "A1" and that it adds an example Toolusage object to write the DATE OPERATOR, TIME and SELECTVAL to a log file after each menu selection. The object is executed before the DECISION called EXIT_MENU. First, the Variant Model 170A contains the name of the object to add to the Paradigm Model. Then, it indicates where to insert that object in the processing sequence for the Model. Specifically, the object ("track_A1") is attached to the parent object "selectval" (reference numeral 177 in FIG. 5 and reference number 177A in FIG. 5A) as a Post-Process, and is inserted at exit_menu (reference numeral 180 in FIG. 5 and 180A in FIG. 5A). Details about processing associated with the example object "track_a1" follow. First, a description is provided (DESCRIPTN$) which is set to the string "Write to log file." The object type is set to a value indicating Toolusage (in the present example, that value is 2). Then, the parent object 32 character ID (PARENTOBJ$) is set forth, followed by the parent object name (PARENTNAME$) (which, as stated above, is "selectval"). The details further include that the object design name (DESIGNNAME$) is "toolusage," and that the module (MODULE$) is "module". The detailed information also includes the identity of the repository (REPOSITORY$) in which the object resides; this is the database. Further, the method invoked by the object (TOOLUSAGE$) is specified as "write," since track_a1 writes to a log file.

In addition, the Variant Model includes a list of model variable (MODEL_VARS$), which include "logfile" (a log file within the module identified as "module"), "write" (which indicates the operation), and then the list of variables which are to be written when the necessary condition is met for the object (that is, the operator (ZOPRINFO$(1,6)), the time (TIME$) and the menu selection (SELECTVAL$). The Variant Model also includes several object variables (OBJ_VARS), which are logical file name, (SYLFN$), requested action (SYREQUEST$), the operator (OPERATOR$), the time (TIME$) and the menu selection (SELECTVAL$). The Variant Model invokes the DBAC with the parameters above to do a write.

Figure 6:
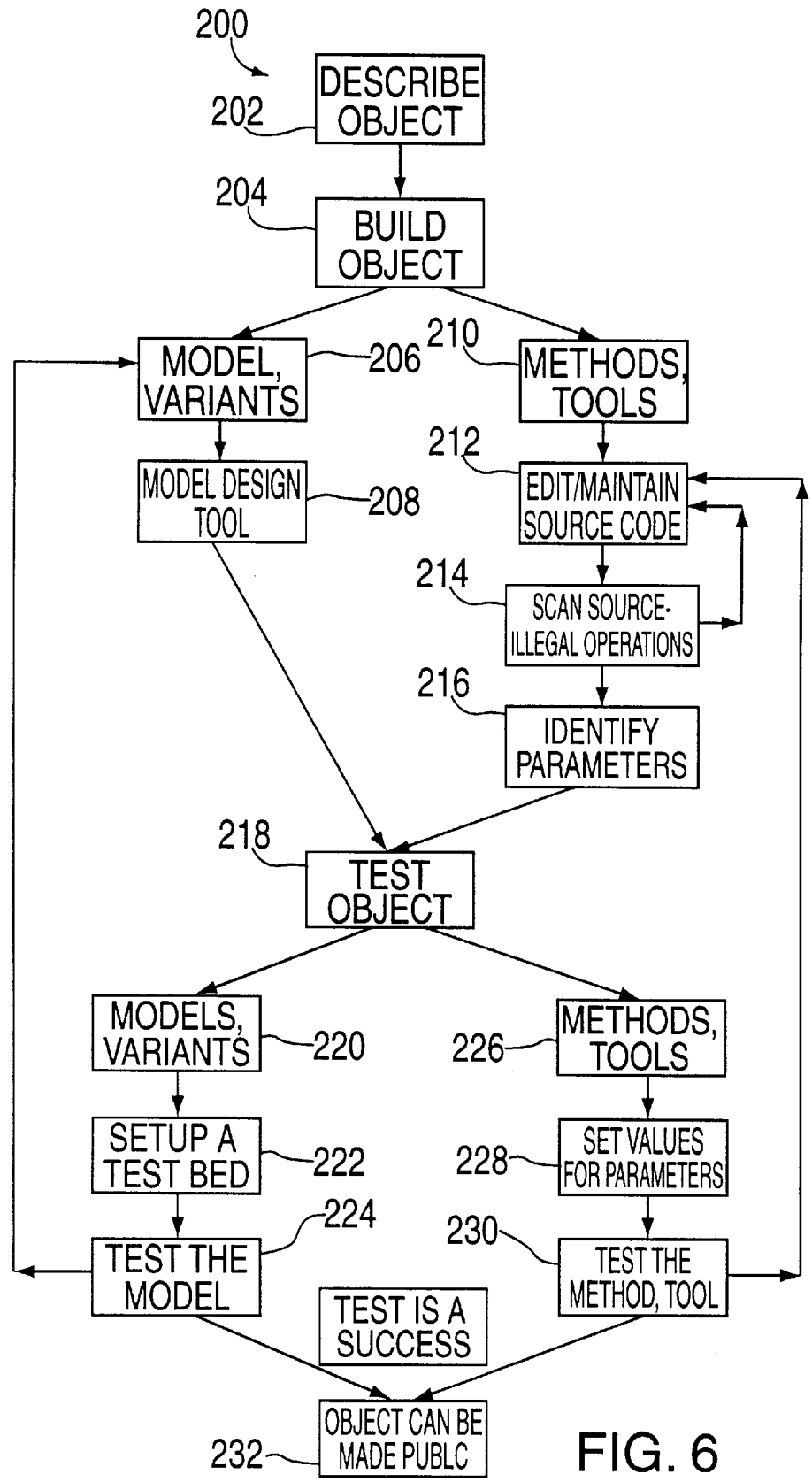
FIG. 6 shows a flowchart for registration of objects, including Models, in an embodiment of the present invention.

FIG. 6 shows a flowchart for an embodiment of a registration process 200 for objects, including Models. A registration process ensures that during an application development project all objects comply with certain constraints that permit their invocation by the RTEM 10 and their proper execution. The registration process 200 also facilitates testing of objects and, ultimately, applications that rely on the registered Objects. Objects that are registered may be invoked by more than one application. The registration process 200 begins at step 202 with a listing, by the developer, of data in the object. This data includes a unique object identifier ("ID"), for example a 32 character object registration ID (not shown in the Model template of FIG. 4). The data also includes a natural language (e.g., English) name, such as the "Example_template" described above in connection with Model template 140 of FIG. 4. The description also includes a unique language name (described in the central columns of the example Model template 140 of FIG. 4) and the Menu_example Model 170 in FIG. 5, as well as a type indicator, declaring that the object is a Model, method, Tool, data element, field, file or other object. The data in an Object may also include a Development Project Control Unit ("DPCU") ID, the author of the object, the ID and natural language name of an object to replace or redefine the Object, and a status flag indicating whether the object is in a Repository or Library.

A DPCU represents a logical block of development work and can be any subset of an application development project. According to one embodiment of the application development method of the present invention, a Development Object Registry has a DPCU assigned to it before it becomes usable. The assignment of a DPCU associates the Object to a particular Developer or Development Group to ensure integrity and quality of the Development Object. A DPCU data file may contain:

- a list of authors or developers of the Object;
- a list of Development Objects for which this DCPU is responsible;
- a list of Work Orders covered by the DPCU;
- a short description of Work for the Object;
- a long description of Work for the Object;
- a Registration Date for the Object;
- a Commencement Date for the Object;
- a list of Test Suites for the Object (described below); and
- an intended Wave for incorporation of the Object.

A Test Suite is essentially a list of DPCUs the Objects associated with which are included in a given "Test Session" (described below). This permits multiple application development projects (and, thus, the Objects they involve) to be tested simultaneously, even though the same software processes are involved. A Development Test Suite File, in an embodiment of the present invention, comprises:

- a list of DPCUs, and therefore an implied list of objects which are to be included in testing of the suite;
- a list of other Test Suites, if any, that are being combined in testing by the given Test Suite;
- a list of Registered Testers, for example a 6 character User/Associate code;
- a list of known Test Directories (described below); and
- the identity of a responsible quality assurance individual for the Test Suite.

A Test Directory is a location to hold the output of a Test Session. A Test Session is invoked at run time and involves any given Test Suite. Any file that is updated by a Test Session will be duplicated into the Test Directory and the update record/table placed into it and not into the Production version of the file. This process is described in connection with FIG. 7. Given that multiple Test Directories can be applied to a single Test Suite, individual testers have the option of operating independently of others that may be testing the same suite. A Test Directory in an embodiment of the present invention comprises:

- a Test Directory ID;
- a Test Suite; and
- a list of allowed testers.

Any number of Test Directories may be active at a given time, provided that only one Test Directory corresponds to a given Test Session. A Test Directory, as illustrated below in connection with FIG. 7, catches all write operations and updates to a database. This is true even if the original record was written in a Production, rather than a Test, environment and permits testing to be done in a Production Environment by specifying that a Test Session is progress.

The Database Access Controller (DBAC 24, 30, from FIG. 1) will automatically copy a production file record read during a Test Session if its format or element definitions are unchanged. The DBAC 24, 30 always first attempts to read the Test Directory, but otherwise reads the record requested from the production portion of the database. The use of the Test Directory precludes alteration of Production data during a Test Session. If the production file record read during a Test Session is changed in terms of its format or element definition, then any production record that is read or extracted will be written to the Test directory only upon normal output.

At run time, an operator who is developing an application may invoke a test session when confronted with a Menu screen. The Test Suite is selected from a list associated with that operator. The desired Test Directory is then selected from a list attached to that Suite and this operator. During the Test Session, various data are tracked, including but not limited to the following:

- jobs that have been run;
- database fields that have been accessed;
- operator keystrokes;
- errors encountered;
- testing comments entered by the operator; and
- test issues recorded by the operator.

Test Directories can be cleared, that is erased and reset, at any time; however, the results of the session are preferably stored in persistent storage for recordkeeping purposes.

When all objects have been tested, they can be made part of a "production wave" or simply be made available for legitimate use in a local application environment.

When a Test Suite has been approved following testing, all the Objects associated with it are transferred to "Production Status." In certain applications contexts, other criteria suitable for those contexts may be imposed prior to assigning Production Status to the Objects associated with a Test Suite.

Referring to FIG. 6, at step 204 the developer begins to build the object according to steps 206–216, to create a Model having a suitable format, an example of which was described in connection with FIGS. 4 and 5. When the object has been built, it may become part of a development registry.

An Object in a development registry can be termed a "Development Object" to distinguish it from a "Production Object," which is registered in a Production Repository or Library.

The nature of the registration process 200 may depend upon the type of object being registered. Models (Paradigm and Variant) are registered according to somewhat different considerations than methods and Tools.

Models (both Paradigm and Variant) can be created or modified, for example, by a Model Design Tool 208. If modifications are to be made, for example to an existing registered Model, the change will be made in the form of a Variant Model. Any number of Variant Models can be created that correspond to a given Paradigm Model.

Figure 6A:
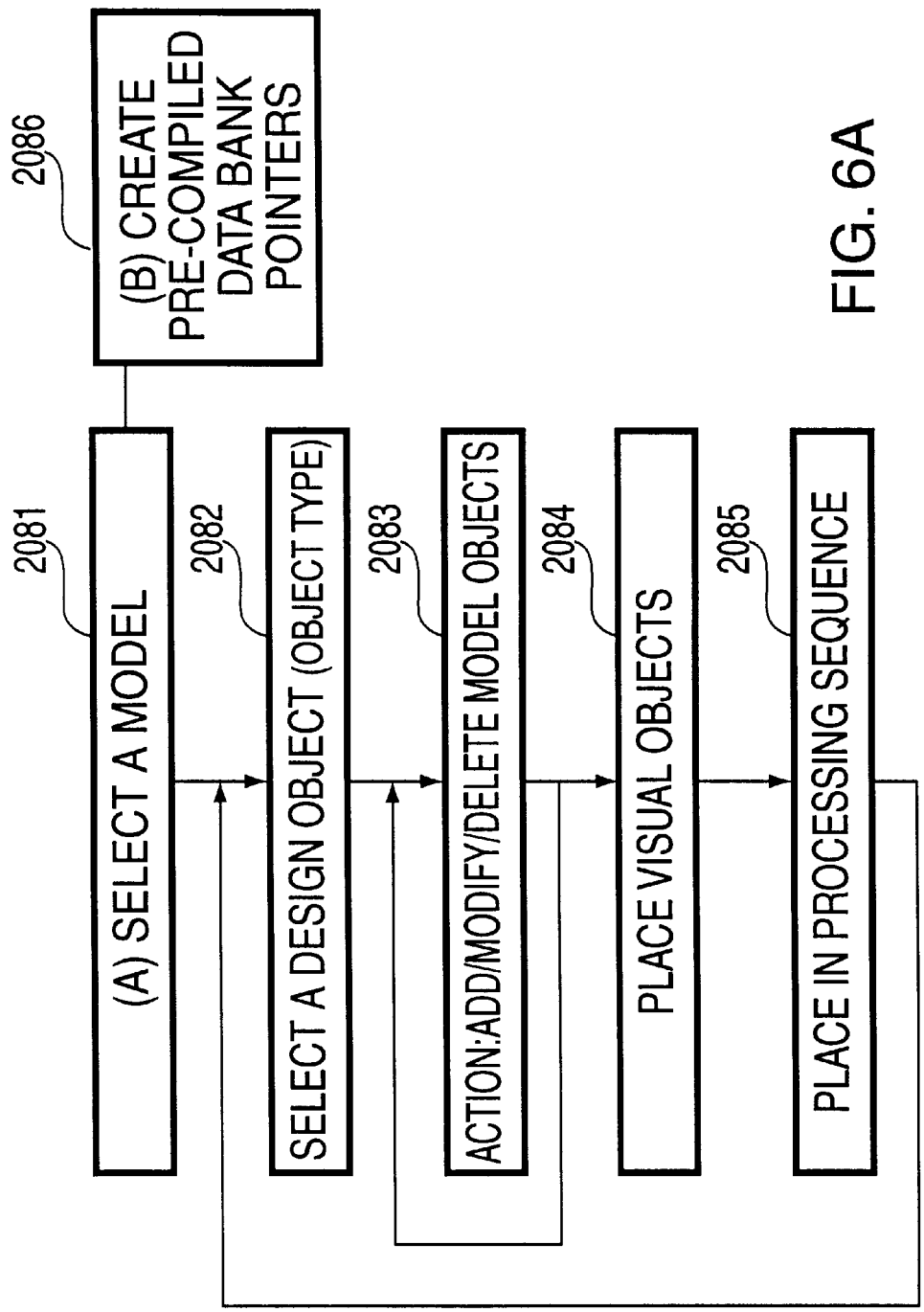
FIG. 6A shows a flowchart for the operation of a Model Design Tool used in connection with the registration process shown in FIG. 6.

A flowchart for the logic of an embodiment of a Model Design Tool 208 is shown in FIG. 6A. The Model Design Tool 208 first permits the application developer at step 2081 to select a Model from a list of existing Models or to create a new Model, which will be added to the existing list. If an existing Paradigm Model is chosen, the changes to the Model are stored as a Variant Model to the Paradigm Model. The Model Design Tool 208 then initiates a recursive loop to add all of the rules associated with the selected Model. The first step of this loop permits the selection at step 2082 of a design object, by type, to be part of the selected Model. Objects may be selected only from among those objects that are registered, that is, those that meet the requirements for objects to be processed by RTEM 10, as described herein. At step 2083, the application developer can add that object to the Model, and can also add parameters associated with the selected objects. Recall that, since the Model shall contain no code, the object is not really present in the Model; rather, the Model contains a reference to the selected object. In addition to adding an object to the Model, the application developer may Modify or Delete objects associated with the Model. By way of illustration, the application developer can select:

Data Definition—define data used in this Model and enter the element in the Data Dictionary 12 that this data definition points to (i.e., the field, from which file, or which data element);

Input—define user inputs, the data to store for user entries, the special action to take on different result code (if any);

Button—define the button definition, the label to display, the special action to take on different possible result code (if any);

Method—select the method to invoke and the parameters to pass (if any); enter the special action to take on different possible result codes (if any);

Toolusage—select toolusage to invoke and the parameters to pass; enter the special action to take on different possible result codes (if any);

Model—select the Model to invoke and the parameters to pass (if any); enter the special action to take on different possible result codes (if any);

Decision—enter conditions for this decision step (if any) and the special actions to perform (if any);

Exit

Roll Screen Activation—enter the visual rolling screen definition to use (roll screen refers to functionality to permit automatic scrolling upon data entry, especially involving repetitive entry of data in successive records); enter the special action to take on different possible result codes (if any);

Roll Screen Visual definition—define how many visual lines to "roll";

Box display—enter title of box (if any);

Text Display—enter text to be displayed.

The result of the process of step 208 up to now has simply been to make a list of the objects associated with a Model. To this point, however, the ordering of the objects in the list is simply according to the order in which they have been added to the Model. Next, at step 2084, the application developer may place a visual object in the Model. For example, if the design object selected an available visual component (e.g., a screen button), and the application developer wishes to add a screen Button or other object to the Model, the application developer designing the Model is prompted to "place" this object on the visual form (i.e., indicate where to display the button, or the size and positioning of a box). The object is selected from among a set of available options, which in general are those known in the art.

The application developer then, at step 2085, may re-order the objects in the Model to place them in the sequence that, when called by RTEM 10 according to that sequence, will be executed so as to effectuate the desired processing associated with the Model being designed. If the object selected above is a processing object (i.e., it invokes a Method), the application developer designing the Model can move this object to another position relative to the other processing objects. The default adds all new processing objects to the end of the parent sequence. If the application developer that is designing the Model wishes to make a Method (for example) a Pre-Process to another object, this is performed at this step 2085. Thus, for example, if an object is a Method and is to be a Pre-Process or a Post-Process for a particular parent object, then at step 2085 the appropriate relative ordering is imposed. The result of the process though step 2085 is a control list.

When a particular Model design process of portion A of the flowchart has been completed for a particular Model, the Model Design Tool 208, then at portion B of the flowchart, and according to known methods, RTEM 10 invokes a Model which creates pre-compiled data bank (PCDB) pointers (see reference numeral 96 in FIG. 3), which permit the RTEM 10 to access the actual Model. The RTEM 10 loads the data into the pre-compiled data bank 96 at the time of invoking the Model, so that the RTEM 10, when it has invoked a Model, can perform the rules specified during the Model design process. If the Model being maintained is a Variant Model, only the Variant Model information is stored and revisions are made to the Variant Model table that is attached to the Paradigm Model it updates (that is, declaring that a Variant Model exists and under what data condition to invoke it). The functionality of each of the steps in the Model Design Tool 208 can be implemented according to known methods.

Returning to FIG. 6, if Methods or Tools are to be registered, at 210, any editing or maintaining of source code for the methods or Tools is done at step 212. Next, the code (either source or object code) is scanned for illegal operations at step 214. The scan for illegal operations, in an embodiment of the invention, reads the code and tests for the presence of keywords, which are the names of illegal operations in the language that the code is written in. In general, when language is encountered that executes a transfer of control or an I/O operation (e.g., a call or a write, etc.), such language is identified as illegal and modification is required. In Business Basic, for example, the illegal operations include:

| | |
|---|---|
| ● CALL | ● EXTRACT |
| ● PERFORM | ● PRINT |
| ● WRITE | ● RUN |
| ● READ | ● INPUT |
| ● FIND | ● OBTAIN |
| ● CLOSE | ● OPEN |

The registration process 200, at step 216, also identifies parameters that were derived during the scanning process. Any variable that is assigned a value will be returned from the method. All others are passed in to the method.

All objects are then subject to a test object procedure beginning at step 218, where the type of the object is determined. For Models and variants (220) a TestBed is first set up at step 222. A TestBed allows the Model (or variant Model) to be tested using actual, or "live," data but without affecting the true files for that data. Rather, all data is automatically moved into the TestBed as required.

Figure 7A:
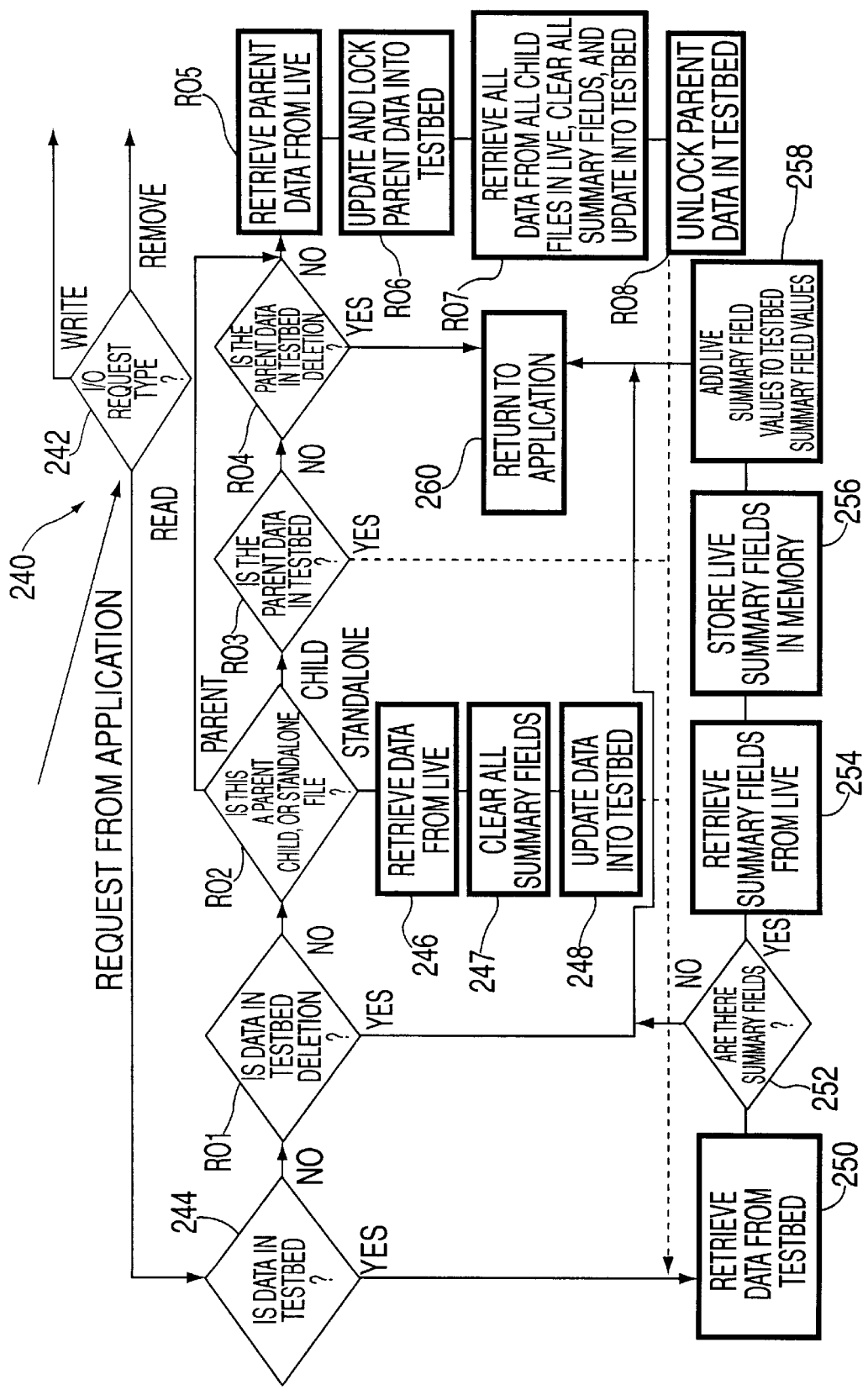
FIG. 7A shows a first portion of a flowchart for the creation of a Test Bed for use in testing Models during the application development or modification process in an embodiment of the present invention.

FIG. 7A shows a first flowchart for a TestBed method 240. When an application that is undergoing development and testing, specifically a Model that is part of the application that is being created or modified, requests at input or output ("I/O") operation, the TestBed method 240 is invoked. At step 242, TestBed Method 240 determines whether the Request is one for input (read), output (write) or deletion (remove).

If the request is one to conduct a read operation, then at step 244 the TestBed method determines whether or not the data to be read is in the TestBed. If so, the method retrieves the requested data at step 250. At this point, method 240 carries out several steps intended to maintain concurrence of a field that aggregates or sums multiple record details, which can be referred to as a "Summary Field." These steps, 252–258 (even), are invoked from more than one branch in method 240 and will be elaborated upon below. At step 260, processing returns to the application.

If the data sought via the read operation is determined at step 244 not to be in the TestBed, then the TestBed method determines, at step R01, whether the data to be read is in the TestBed Deletion file (also referred to simply as "TestBed Deletion"). The TestBed Deletion stores records that have been deleted during a test session, for the following reasons. A "Live" database (containing actual, rather than test, data, and which database may be referred to simply as "Live") is not altered during a test session. Moreover, any time a record does not exist in the TestBed it is retrieved from Live. A mechanism is therefore required to know about deleted records during the test session to prevent deleted records from reappearing in the TestBed, from the Live database, during the test session. That mechanism is provided by the TestBed Deletion file's storage of records that have been deleted during a test session. If data appears in TestBed Deletion, then the requested data is considered not to exist. No data is returned, and processing returns, at step 254, to the application.

If the data is determined, at step R01, not to be in the TestBed Deletion, the TestBed method determines, at step R02, if the file being read is a Parent, Child or Standalone file. A "Parent" is a file that has related information in one or more "Child" files. An example, in the logistics context, is an "Order" file. Order Header data may be placed in a Parent file, while information such as detail product lines, remark lines, and special charge lines may be placed in one or more Order Detail Child files associated with that Parent file. The Parent data can exist without the Child data, but the Child data cannot exist without the Parent data. A Standalone file is one that lacks a Parent-Child data relationship. If it was determined at step R01 that this file is a Parent file, processing continues at step R05.

The Parent data is retrieved from "Live" at step R05 and is written and locked to the TestBed at step R06. Each Child file has its data, relating to the Parent data, retrieved from the appropriate "Live" files and written to the appropriate TestBed files at step R07. Once this process is complete, the Parent data is unlocked in the TestBed at step R08, and the requested data is retrieved from the TestBed at step 250. Following steps 252–258, in which Summary Field data concurrence is maintained (as discussed below), processing returns to the application at step 254.

If the file was determined at step R02 to be Standalone, then, at step 246, the requested data is retrieved from the appropriate "Live" data source. When the data has been retrieved, all Summary Fields (described below) are cleared at step 247. Then the TestBed is updated, at step 248, by writing the retrieved data into the TestBed. The data is then retrieved from the TestBed at step 250 and, after maintaining data concurrence between the Live and TestBeds, in the Summary Field at steps 252–258 (even), processing returns to the application at step 254.

If, at step R02, it was determined that the file was a Child, then at step R03 a determination is made whether the Parent data exists in the TestBed. If so, the data is retrieved from the TestBed at step 250. Again, data concurrence in Summary Fields is maintained at steps 254–258 (even)(as described below) and processing returns to the application at step 254. If, for this Child file, the Parent data was determined at step R03 not to be in the TestBed, then a determination is made at step R04 whether the Parent data is in the TestBed Deletion at step R04. If so, the data is considered not to exist, and processing returns to the application at step 254. Otherwise, the Parent data is retrieved from "Live" at step R05 and is written and locked to the TestBed at step R06. Each Child file has its data, relating to the Parent data, retrieved from the appropriate "Live" files and written to the appropriate TestBed files at step R07. Once this process is complete, the Parent data is unlocked in the TestBed at step R08 and the requested data is retrieved from the TestBed at step 250. Processing now returns to the application at step 254.

Figure 7B:
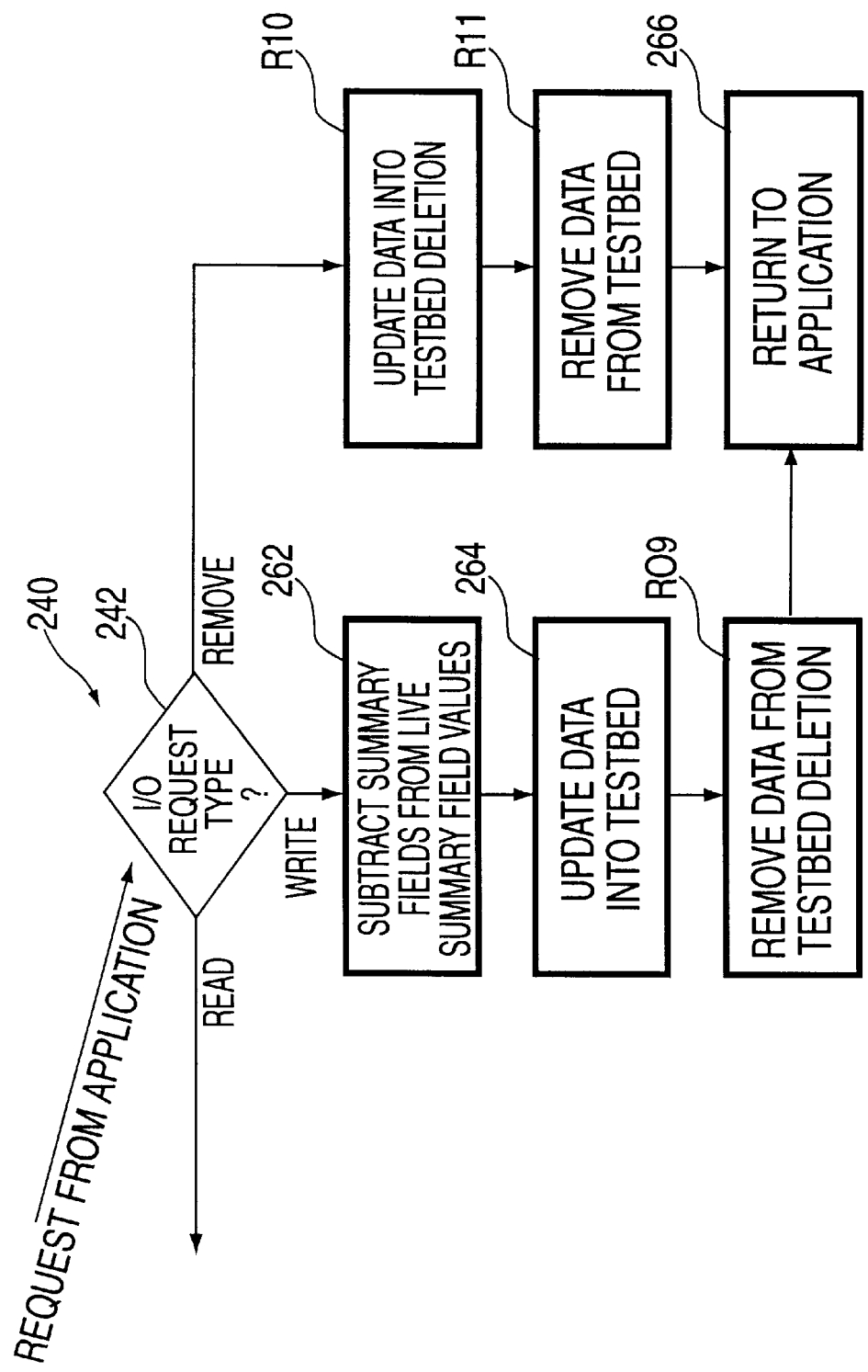
FIG. 7B shows a second portion of a flowchart for the creation of a Test Bed for use in testing Models during the application development or modification process in an embodiment of the present invention.

FIG. 7B shows a second flowchart for TestBed method 240. If the request is one to write data, as determined at step 242, then at step 262 the values associated with Summary Fields in the TestBed are subtracted from the Summary Field Values in the Live database. At step 264, the data to be written is updated into the TestBed database. Next, at step R09, any data in TestBed Deletion is removed. Processing then returns, at step 266, to the application.

At step 242, if the I/O request type was determined to be "remove", the data is updated into TestBed Deletion, at step R10. At step R11, the data is removed from the TestBed database. Finally, at step 266, processing returns to the application.

Referring back to FIG. 7A, steps 252–258 (even) are directed at maintaining concurrence, between Live data and the TestBed, of an aggregate variable according to the present invention. In an embodiment of this aspect of the invention, this variable is a "Summary Field," which is a quantity field that holds the sum of multiple records containing detail data. In an example relating to logistics, the Summary Field is a "Product Master" record that stores the total quantity of a given product that is in inventory, i.e., "On-Hand." The details of what is "On-Hand" are stored in records relating to Product Lot, and there may be thousands of Lots that apply to one Product record. In order to make a quick determination of the total quantity of a product that is On-Hand at a given time, the database is designed to store a total On-Hand quantity in the Product Master record. Each time a detail record relating to a Product Lot changes, the difference associated with the change is added to a Summary Field of the Product Master record.

When operating the TestBed, detail records can change in the Live database that can lead to the Summary Fields in the Live and TestBed databases being out of balance or lacking concurrence—incorrectly reflecting different values. This problem can occur unless all of the detail records are copied to the TestBed. This, however, might entail copying thousands of detail records in order to maintain the integrity and concurrence of a Summary Field, which could prove prohibitively inefficient and time consuming.

To address the problem a lack of concurrence between the Summary Field of the Live and TestBed databases, the TestBed stores in the Summary Field the total of all differences in the detail records that have occurred during the test session. To this quantity in the TestBed Summary Field is added the value in the Summary Field of the Live database. The TestBed stores only the changes made during a test session. If the record containing Summary Fields is written to the TestBed, but no changes have occurred to the Summary Fields during the test session, the Summary Field values in the TestBed will be zero regardless of the values in the corresponding Live database Summary Fields.

When the test session requests the reading of a record that contains one or more Summary Fields, these Summary Fields will be retrieved from the Live database. The values of these fields from the Live database are stored in memory for use during a Write request. The same record will be retrieved from the TestBed database upon such request and the values of the Summary Fields of the TestBed are added to the corresponding Summary Fields of the Live database. This summation produces the current values for the test session, which replace the existing memory values. The Summary Fields returned to the application thus are each the sum of the Summary Fields in the TestBed and the corresponding Summary Fields in the Live database.

When the test session requests the writing of a record that contains Summary Fields, the current values, as of the time of the request, are subtracted from the (previously current) Live database values that had been stored in memory during the read request. This subtraction yields the values of the differences resulting during the test session. When a record that contains Summary Fields is retrieved from the Live database and is updated into the TestBed for the first time, the Summary Fields are set to zero. All future changes to the Summary Fields will now store only the changes made in the test session.

Referring back to FIG. 7A, in each instance described above in which step 250 is reached, the processing associated with steps 252–258 (even) are carried out. At step 252, a determination is made as to whether any Summary Fields exist. If not, processing is returned at step 260 to the application. If Summary Fields do exist, then, at step 254, they are retrieved from the Live database. The Live Summary Field values are stored in memory, at step 256, and the Live Summary Field Values are added to the TestBed Summary Field Values at step 258. Processing is finally returned, at step 260, to the application.

Returning to Registration Process 200 in FIG. 6, when the TestBed has been set up at step 222, the Model (or variant Model) is tested at step 224. If a Model does not pass muster during the Model test process at step 224, then the process is repeated; the developer must modify the model using, for example, a Model Design Tool 208 and the object must be retested (steps 218 through 224).

If at step 218 a determination was made that the object currently going through the registration process is a Method or Tool (step 226), then at step 228 values for parameters of the Method or Tool are set. Once the parameters are set, then the Method or Tool is tested. Except for subroutines internal to the RTEM 10 (which are described below), no block of code (for example, no Method or Tool) may ever directly invoke any other block of code. This rule enables every block of code to be independently tested, even at run time while the code is in production.

Violations of basic principles of the present invention are caught during the registration process and prevented from being instantiated. Some examples of errant methods that would be detected and flagged during the registration process include: a Method containing code that would modify a protected variable; a Method that would invoke another Method; a Method that would take control away from the RTEM 10; and a Method that would cross domains, for example the database, presentation and processing domains.

If the Method or Tool undergoing the registration process fails the test procedure, control is returned to step 212, at which the developer of the application can edit the source code of the Method or Tool to correct whatever defect may have led to the test failure, and the registration process repeats from that step.

If the object passes the test either at step 224 (for Models) or step 230 (for Methods and Tools), then the object can be made "public," that is accessible to the RTEM 10 during the running of an application. To make an object public, the registration process creates link information, such as "where-used," "how-used", "when created," "when-deleted."

FIG. 8 shows a flowchart 300 describing the operation of an embodiment of an RTEM 10 according to the present invention. The RTEM 10 may be implemented in a third generation programming language ("3GL"), such as Business Basic, C, C++ or other suitable 3GL language.

The RTEM 10 oversees the running of an application which is specified by a set of Models registered according to a Registration process like the one set forth in FIG. 6. By way of an overview, the RTEM 10 loads an initial Model for an application that defines the initial operations, including calls to Methods, Tools and other Models. As the objects listed in each Model are read, conditions defined for that object are checked to determine whether they are met and, if so, the object is invoked. Given that, as described above in connection with the Registration process, a Registered object cannot call another object, control is always returned to RTEM 10 upon completion of the execution associated with the current object being processed. Between each object processing, the RTEM 10 can check special actions or external conditions and update conditions so that the Models constituting the application can be flexibly accessed according to conditions as they evolve.

Referring now to flowchart 300, at step 302 a first Model is loaded into memory. Referring to the example of a Model for a user-interface application menu provided in FIGS. 6A, 6B and 6C, model_menu data is populated at step 302 into local memory (i.e., Task Memory 90 in FIG. 1). This process may involve reading the Model using PCDB pointers 96 (in FIG. 3). This also involves linking a precompiled data bank pointer 96 for the Model's memory block into the VTAB 94 of Task Memory 90.

At step 310, RTEM 10 checks for the existence of variant Models associated with the Model that has just been loaded. The process associated with checking for the existence of variant models 310 is set forth in FIG. 9. Essentially, the RTEM 10 will check the conditions of all Variant Models that have been registered against the loaded Model to see if any currently apply given the state of the data at the time of the check; if a Variant Model currently applies, it will be loaded (by writing a pointer to it into PCDB 96) and merged with the Model data currently in memory.

FIG. 9 shows a flowchart 400 for this process. When step 310 is reached in flowchart 300, the RTEM 10 at step 402 retrieves the first (or, depending upon the iteration, the next) condition associated with the variant models for the Model that was loaded at step 302 in FIG. 8. Conditions are based on the data values in the Model. For example:

Condition 1:client$="ACME" and product$="BEACH-BALL"

Condition 2:product$="NET"

A table relates conditions to variant Models to be invoked when each condition exists. For example:

Variant Model 'A' and variant Model 'B' are activated when: client$="ACME" and product$="BEACH-BALL"

Variant Model 'C' is activated when product$="NET" The RTEM 10 will set the "current condition" to be checked to, for example, condition 1 and then to condition 2, and so on until all conditions have been checked against the current values of the data in the Model.

At step 404, the retrieved condition is checked against current data values (stored in dynamic variable table(s) 98 of Task Memory 90, shown in FIG. 1). For example:

if checking condition 1 and client$="ACME" and product$="BEACH-BALL" then Models 'A' and 'B' are active;

if client$ is not "ACME" or if product$ is not "BEACH-BALL"then Models 'A' and 'B' are not active.

If the retrieved condition checked at step 404 is satisfied or "passed" (step 406) then all variant Models that are to be invoked when the retrieved condition is satisfied are added at step 410 to a list of active variant Models stored in Task Memory 90 to be processed by the RTEM 10. For example:

active variant Models='A' and 'B'

If the retrieved condition checked at step 404 is not passed, or when all Variant Models corresponding to the current condition have been added to the list at step 410, then RTEM 10 checks at step 408 whether any more conditions must be checked for the current Model. If so, RTEM 10 returns to step 402 to retrieve the next condition in the list. If not, then at step 412 all variant Models that were added to the list in step 410 are loaded per the loading procedure described above. Any currently loaded Variant Models which are not present in the list of Active Variant Models created during the process of flowchart 400 are unloaded, so that the Variant Models for the current Paradigm Model consist only of the active Variant Models. This loading and unloading of Variant Models is described in greater detail in flowchart 500, shown in FIG. 10. Once the list of Active Variant Models has been established (during the procedure of flowchart 400), it is compared against the list of Variant Models that are currently loaded at step 502. This comparison establishes which Variant Models need to be activated (loaded), and which Variant Models need to be deactivated (unloaded).

At step 504, a check is performed whether there are any Currently Loaded Variant Models are not in the list of Active Variant Models. If no such Currently Loaded Variant Models that are not in the list of Active Variant Models, then no deactivation is required and control is passed to step 514, described below. If, however, there are one or more Currently Loaded Variant Models that are not in the list of Active Variant Models, then at step 506, the Current Variant Model to deactivate is set to the next in a list of those Currently Loaded Variant Models that are not in the list of Active Variant Models.

At step 508, Variant Model information for the Current Variant Model to deactivate is removed from a set of Control Variables. The RTEM 10 uses several such Control Variables to be able to identify which objects to process and the proper sequence in which to process them. The Control Variables are mainly lists of objects. If any object listed in the Current Variant Model to deactivate is identified in any of the Control Variable lists, the lists are modified to remove any such identification for those objects. For example, if object ID 'M020016TOR1_0000000000400401_" (32 character or other suitable code) corresponding to Current Variant Model to deactivate is present in the parent object sequence list (i.e., Control Variables), it will be removed from this list.

Next, all of the Variant Model's detailed data will be removed from the local memory, i.e., Task Memory 90, of Run Time Events Manager 10 at step 510. For example, if a Variant Model for a Paradigm Model contains a Method that was not in the Paradigm Model, the information about this Method (e.g., module, repository, Method name, etc.) would be in the Variant Model data; if that Variant Model is one to be deactivated, this information about the Method is removed from memory by unlinking Variant Model PCDB pointer, at reference numeral 96, from Task Memory 90, shown in FIG. 3.

A check is then made at step 512 whether any more Variant Models need to be deactivated. If so, RTEM 10 returns control to step 506; otherwise, or if at step 504 it was determined that there were no Variant Models to deactivate, a check is made at step 514 whether there are any Active Variant Models that are not in the list of Currently Loaded Variant Models. If the test result is positive, then at step 516 the Current Variant Model to load is set to the next Variant Model in the list of Variant Models to load.

A test is then made at step 518 whether the Current Variant Model is already loaded. If the Current Variant Model is already loaded, nothing needs to be done. If, however, the Current Variant Model is not already loaded, it will be loaded at step 522 with current control data. The RTEM 10 uses Control Variables to identify which objects to process and what sequence to process them in. Any new objects introduced by the Variant Model need to be merged with these Control Variables. This merge occurs at step 524. In order that the RTEM 10 will be able to determine when to activate a new Method that has been introduced by a Variant Model, the object ID for the new Method is added to the Control Variable. If the Method is a Pre-Process, it is added to the list of Pre-Process for the object that is the parent of the Method (e.g., in the notation of FIGS. 6A–6C, {parent object ID}.preprocs$). Once any new objects associated with the Variant Model have been merged with the Control Variables, or if at step 518 it was determined that the current Variant Model was already loaded, then RTEM 10 tests whether any more active Variant Models need to be handled. If so, RTEM 10 returns to step 516 to retrieve the next Variant Model. Otherwise, or if at step 514 it had been determined that no active Variant Models exist, then the logic is complete, at 526, and control returns either to step 310 of FIG. 8, or step 322 (addressed below), depending upon where the logical branch had originally occurred.

Assuming a return of control to the check for Variant Models at step 310 of the top-level RTEM 10 loop of FIG. 8, a variable identifying a current object is set at step 312 to the first object in that Model. As described above, the object may be another Model, a Method, a Tool or other object. The RTEM 10 retrieves the first parent object from a list of parent objects in the Model. Using the model-menu from FIGS. 6A–C:

first_object=lvsequence$(1,32)
First Parent Object

The RTEM 10 also checks for Pre-Process on the object; for example:

pre_processes={first_object}.preprocs$
List of Pre-Processes for First Parent Object If any Pre-Processes exist, the first object will be set to the first object in the Pre-Process list, otherwise it will remain as the first parent object. For example:

first_object=pre_processes(1,32)
First Pre-Process Object
current_object=first_object
Setting the current object to the first object At step 314, any conditions corresponding to the current object are checked against current data to determine whether the object is to be executed. If no condition is associated with the current object, RTEM 10 deems there to be a satisfied or "passed" condition. For example, using the menu_model example of FIGS. 6A–C:

evaluate {current_object}.condition$
Check Condition of Object

If the condition(s) for the current object are satisfied at step 314, then at step 316 RTEM 10 loads and displays any user interface-related information required by the current object. This step corresponds to a "Got Focus" process as that term is understood in the field of object oriented programming. For example, if the current object (which may be represented by the symbol current_object) is a user input object, such as a button or input field, the RTEM 10 compares the currently displayed visual form to the visual form on which the current object is displayed. If they are different, the new visual form will be loaded and displayed.

The current object is then invoked at step 318. The RTEM 10 checks the type of the object and executes the appropriate logic to invoke or otherwise make use of the object. For example:

{current object}.objecttype:

| | | |
|---|---|---|
| 1 = Method | - | set up parameters and invoke Method |
| 2 = Tool Usage | - | set up parameters and invoke Tool Usage |
| 3 = Model | - | set up parameters and invoke Model |

Thus, if the current object is a Model, then at 318a, the Model is loaded. If the current object is a Method, then at 318b the Method is invoked. If the current object is a Tool then the Tool is invoked at 318c.

When the object, if it is a Method or Tool, is finished executing, at step 320 RTEM 10 updates the user interface, if necessary. The RTEM 10 checks if any of the data that is displayed on the current form has changed. Any data that is displayed on the current form that has changed will be displayed.

Given that the state of relevant data may have changed during execution of the object, and that the changed data may affect which variants "apply," in view of the conditions for those variants, RTEM 10 checks once again, at 322, for variant Models according to the processing of flowchart 400. If any of the data has changed, the RTEM 10 performs a detailed analysis to determine if any variant Models that are currently loaded need to be unloaded and to load any newly activated Variant Models, as described in connection with flowcharts 400 and 500 of FIGS. 9 and 10, respectively.

RTEM 10 next checks at 324 for special actions. For example, if a Tool Usage were invoked to read information from the database and that information did not exist, a result code would be returned to the RTEM 10. A special action could be attached to this result code to set the next current object to be the object ID for a message that will inform the operator that this information is not in the database. For example:

{current_object}.result_code_000010="jump"
{current_object}.result_code_000010.resultobj$=
ObjectID of the message
{current-object}.result_code_000010.descriptn$="if record not on file, display message"

This action will set current object to the object ID specified in the variable {current_object}:

result-code_000010.resultobj$.

In this event, step 326 will then be skipped and control will be transferred to step 314.

If, when the condition(s) for the current object were checked at 314, the condition(s) was (were) not met, or if at step 324 the special actions did not already set the current object, the logic of step 326 will execute. If the RTEM 10 is currently processing a list of Pre-Processes to a Parent Object, the current object is set to the next object in the Pre-Process list. If there are no more Pre-Process objects, the current object is set to the parent object. Since the existence of an object to process means that processing is not complete, at step 328, control is returned to step 314.

If the RTEM 10 is currently processing a parent object, a check is made for any Post-Processes to the object (e.g., {current_object}.postprocs$). If there are no Post-Processes to the current object, RTEM 10 sets the current object to the next object in the parent list (lvsequence$). The object is checked to determine if any Pre-Processes are associated with the object. If so, the current object is set to the first object in the Pre-Processes list (e.g., current_object= preproc$(1,32)). If not, the current object will remain as the next parent object. If the RTEM 10 is currently processing a Parent Object and if the Parent Object has Post-Processes associated with it, the current object will be set to the first of these Post-Processes. If the RTEM 10 is currently processing Post-Processes and there are no more Post-Processes to execute, then the current object is set to the next parent object, which is checked for Pre-Processes (as described above). If, at any time, a Post-Process returns a positive result code that does not have a Special Action attached to it (reference numeral 324 in FIG. 8), the current object is set to the current object's parent object. This object is then checked for Pre-Processes. If any exist, the current object is set to the first Pre-Process. Again, the existence of the current object means that the test, at step 328, whether the process is done will evaluate negatively, thus control is returned to step 314.

If at 326 no more objects exist to execute, or if at step 324 a special action leads to an instruction to exit RTEM 10, the evaluation at step 328 evaluates positively and RTEM 10 exits at step 330.

A companion file that accompanies the Model run-time information stores a table of all conditions that activate all Variant Models. All Variant Models that are registered against a Paradigm Model update this table. Variant Models are registered against a Paradigm Model during the registration process when an operator applies a Model Design Tool of the sort described in connection with FIGS. 6 and 6A.

The format of this control table is as follows:

LVRTEM.VAR_TABLE$ this is a list of condition evaluations for each variation

LVRTEM.VARIATIONS$ this is a list of variation names that correspond to the lvrtem.var_table$ For example, three Variant Models for a given Paradigm Model (not shown) each apply under the following conditions:

Variant Model 'variant1':COUNTRY$="US"

Variant Model 'variant2':COUNTRY$="CA"

Variant Model 'variant3':CLIENT$="ACME"

The values of each condition used to activate a Variant Model are stored in the variable lvrtem.var_table. There is a place holder for each condition used for all variations. In the example provided there are three conditions, therefore there are three place holders in the Variation Table.

For variant1 to be active, COUNTRY$="US" must be true (represented by a "1"), COUNTRY$="ICA" must be false (represented by a "0"), and CLIENT$="ACME" can be true or false because it is not used to activate variant1 (represented by a "0").

The Variation Table for variant1 looks like:

lvrtem.var_table$="100"

For variant2 to be active, COUNTRY$="US" must be false (represented by a "0"), COUNTRY$="CA" must be true (represented by a "1"), and CLIENT$="ACME" can be true or false because it is not used to activate variant2 (represented by a "0").

The Variation Table for variant2 looks like:

lvrtem.var_table$="010"

For variant3 to be active, COUNTRY$="US" can be true or false because it is not used to activate variant3 (represented by a "0"), COUNTRY$="CA" can be true or false because it is not used to activate variant3 (represented by a "0"), and CLIENT$="ACME" must be true (represented by a "1").

The Variation Table for variant3 looks like:

lvrtem.var_table$="001"

The Variation Table used to know what Variations apply is built by adding all condition tables together. The Variation Table looks like:

lvrtem.var_table$="100"+"010"+"001"or lvrtem.var_table$="100010001"

The list of Variant Models is stored in the variable lvrtem.variations. The order of the variations is the same as the order of the condition table. For example:

lvrtem.variations$="variant1 variant2 variant3"

The condition to check to see what variations are active is stored in the variable lvrtem.var_check. The order of the conditions is the same order as the values in the condition table. An example:

lvrtem.var_check$="(COUNTRY$="US")+ (COUNTRY$="CA")+" (CLIENT$="ACME")

At run time, a variable is set to compare against the Variation Table to know what Variations apply. The variable is set using lvrtem.var_check and the current state of the variable in memory. The following provides an example.

Given that COUNTRY$="US" and CLIENT$="ACME" at run time the following run time table will be created:

lvrtem.varcurrent$=str(lvrtem.var_check$)

This evaluates the variables in memory against the Variation Table as follows:

(COUNTRY$="US")—True—represented by a "1"

(COUNTRY$="CA")—False—represented by a "0"

(CLIENT$=RACME")—True—represented by a "1"

which give the following run time table:

lvrtem.varcurrent$="101"

This run time table is compared against each of the tables for this Model stored in lvrtem.var_table$.

It is known that the length of the current time table is three characters, so the Variation Table is checked in chunks of three:

compare:

AND(lvrtem.var_table$,lvrtem.varcurrent$(1,3) is true, therefore the first variation in lvrtem.variations (variant1) is not active.

compare:

AND(lvrtem.var_table$,lvrtem.varcurrent$(4,3)) is false, therefore the second variation in lvrtem.variations(variant2) is not active.

compare:

AND(lvrtem.var_table$,lvrtem.varcurrent$(7,3)) is true, therefore the third variation in lvrtem.variations (variant3) is active.

In this example, if the "1"s in the Variation Table lvrtem.var_table match the "1"s in the corresponding position in the run time current variation table lvrtem.varcurrent, the Variation is considered to be active.

The term "Elastic Database," as used in this document, is intended to refer to a class of databases having the property of dynamic extensibility. Conventional file and record terminology is used in the following description, rather than relational database terminology. The embodiment of the Elastic Database described below is, without limitation, an illustrative example of one way of providing such a database. In the example, Base Records of an Elastic Database can be extended to include additional fields, and each of the Base Records can have a different set of extension fields.

An Elastic Database includes a Base File in the form of a conventional database file. In a conventional database, all the records in the Base File have the same number of fields, and each field has the same characteristics across the entire set of records. In the Elastic Database, this is called the Base Record. An illustrative example of a Base File and Base Record for an Elastic Database are shown in FIG. 11.

A primary benefit of an Elastic Database is its ability to allow the extension of Base Records with additional fields such that each Base Record can have a different set of extension fields. These extension fields are grouped in "Variation Sets" (elaborated upon below) for easier maintenance and use. Any Base Record may have zero or more Variation Sets that apply to it. The list of Variation Sets that apply to a given Base Record may change dynamically, under differing conditions, as the data in the Base Record. FIG. 12 provides an illustration of an example of two Variation Set definitions. The collection of the Base File and all Variation Sets which apply to that base file is called a "Logical File."

Figure 13A:
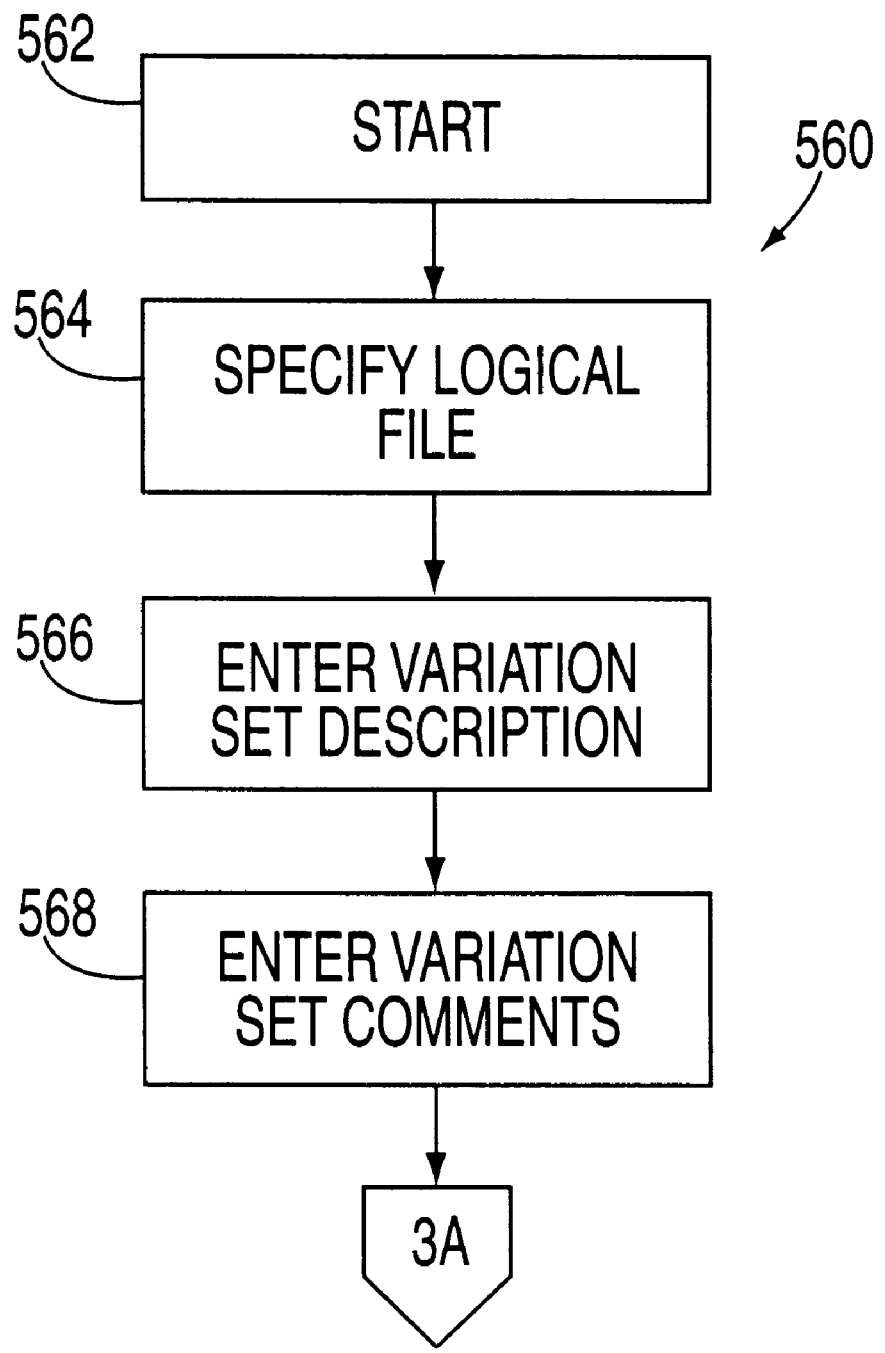
FIG. 13A shows a first portion of a flowchart describing the steps involved in defining a new Variation Set in an Elastic Database.
Figure 13B:
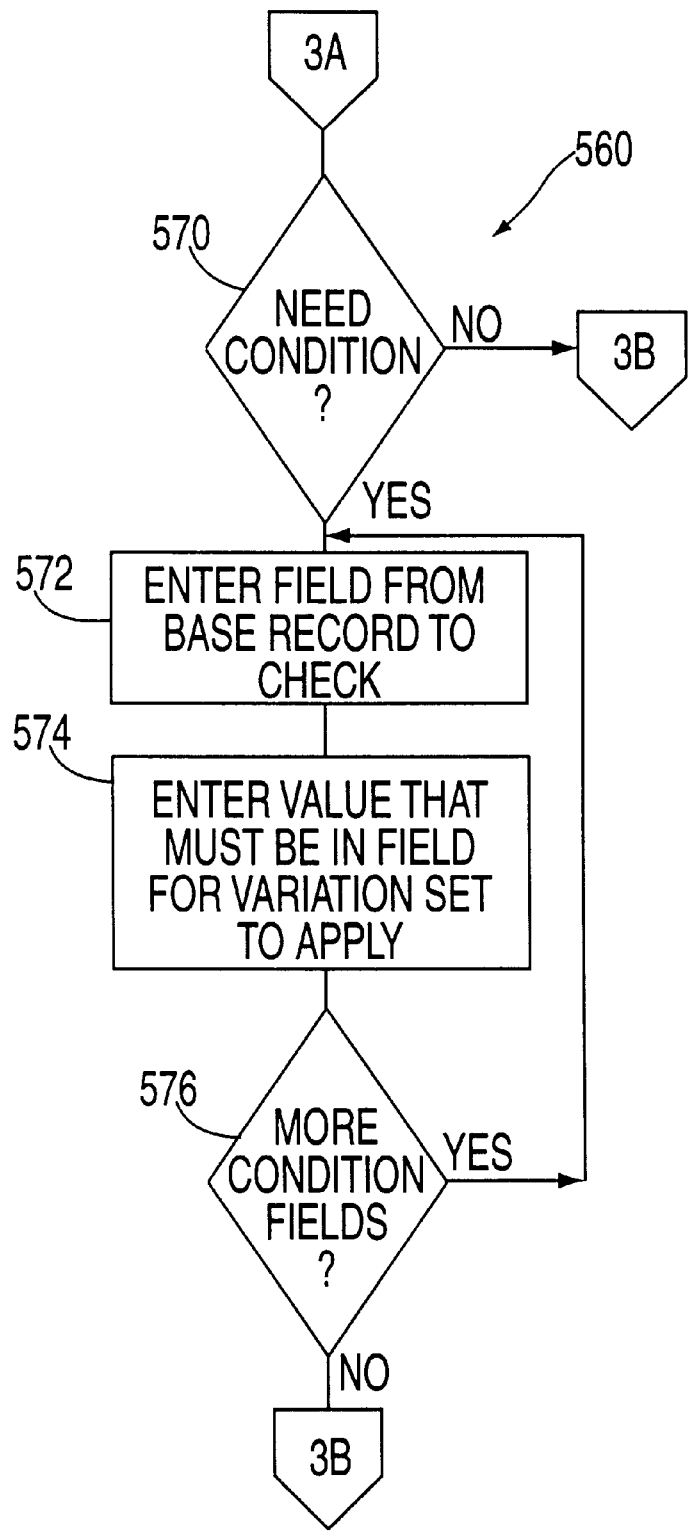
FIG. 13B shows a second portion of a flowchart describing the steps involved in defining a new Variation Set in an Elastic Database.
Figure 13C:
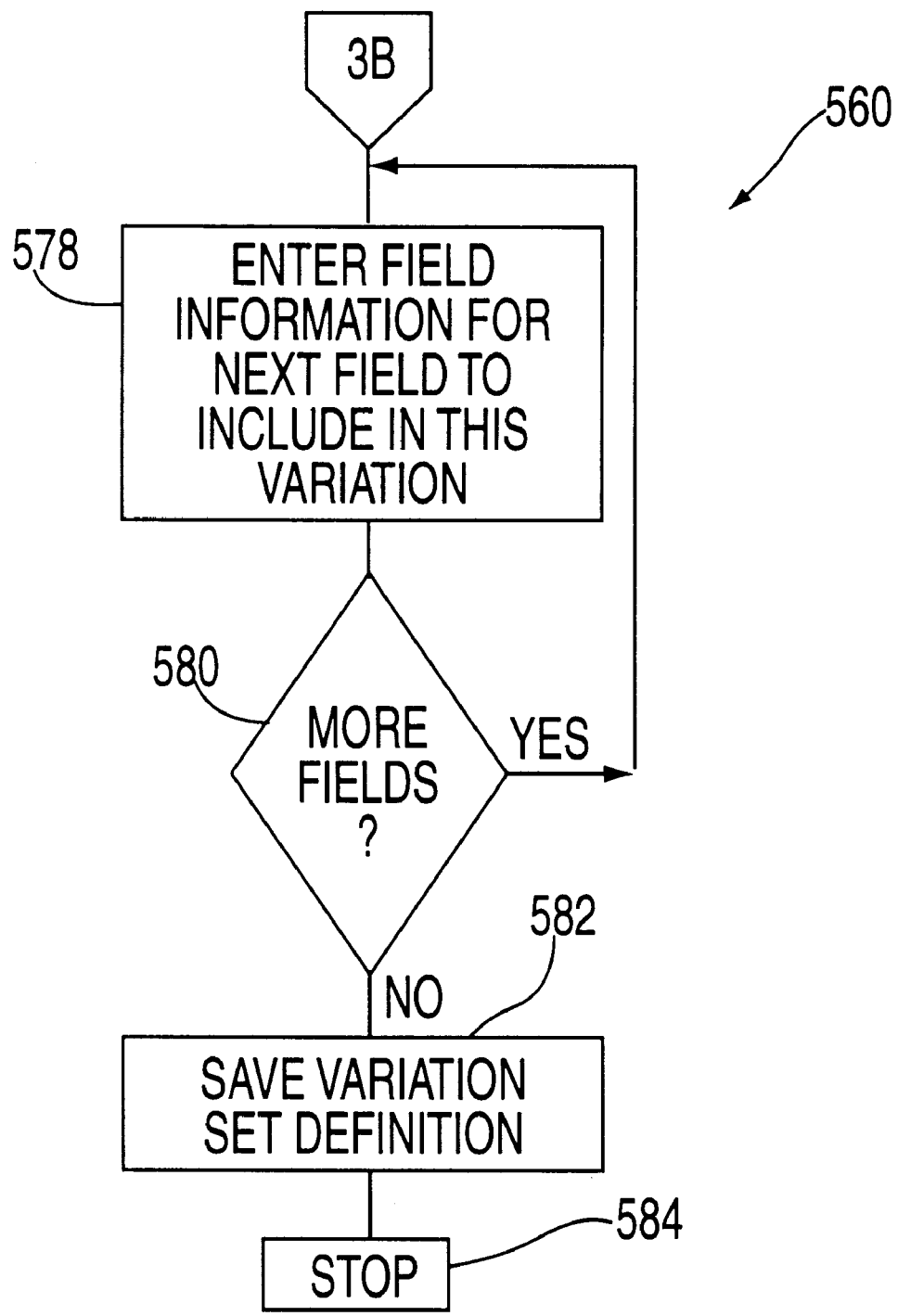
FIG. 13C shows a third portion of a flowchart describing the steps involved in defining a new Variation Set in an Elastic Database.

Once the base file is defined in the data dictionary 12 (FIG. 1), variation sets may be added to the Logical File definition. This is done through data dictionary maintenance. FIGS. 13A, 13B, and 13C show the steps involved in defining a new Variation Set. Each Variation Set is assigned an identifier by the data dictionary 12. For the Variation Sets illustrated in FIG. 12, described below, the identifiers are "0001" and "0002", respectively. Each Variation Set, contains a list of the fields that Variation Set contains, along with the attributes of each such field. In addition, each Variation Set may have a condition associated with it. This condition determines the base records to which the variation set applies. If a Variation Set has no conditions associated with it, that Variation Set applies to all Base Records.

Each condition sets forth a list of fields from the Base Record and the values each of them must contain for the Variation Set to apply. For example, if the Base Record contains a field called "client", a Variation Set may have a condition which indicates that the Variation Set applies only when the field "Client" contains the value "BENJAM".

FIGS. 11 and 12 provide an example of a Base File and Variation Sets. In FIG. 11, the Base File corresponds to the Logical File "sam_client" which is a file that stores client names and addresses and which can be accessed by reference to the Data Source Table Name "sam_dbclient", corresponding to the Database Tables/File 126 in FIG. 3. The Base Record of the Base File contains five fields: client, name, country, street and city, each having its own description, type and size. FIG. 12 shows two examples of Variation Sets corresponding, and attached, to Logical File "sam_client", shown in FIG. 11. The first example is Variation Set 0001, which bears the Description "Canadian Information." A condition for the application of this variation set requires that Base Record Field Name "country" have the value "CA"—indicating Canada. Upon this condition, the Base Record includes not only the five fields set forth in FIG. 11 for the Base Record, but also two additional fields: "postal_cd" (referring to a six digit postal code) and "province" (referring to a two-character provincial code). In other words, this Variation Set applies to all Base Records which meet this condition; appending the Variation Set records associated with that Variation Set. The second example of a Variation Set in FIG. 12 is identified as Number 0002 and bears the description "U.S. Information." The condition for application of this Variation Set is that the Base Record Field Name "country" have the Base Record Field Value "US". If this is the case, then the Base Record is extended to include two new Fields: "zip-code" (referring to the U.S. ZIP code) and state code (referring to a two-character U.S. state code or abbreviation). This example illustrates the Elastic Database's ability to extend to create new fields under differing data conditions.

Each Variation Set's data is stored in a companion file to the Base File. These companion files are transparently maintained (and created, as required) by the Data Base Access Controller 24, 30 (FIG. 1). The primary key for each companion file is identical to the primary key of the base file, as there is a one-to-one relationship from any base record to each Variation Set record which applies to that Base Record.

The DBAC 24, 30 uses a small table called a Variation Set Run-Time Map (VRTM) to determine which Variation Sets apply at run time. The DBAC 24, 30 Run Time Variation Table is the same structure as the RTEM 10 Model Variation Run Time table referenced above in connection with the description of FIG. 5.

Where three variations apply to the Logical File, an example Variation Set Run Time Map is as follows:

| Variation (Variation Group List) | Condition (Condition Field List) | Evaluation Code (Condition Group List) |
|---|---|---|
| 0001 | When COUNTRY = US | 100 |
| 0002 | When COUNTRY = CA | 010 |
| 0003 | When CLIENT = ACME | 001 |

In this example, all evaluation codes are of a binary form in which only one digit is a 1.

The Run Time Expression Table is as follows:

(COUNTRY$="US")+(COUNTRY$="CA")+(CLIENT$="ACME")

As an example, the following data is assumed to reside in memory after the Base Record:

CLIENT="ACME"

COUNTRY="US"

Using the Evaluation Code Table to obtain the evaluation codes given the existing data, and plugging the evaluation codes so obtained into the Run Time Expression Table:

(COUNTRY$="US"))+(COUNTRY$="CA")+(CLIENT$="ACME")

a Run Time Evaluation Code is generated: "101". To show the actual binary mathematical operation:

position 1: COUNTRY$+"US" is TRUE represented as "1"

position 2: COUNTRY$="CA" is FALSE represented as "0"gives the result: "101".

When a term in the Expression Table is not met—e.g., here the country is not Canada (CA)—the evaluation code is zero, e.g., 0. Because of the evaluation of COUNTRY="CA" is the second condition, the evaluation of this condition is stored in the second position of the binary output, 101.

The resulting Run Time Evaluation Code is compared against a table demonstrating a correspondence between an evaluation code and the variations are active given that code. The active variations are those that have a "1" in the same positions as th e Ru n time evaluation code. The following is an example of such a table:

| Run Time Evaluation Code | Variation | Variation Table | Active? |
|---|---|---|---|
| 101 | 0001 | 100 | Yes |
| 101 | 0002 | 010 | No |
| 101 | 0003 | 001 | Yes |

There is one such table corresponding to each Logical File. Variation Sets may be in one of two states: active or inactive. A newly created Variation Set is inactive until explicitly made active. When a Variation Set is made active, information about that Variation Set is added to the VRTM, so that the DBAC 24, 30 knows about the Variation Set and uses it when appropriate. When a Variation Set is made inactive, information about that Variation Set is removed from the VRTM, so the DBAC 24, 30 no longer knows about the Variation Set and therefore does nothing with it.

The following pieces of information are stored in the VRTM:

1) The Condition Field List (CFL)

A list of all fields that are involved in all Variation Set conditions. This list is used to generate very quickly a string that contains the current values of all fields involved in Variation Set conditions. The generated string is called the Condition Values String (CVS).

2) The Condition Group List (CGL)

A group of strings representing possible data values or patterns. At run-time, the CVS is compared against each pattern in turn. If the CVS matches the pattern, the position of the pattern in the CGL is used as an index into the variation group list (see below).

3) The Variation Group List (VGL)

A list of groups of Variation Set numbers. Looking up this list with the index of the CGL which the CVS matches gives a list of Variation Sets that apply to the Base Record currently in memory.

The VRTM can also include other internal housekeeping and status information.

Figure 15:
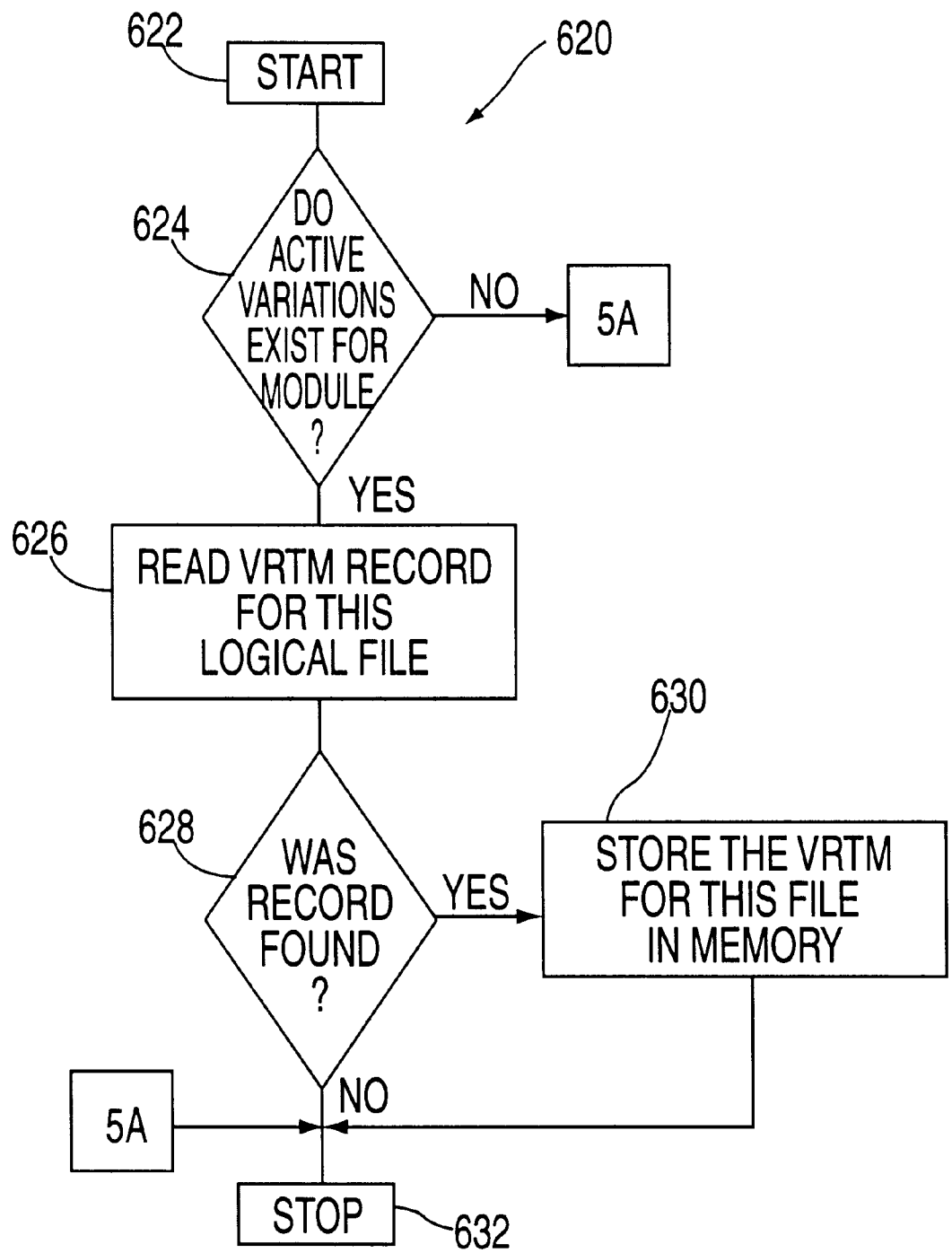
FIG. 15 shows a flowchart describing the process of opening a Logical File in an Elastic Database.

Before the DBAC 24, 30 can perform any function for any Logical File, it must have access to the data dictionary 12. The DBAC 24, 30 uses information from data dictionary 12 to find Logical Files and their physical data sources. When the DBAC 24, 30 is invoked to fulfill a request for a Logical File, the DBAC 24, 30 will open the data dictionary 12 for that Logical File's module, if that data dictionary 12 is not yet open. Once the base data dictionary 12 is open, the DBAC 24, 30 checks for a variation registry and Variation Set run-time map. The above process of opening the data dictionary is shown in FIG. 15.

Figure 16A:
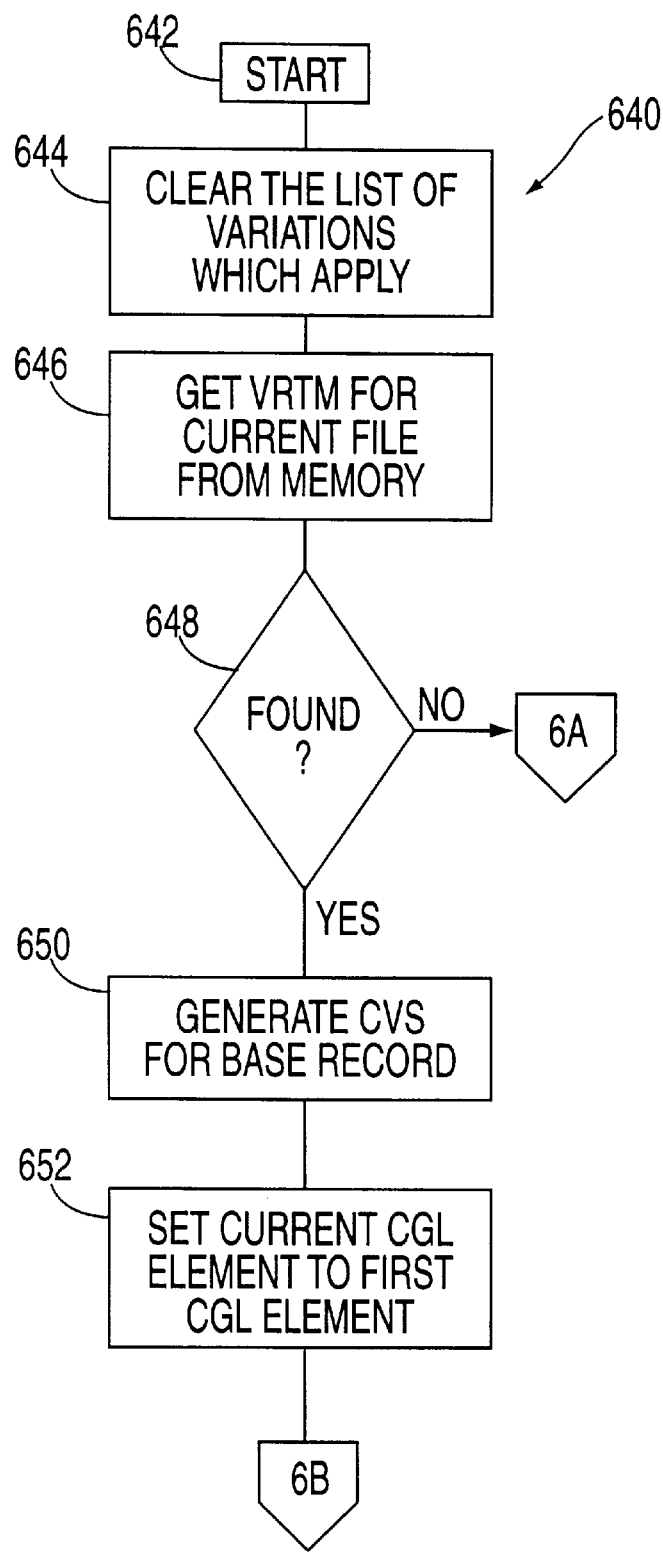
FIG. 16A shows a first portion of a flowchart describing the process of determining which Variation Sets apply to a chosen base record in an Elastic Database.
Figure 16B:
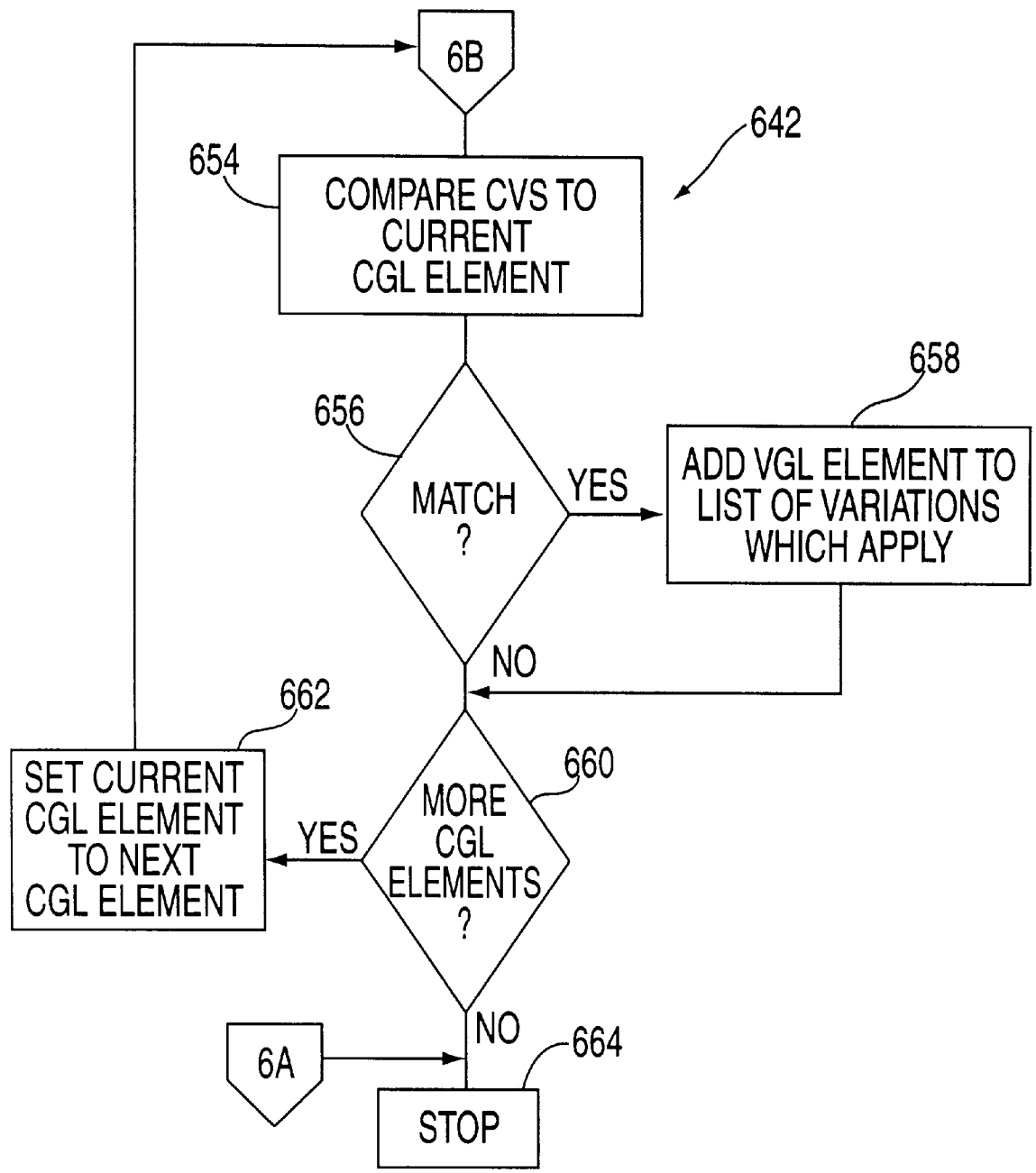
FIG. 16B shows a second portion of a flowchart describing the process of determining which Variation Sets apply to a chosen base record in an Elastic Database.

The process of reading records from the Elastic Database proceed as follows: At run-time, the DBAC 24, 30 reads the base record from the base file. Once it has done this, it looks in the Variation Set run-time map to determine which Variation Sets apply. FIGS. 16A and 16B show the steps the DBAC 24, 30 uses for this task. If there are Variation Sets which apply, the DBAC 24, 30 then reads the data for each Variation Set from the appropriate companion file. If a record is not found in the appropriate companion file, the fields for that Variation Set are set to null. This will be the case for base records that already existed before the Variation Set was added.

Since the Variation Sets which apply to a base record may change dynamically as the data in the base record changes, the DBAC 24, 30 returns to the application not only the base record and Variation Set data, but also the list of fields in the base record and whatever Variation Sets applied. This allows the application to determine which fields are present in the logical record, and present that information to the operator as required.

The process of writing records to the Elastic Database proceed as follows: At run-time, the DBAC 24, 30 looks in the Variation Set run-time map to see which Variation Sets apply, in accordance with FIGS. 16A and 16B. The DBAC 34, 30 then writes the Variation Set data to the appropriate companion files, then writes the base record data to the base file. If some Variation Sets which applied when the record was read no longer apply when the record is re-written, the DBAC 24, 30 removes that out-of-date Variation Set data from the appropriate companion files.

A record in the Elastic Database may be removed by the following process: At run-time, the DBAC 24, 30 reads and locks the record to be removed, and determines which Variation Sets, if any, apply to the base record, in accordance with FIGS. 16A and 16B. That Variation Set data is removed, and the base record is removed.

Once the Base File is defined in the Data Dictionary 12, Variation Sets may be added to the Logical File definition. This is done through maintenance of data dictionary 12. Each Variation Set is assigned an identifier by the data dictionary 12. Each Variation Set definition contains a list of the fields that the Variation Set contains, along with the attributes of each field.

In an embodiment of the present invention, referring to FIG. 13A, a Variation Set may be defined according to procedure 560, which begins at step 562. First a Logical File is specified at step 564. A description of the Variation Set is then entered at step 566, along with comments, at step 568. Referring to FIG. 13B, a test is done at step 570 to determine whether a condition needs to be specified for the Variation Set. If so, the field from the Base Record to be checked for that condition is entered at step 572. Also, at step 574, the value that must be in that field for the condition to be met and the Variation Set to apply is entered. A check is then made, at step 574, whether any more condition fields exist. If so, processing returns to step 572. If not, or if at step 570 no conditions needed to be specified, processing proceeds to step 578, in FIG. 13C. At step 578, the field information is entered for the next field to be included in the present Variation Set. A check is then made, at step 580, whether more such fields are to be included. If so, processing returns to step 578. If not, the Variation Set definition is saved, at step 582, and the procedure 560 terminates at step 584.

Before the DBAC 24, 30 can perform any function for any Logical File, it must have access to the Data Dictionary 12. The DBAC 24, 30 uses data dictionary 12 information to find Logical Files and their physical data sources. When the DBAC 24, 30 is invoked to fulfill a request for a Logical File, the DBAC 24, 30 will open the data dictionary for that Logical File's module, if that data dictionary is not yet open. Once the base dictionary is open, the DBAC 12 checks for a variation registry and Run Time Map, as shown in FIG. 14.

Figure 14:
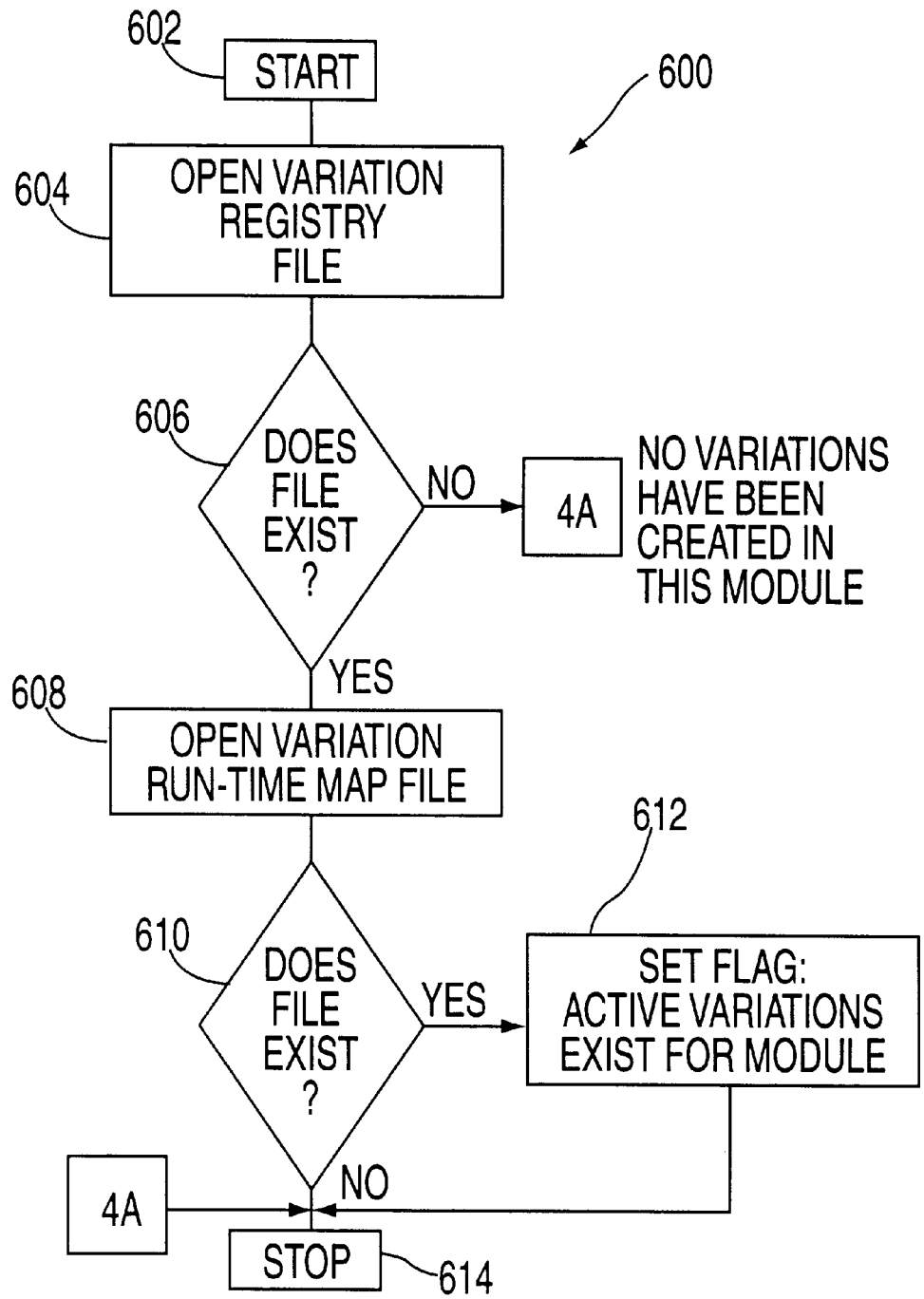
FIG. 14 shows a flowchart describing the process of opening a data dictionary in an Elastic Database.

Referring to procedure 600, illustrated in FIG. 14, after starting at 602, a Variation Registry File is opened at step 604. Next, a check is made at step 606 as to whether such file exists. If so, procedure 600 opens a Variation Run Time Map file at step 608. A check is then made, at step 610, whether the Variation Run Time Map file exists. If so, at step 612 a flag is set indicating that active Variations exist for this module. If the test failed at either of step 606 or step 610, procedure 600 terminates at step 614.

Before a Logical File may be accessed for reading or writing, it must first be opened. When a Logical File is opened, the DBAC 24, 30 immediately loads the Variation Set Run Time map for that Logical File into memory as shown in FIG. 15. Referring now to that figure, the opening of a file may be performed according to procedure 620, starting at step 622. At step 624, a determination is made whether any active Variations exist for the Logical File. If so, the record of the Variation Set Run Time Map that relates to this Logical File is read at step 626. If, as determined at step 628 a record was found, then at step 630, the Variation Set Run Time Map for this file is stored in memory. If no record was found at step 628, or if at step 624 no active Variations were found to exist for this Logical File, processing stops at step 632.

At run time, the DBAC 24, 30 read the Base Record from the Base File. Once it has done this, it looks in the Variation Set Run Time map to determine which Variation Sets apply. FIGS. 16A and 16B, described below, show an example of the steps the DBAC 24, 30 may use to accomplish this task.

If any Variation Sets apply, the DBAC 24, 30 reads the data for each such Variation Set from the appropriate companion file. If a record is not found in the appropriate companion file, the fields for that variation set are set to null. This will be the case for Base Records that already existed before the Variation Set was added.

Since the Variation Sets which apply to a Base Record may change dynamically as the data in the Base Record changes, the DBAC 24, 30 returns to the application not only the Base Record and Variation Set data, but also the list of fields in the Base Record and whatever Variation Sets applied. This allows the application to determine which fields are present in the Logical Record, and to present that information to the operator, as required.

At run time, the DBAC 24, 30 looks in the Variation Set Run Time map to see which Variation Sets apply. An example of this process is provided in FIGS. 16A and 16B, described below. The Variation Set data is then written to the appropriate companion files and the Base Record data is written to the Base File.

If some Variation Sets which applied when the record was read no longer apply when the record is re-written, the DBAC 24, 30 removes that out-of-date Variation Set data from the appropriate companion files.

At run time, the DBAC 24, 30 reads and locks the record to be removed, and determines which Variation Sets, if any, apply to the Base Record, as illustrated in the example of FIGS. 16A and 16B. Tha Variation Set data is removed, then the Base Record is removed.

Referring now to FIG. 16A, an example of the foregoing, procedure 640, is illustrated. After beginning at step 642, procedure 640 clears the list of Variations which apply at step 644. Next, it retrieves the Variation Set Run Time Map for the current file from memory at step 646. If the Variation Set Run Time Map for the current file is found, at step 648, then at step 650 a CVS (current Variation Set) is generated for the base record. The CVS is the current run time bitmap evaluation of the conditions used to know about what Variations apply. This is analogous to lvrtem.varcurrent, described above, but would be called lvdbac.varcurrent in this example. In other words, the CVS is the value of the current data to be checked against the Variation Table to know what Variations currently apply. Next, at step 652, the current CGL (Condition Group List) is set to the first CGL element. The CGL is analogous to lvrtem.var_table, described above, and would be called lvdbac.var_table in this example. The CVS is compared against this Table to know what Variations apply.

Referring to FIG. 16B, a comparison is made at step 654 between the CVS and the current CGL element. If there is a match, as determined at step 656, then, at step 658, a VGL (Variation Group List) element is added to the list of Variations which apply. If no match is found at step 656, then a check is made, at step 660, to determine whether there are any more CGL elements. If so, then the current CGL element is set to the next CGL element at step 662, and processing returns to step 654. If no more CGL elements were found at step 660, then processing stops at step 664. If, at step 648 in FIG. 16A, no Variation Set Run Time map was found, then no Variations are currently active for this Logical File. In this event, too, processing halts at step 664.

The DBAC 24, 30 Supertoolkit described above and in connection with FIG. 1 has several entry points. Each entry point corresponds to a function that the DBAC 24, 30 provides, and that the RTEM 10 may invoke the DBAC 24, 30 to perform. In one embodiment, the DBAC 24, 30 has ten entry points; the logic for an example of each is described in turn.

Figure 17A:
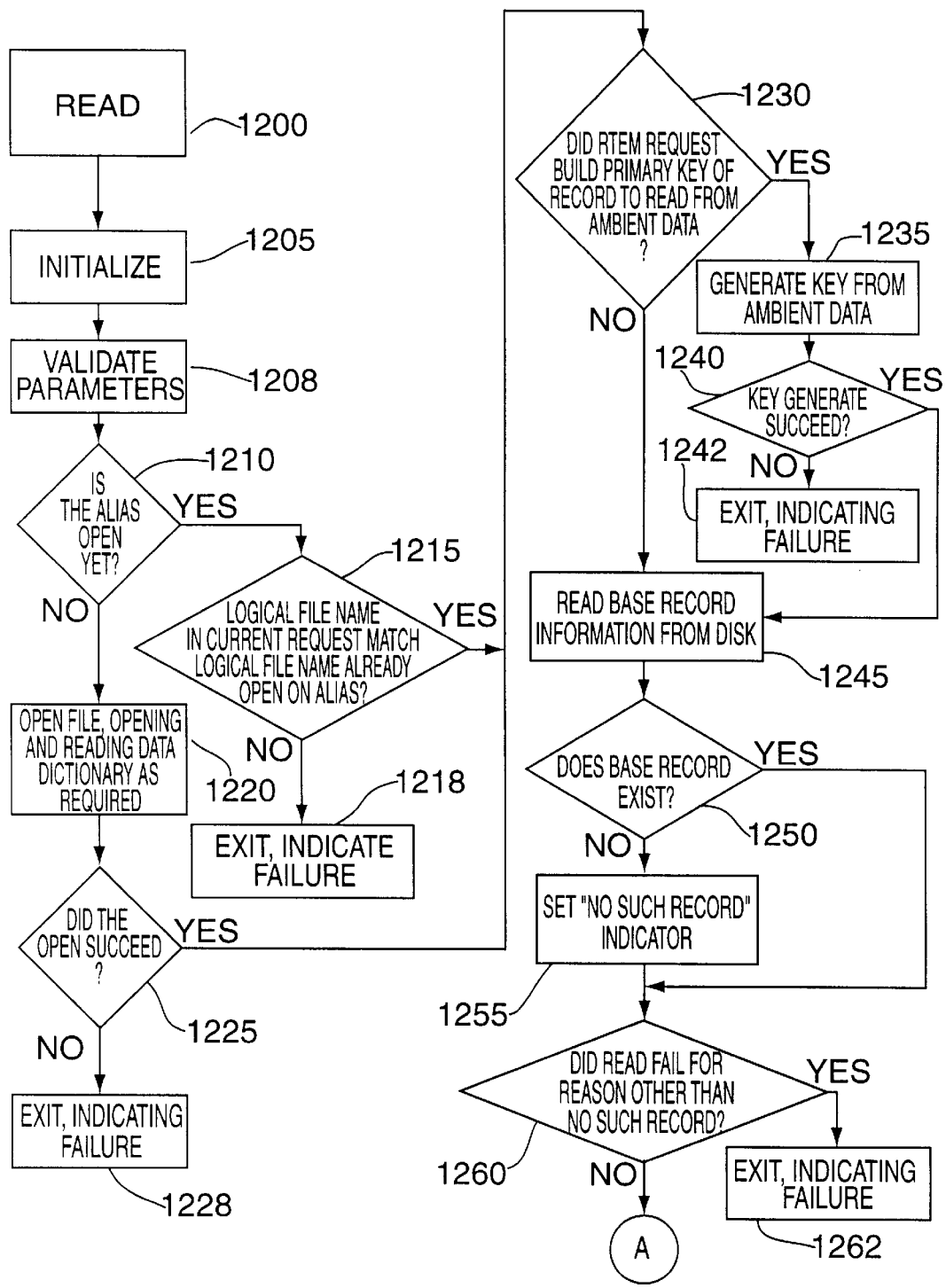
FIG. 17A shows a first portion of a flowchart describing the steps involved in the "READ" function of the database access tool.
Figure 17B:
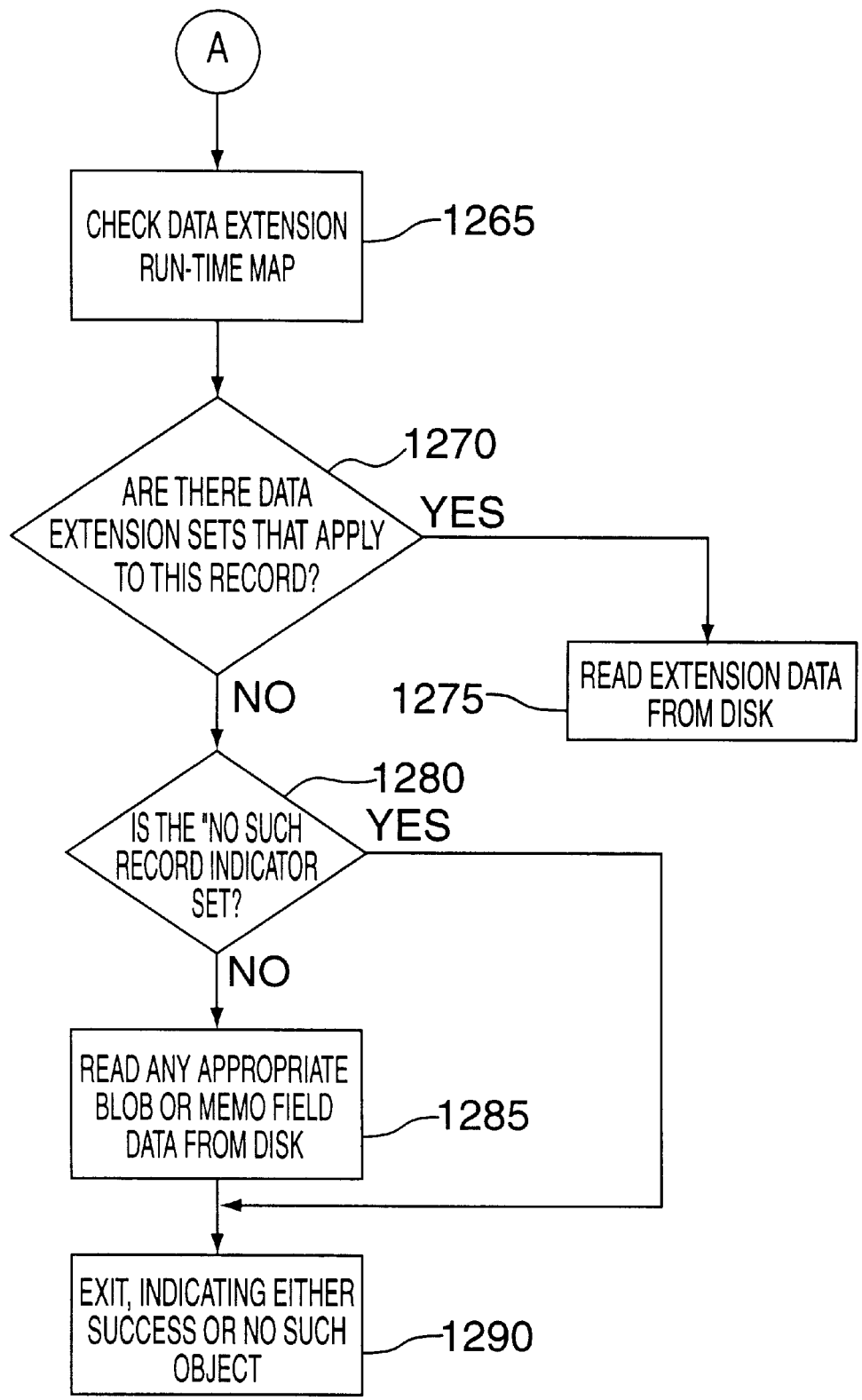
FIG. 17B shows a second portion of a flowchart describing the steps involved in the "READ" function of the database access tool.
Figure 18A:
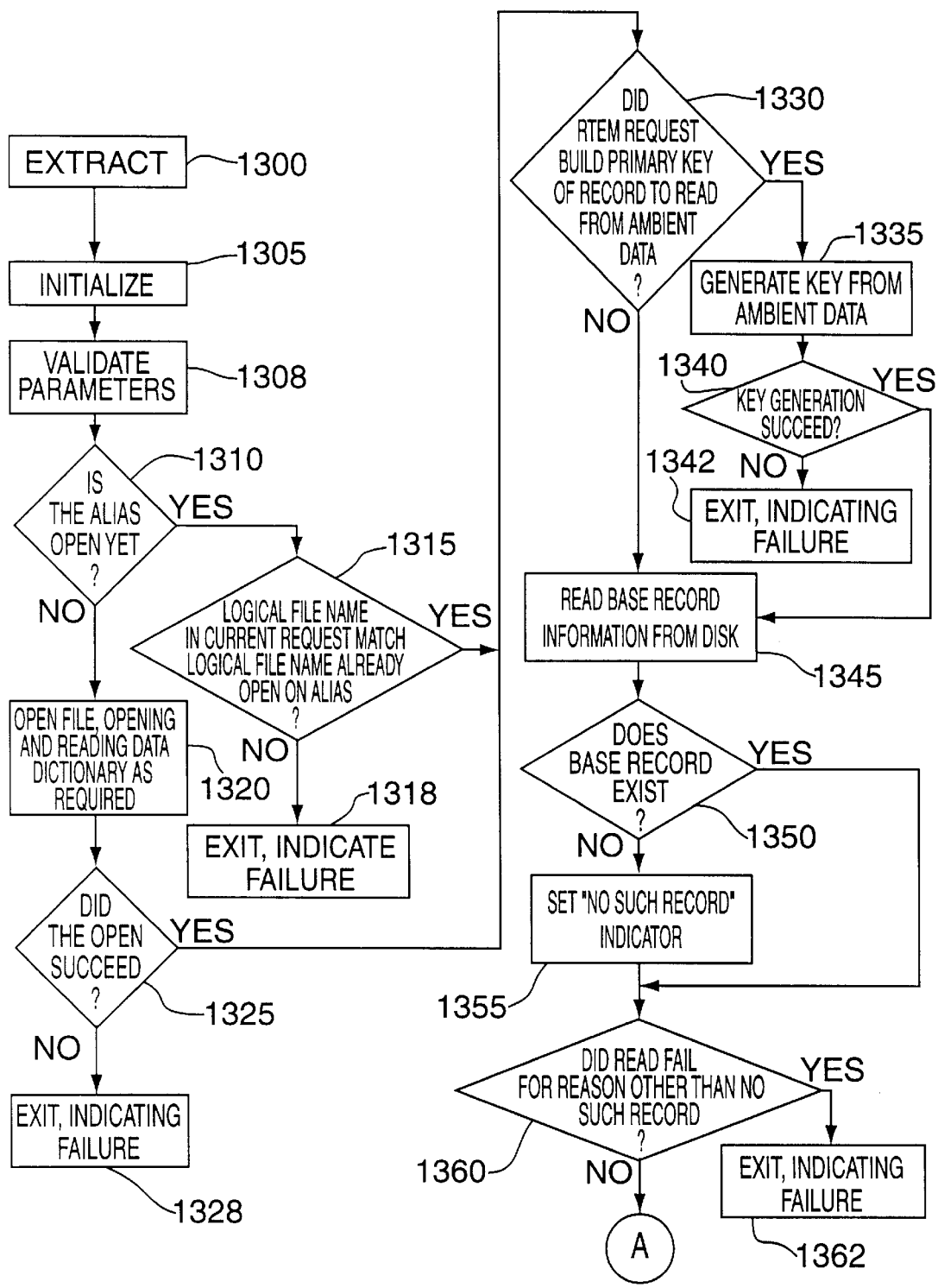
FIG. 18A shows a first portion of a flowchart describing the steps involved in the "EXTRACT" function of the database access tool.
Figure 18B:
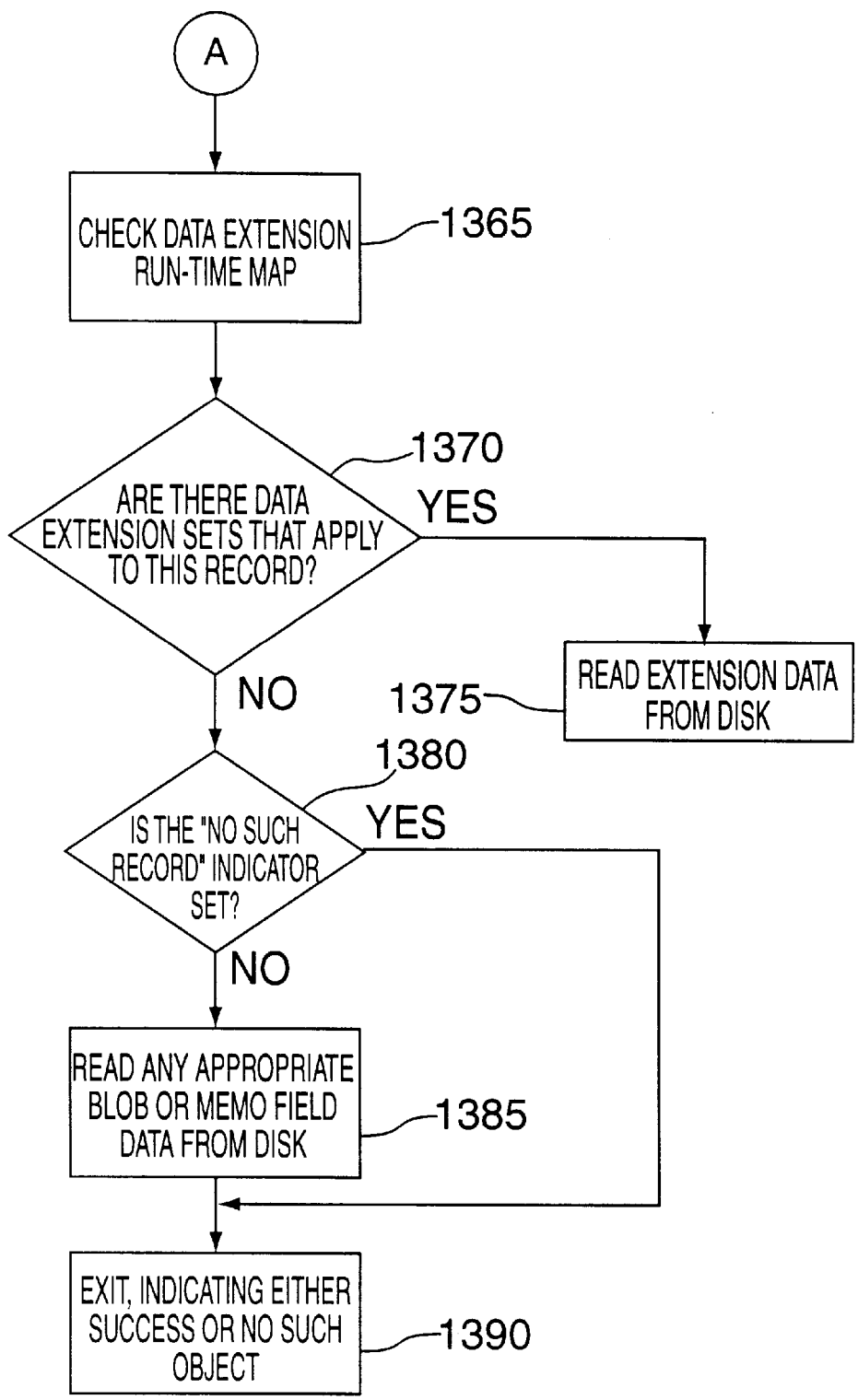
FIG. 18B shows a second portion of a flowchart describing the steps involved in the "EXTRACT" function of the database access tool.
Figure 19:
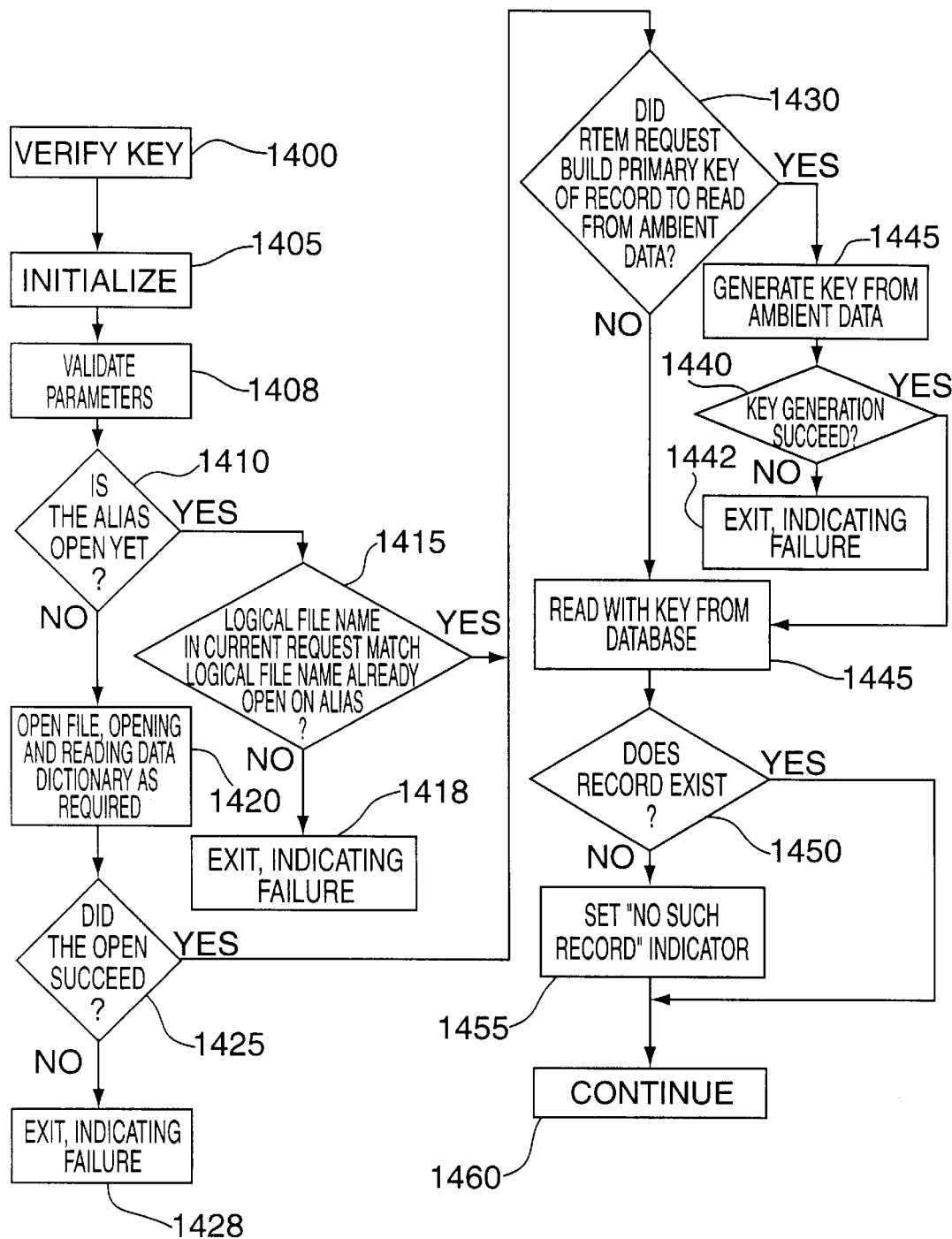
FIG. 19 shows a flowchart describing the steps involved in the "VERIFY" function of the database access tool.
Figure 20:
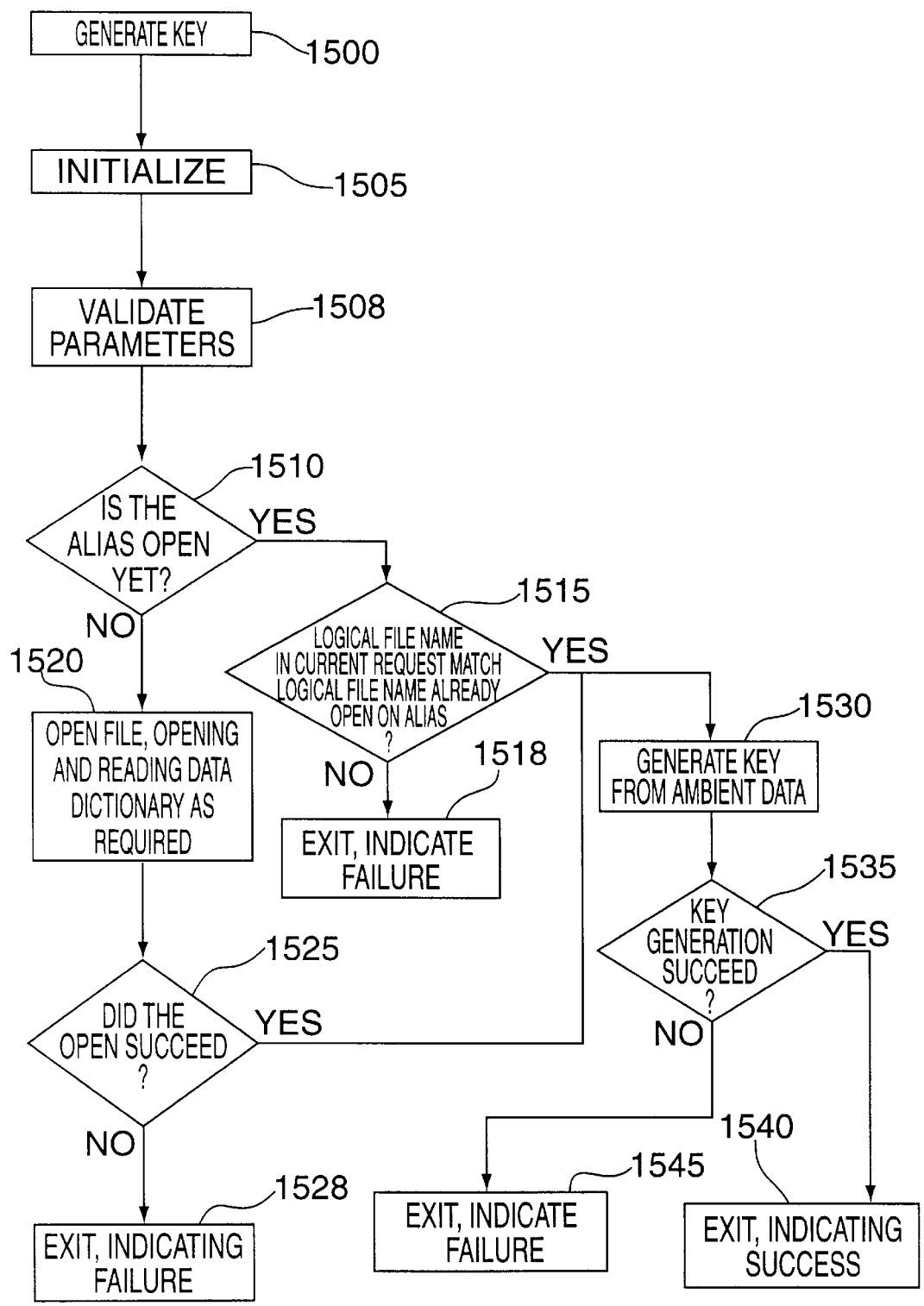
FIG. 20 shows a flowchart describing the steps involved in the "GENERATE" function of the database access tool.
Figure 21A:
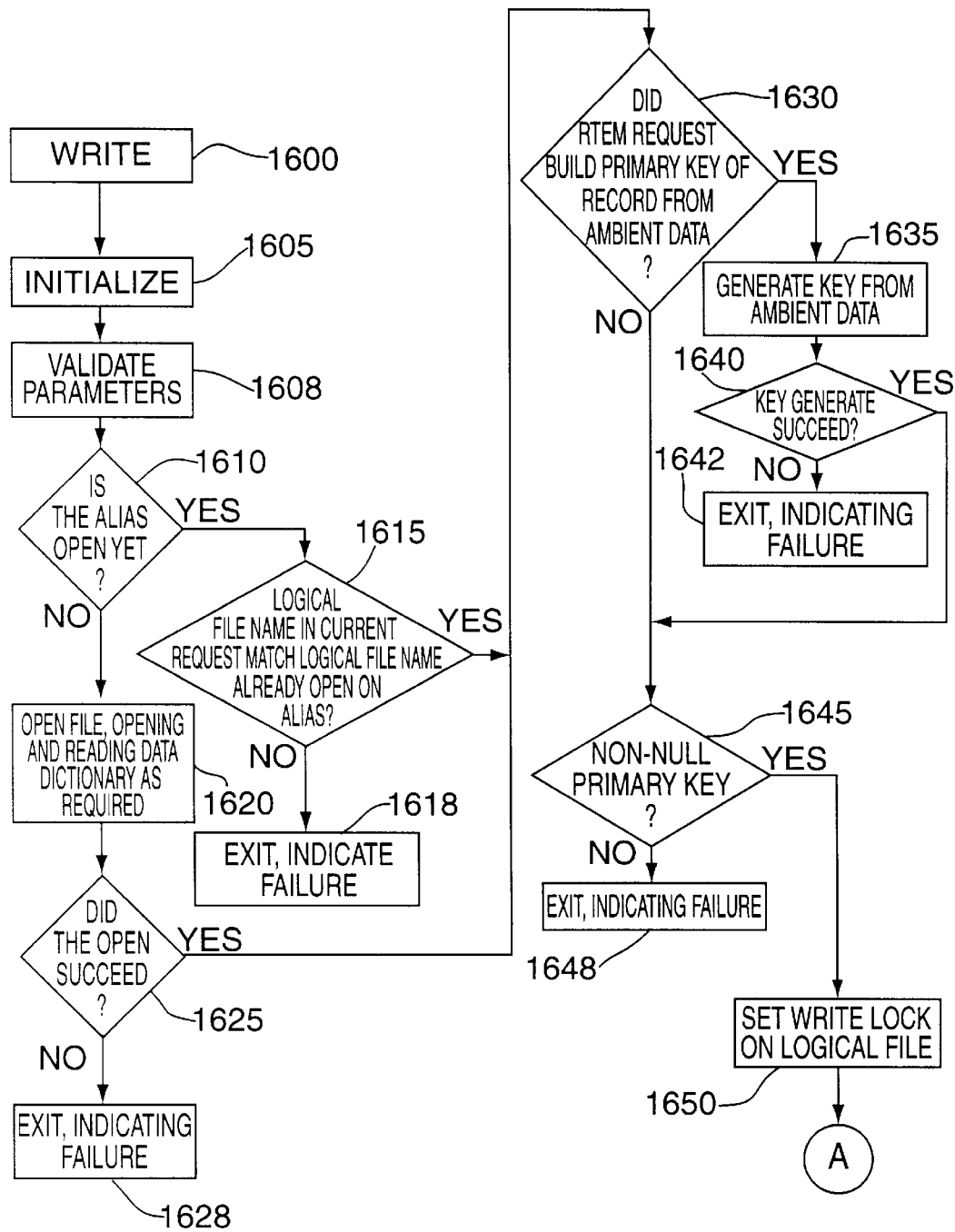
FIG. 21A shows a first portion of a flowchart describing the steps involved in the "WRITE" function of the database access tool.
Figure 21B:
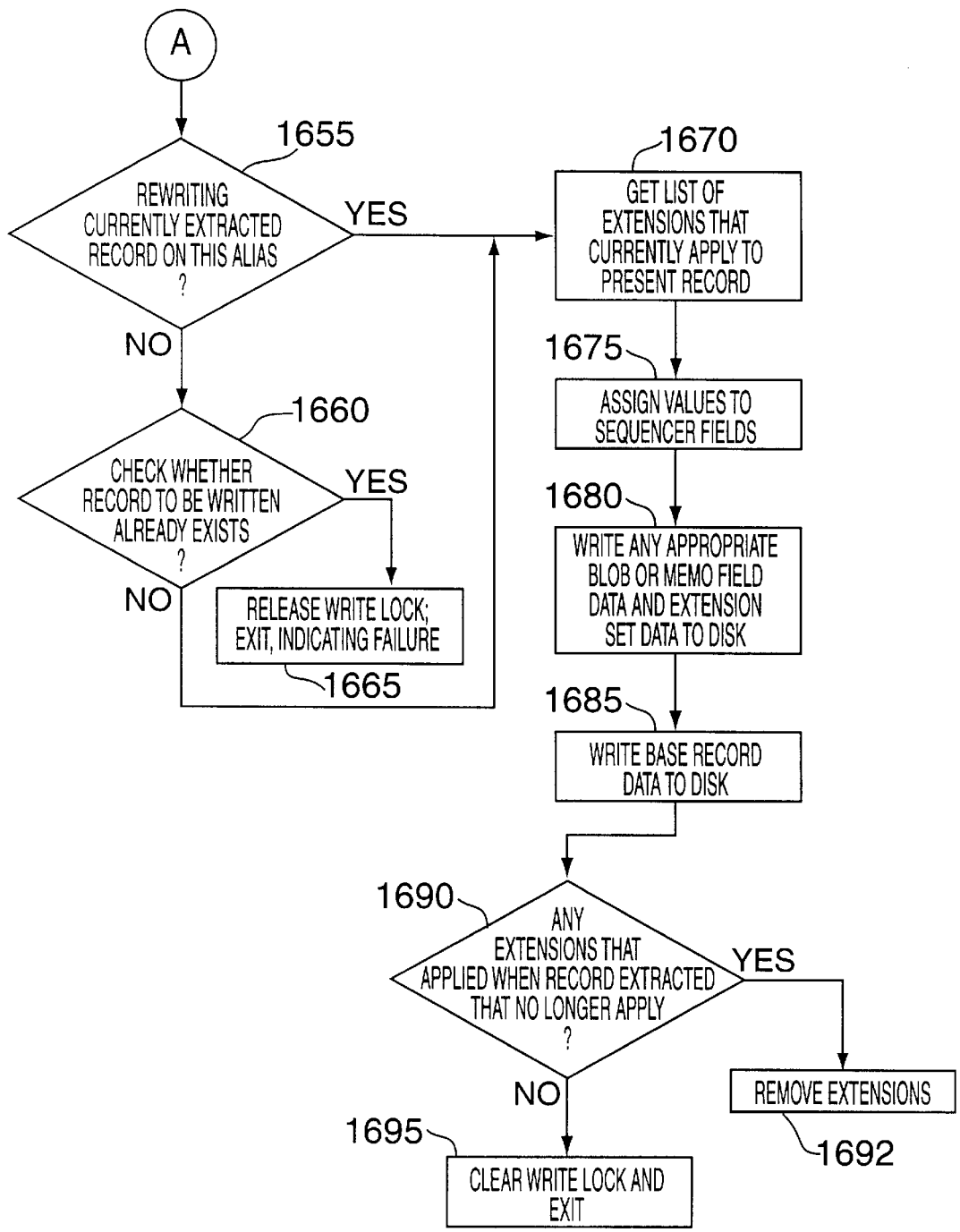
FIG. 21B shows a second portion of a flowchart describing the steps involved in the "WRITE" function of the database access tool.
Figure 22:
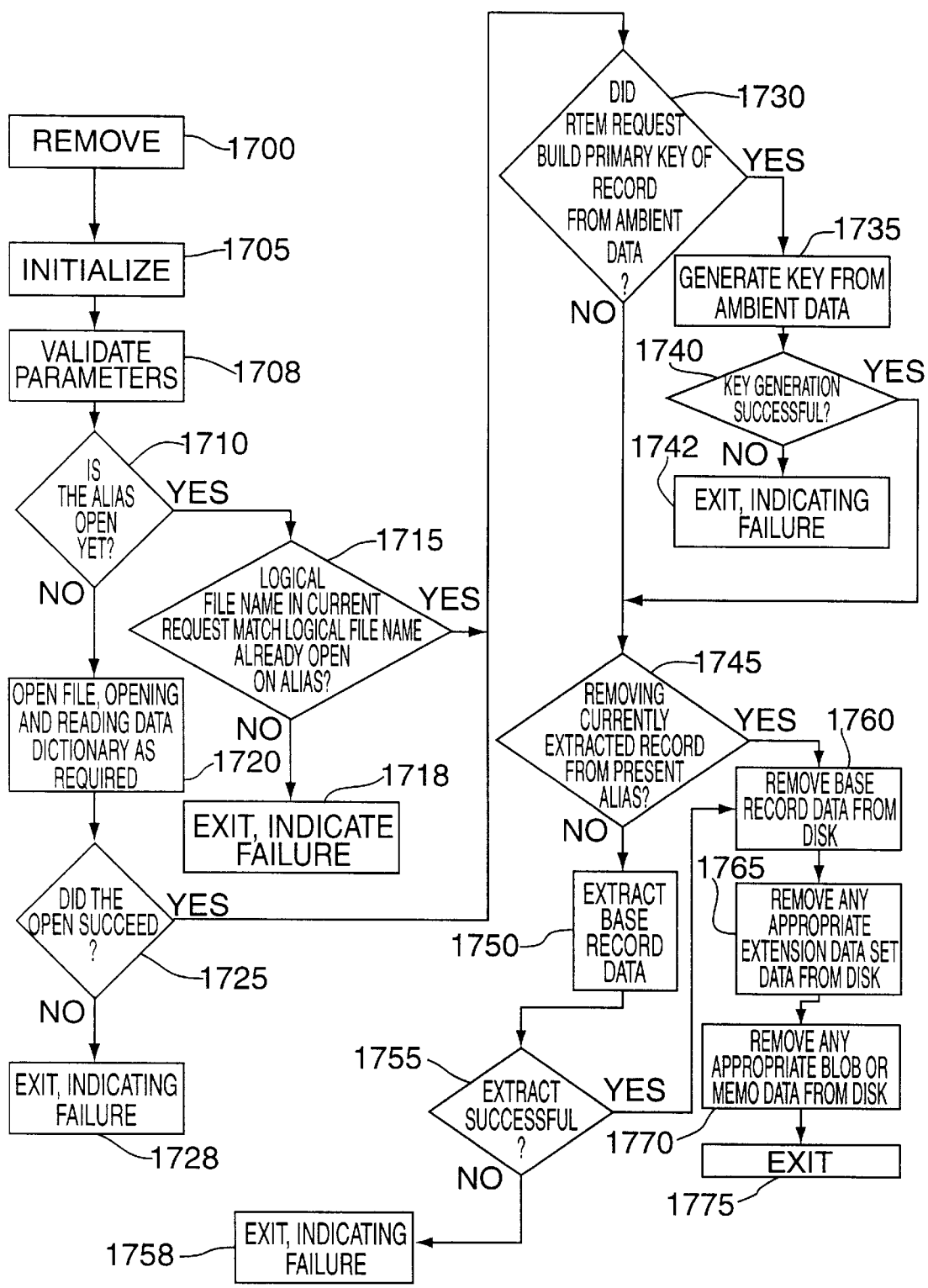
FIG. 22 shows a flowchart describing the steps involved in the "REMOVE" function of the database access tool.
Figure 23:
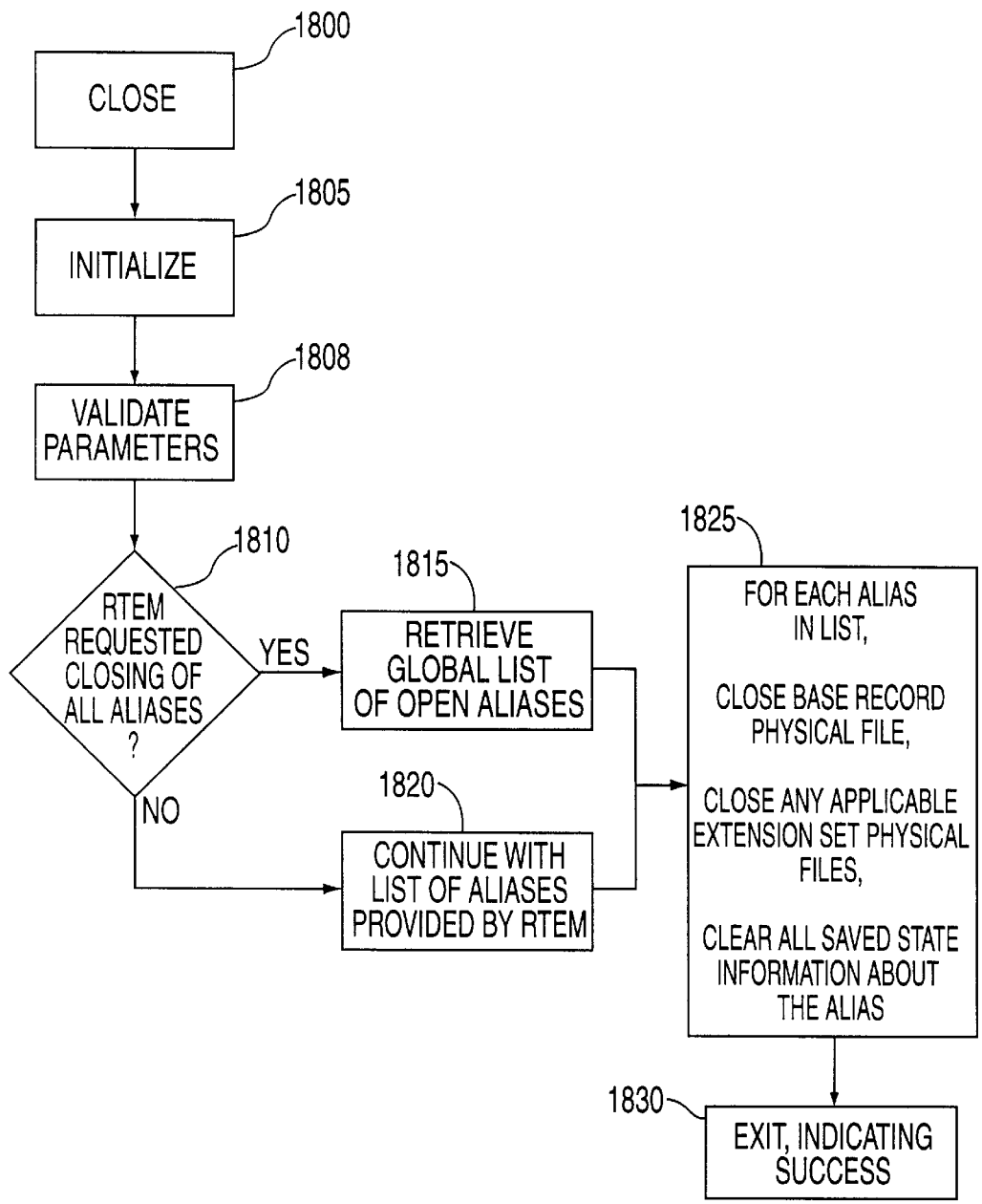
FIG. 23 shows a flowchart describing the steps involved in the "CLOSE" function of the database access tool.
Figure 24:
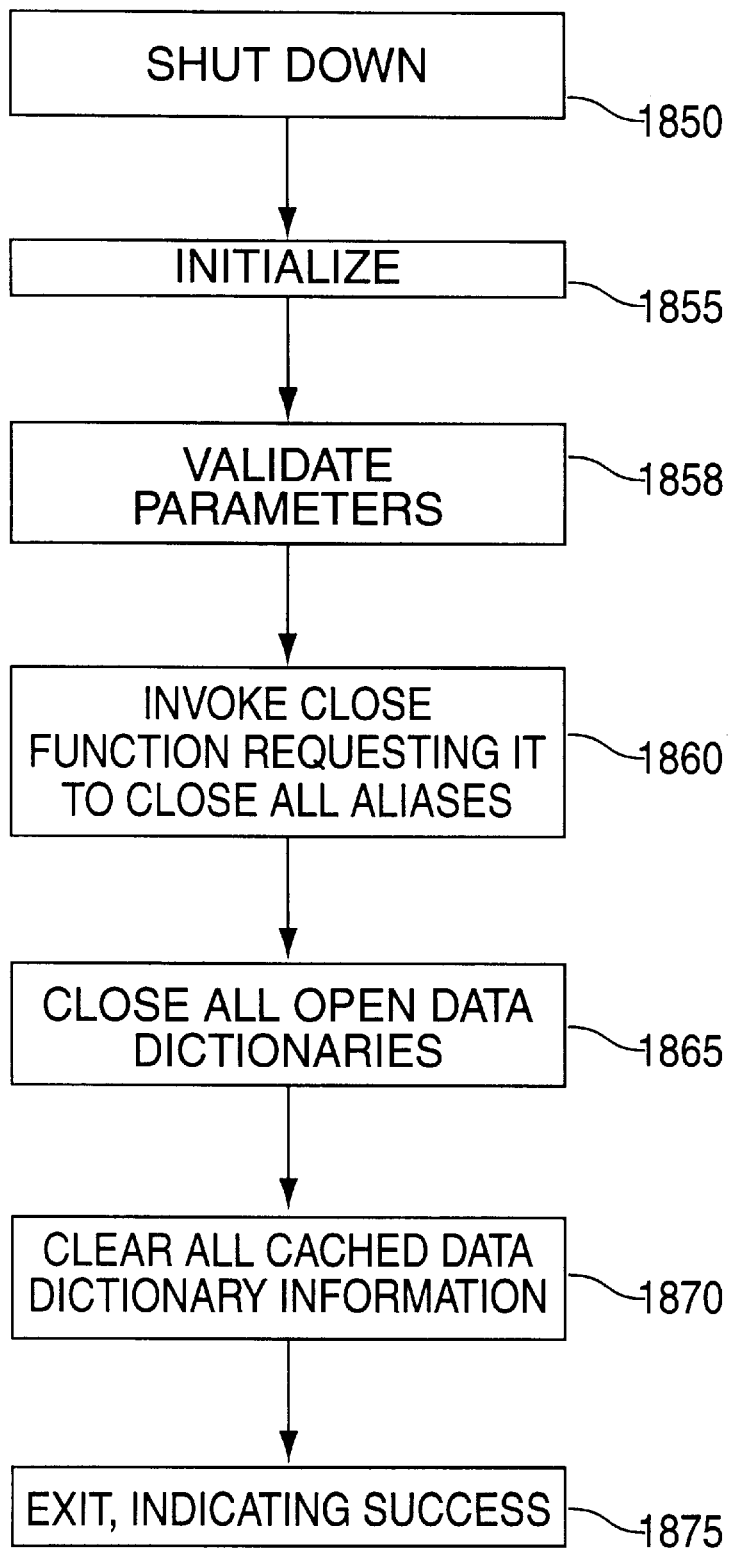
FIG. 24 shows a flowchart describing the steps involved in the "SHUT DOWN" function of the database access tool.
Figure 25:
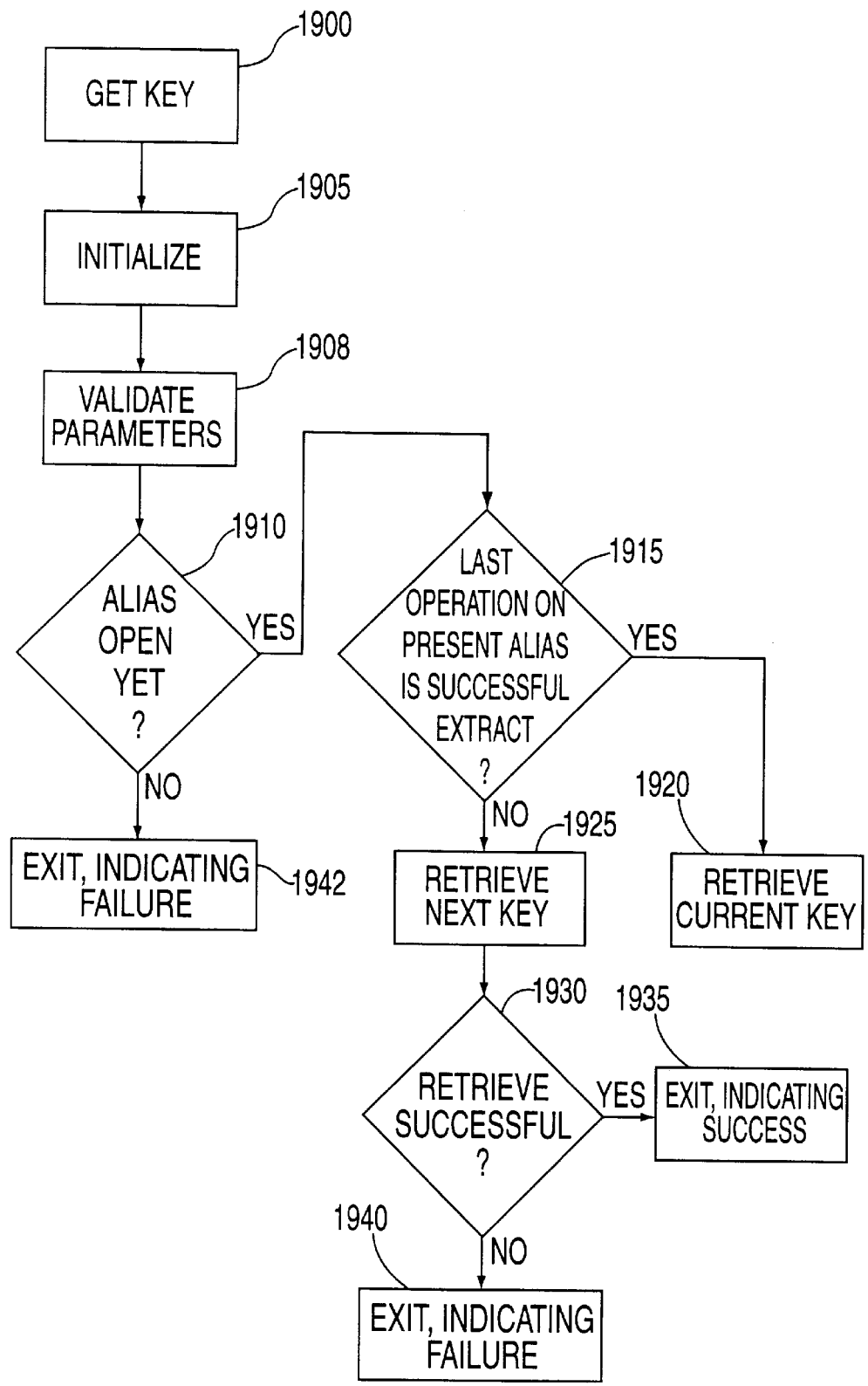
FIG. 25 shows a flowchart describing the steps involved in the "GET KEY" function of the database access tool.
Figure 26:
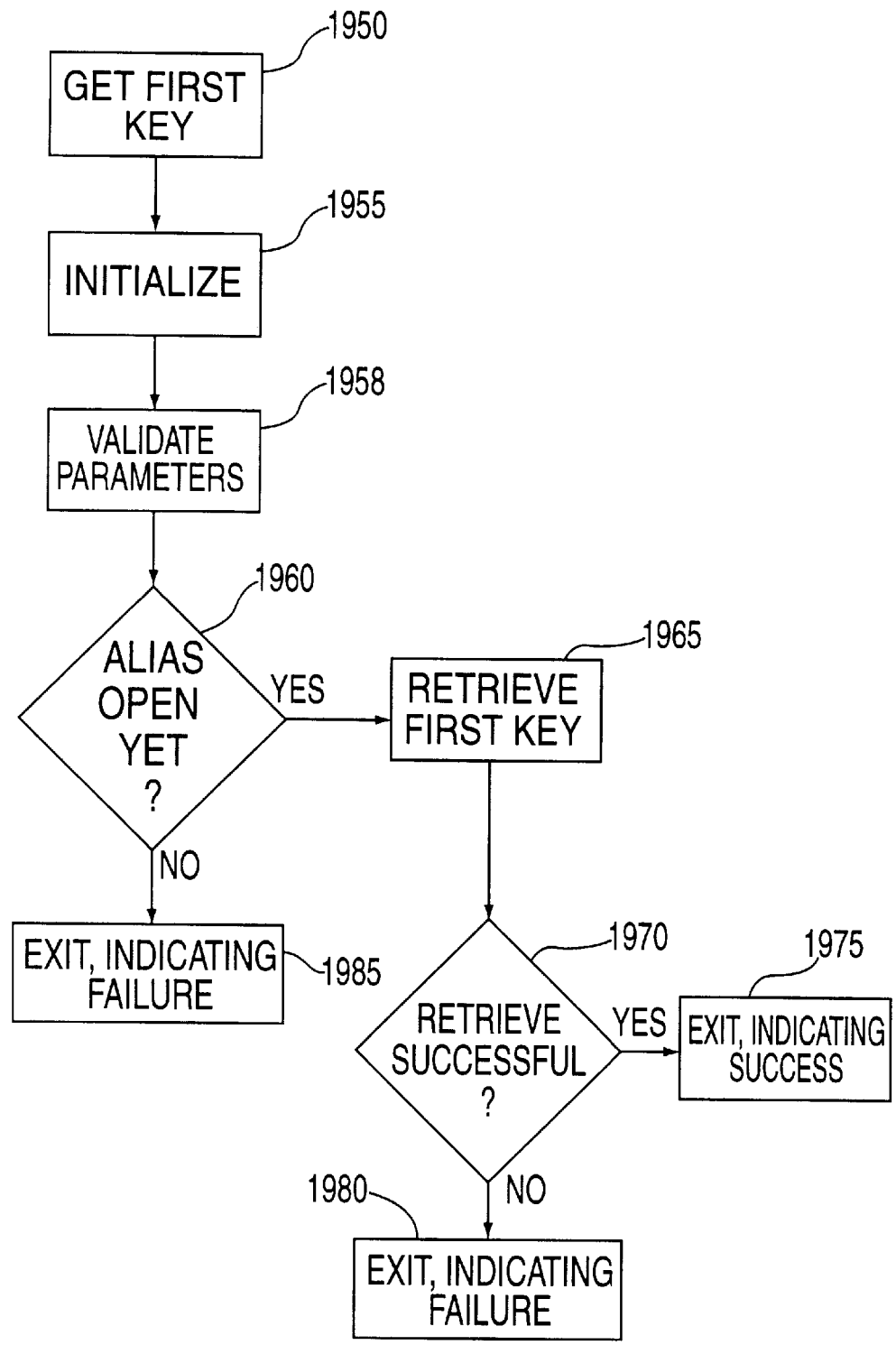
FIG. 26 shows a flowchart describing the steps involved in the "GET FIRST KEY" function of the database access tool.

FUNCTION: READ The READ 1200 begins by initializing and validating parameters 1205, 1208. The READ then queries whether the alias is open yet 1210. If the alias is open, the READ queries whether the logical file name in the current request to READ matches the logical file name already open on the alias 1215. If so, the READ continues; otherwise, the READ exits, indicating failure 1218. If the alias were found not open yet, the READ opens the file and opens and reads the data dictionary 12 as required 1220. If the open succeeded 1225, the READ continues; otherwise it exits, indicating failure 1228. If the RTEM 10 is asked to build the primary key of the record to read from the ambient data 1230, then a key is generated from ambient data 1235 and, if the key generation succeeds 1240, the READ continues. If the key generation did not succeed, the READ exits, indicating failure 1242. If earlier, the RTEM 10 was found not to have sought to build the primary key of the record and to read it from the ambient data 1230, then the READ simply continues. Unless it previously exited, the READ then reads base record information from disk 1245. If the record exists 1250, the READ continues; otherwise it sets a "no such record" indicator 1255 and continues. If the read failed for reasons other than "no such record" 1260, then the READ exits, indicating failure 1262. If the read did not fail, it continues. A data variation run-time map is checked 1265 and, if there exist data variation sets which apply to the record 1270, then the variation data is read from the disk 1275. If no such data variation sets exist, then the READ continues. If the "no such record" indicator has been set 1280, then the READ continues; however, if not, then the READ reads any appropriate binary large object ("BLOB") or Memory field data from disk 1285. When this process is complete, READ exits 1290, indicating either success, or "no such record." FIGS. 17A and 17B show, in diagram form, the steps described above.

FUNCTION: EXTRACT The EXTRACT 1300 begins by initializing and validating parameters 1305, 1308. The EXTRACT then queries whether the alias is open yet 1310. If the alias is open, the EXTRACT queries whether the logical file name in the current request to EXTRACT matches the logical file name already open on the alias 1315. If so, the EXTRACT continues; otherwise, the EXTRACT exits 1318, indicating failure. If the alias were found not open yet, the EXTRACT opens the file and opens and reads the data dictionary 12 as required 1320. If the open succeeded, the EXTRACT continues; otherwise it exits 1328, indicating failure. If the RTEM 10 is asked to build the primary key of the record to read from the ambient data 1330, then a key is generated from ambient data 1335 and, if the key generation succeeds 1340, the EXTRACT continues. If the key generation did not succeed, then the EXTRACT exits, indicating failure 1342. If earlier, the RTEM 10 was found not to have sought to build the primary key of the record and to read it from the ambient data 1330, then the EXTRACT simply continues. Unless it previously exited, the EXTRACT then reads base record information from disk 1345. If the record exists 1350, the EXTRACT continues; otherwise it sets a "no such record" indicator 1355 and continues. If the read failed for reasons other than "no such record" 1360, then the EXTRACT exits, indicating failure 1362. If the read did not fail, it continues. A data variation run-time map is checked 1365 and, if there exist data variation sets which apply to the record 1370, then the variation data is read from the disk 1375. If no such data variation sets exist, then the EXTRACT continues. If the "no such record" indicator has been set 1380, then the EXTRACT continues; however, if not, then the EXTRACT reads any appropriate binary large object ("BLOB") or Memory field data from disk 1385. When this process is complete, EXTRACT exits 1390, indicating either success, or "no such record." The difference between an EXTRACT operation and a READ operation is that the EXTRACT locks the data for WRITE purposes. In a multi-user application, the same data could be requested by multiple operations at the same time. To prevent corruption of the database, any data that is to be updated gets EXTRACTED (Locked) first. If the data is already EXTRACTED (Locked) when an EXTRACT request occurs, DBAC 24, 30 will wait for the data to be unlocked before continuing processing. This is done by attempting the EXTRACT request again after 1 second. A message is displayed to the operator warning of this situation. The operator can then request an abort of the EXTRACT request, which sends a special result code back to RTEM 10.

FUNCTION: VERIFY KEY The VERIFY KEY 1400 begins by initializing and validating parameters 1405, 1408. The VERIFY KEY then queries whether the alias is open yet 1410. If the alias is open, the VERIFY KEY queries whether the logical file name in the current request to VERIFY KEY matches the logical file name already open on the alias 1415. If so, the VERIFY KEY continues; otherwise, the VERIFY KEY exits 1418, indicating failure. If the alias were found not open yet, the VERIFY KEY opens the file and opens and reads the data dictionary 12 as required 1420. If the open succeeded 1425, the VERIFY KEY continues; otherwise it exits 1428, indicating failure. If the RTEM 10 is asked to build the primary key of the record to read from the ambient data 1430, then a key is generated from ambient data 1435 and, if the key generation succeeds 1440, the VERIFY KEY continues. If the key generation did not succeed, then the VERIFY KEY exits 1442, indicating failure. If earlier, the RTEM 10 was found not to have sought to build the primary key of the record and to read it from the ambient data, then the VERIFY KEY simply continues. Unless it previously exited, the VERIFY KEY then reads with this key from the database 1445. If the record exists 1450, the VERIFY KEY continues; otherwise it sets a "no such record" indicator and continues 1460.

FUNCTION: GENERATE KEY The GENERATE KEY 1500 begins by initializing and validating parameters 1505, 1508. The GENERATE KEY then queries whether the alias is open yet 1510. If the alias is open, the GENERATE KEY queries whether the logical file name in the current request to GENERATE KEY matches the logical file name already open on the alias 1515. If so, the GENERATE KEY continues; otherwise, the GENERATE KEY exits 1518, indicating failure. If the alias were found not open yet, the GENERATE KEY opens the file and opens and reads the data dictionary 12 as required 1520. If the open succeeded 1525, the VERIFY KEY continues; otherwise it exits, indicating failure 1528. The GENERATE KEY then generates a key from ambient data 1530. If the key generation succeeds 1535, then the function exits 1540, indicating success. If, on the other hand, the key generation fails, the function exits 1545, indicating failure.

FUNCTION: WRITE The WRITE function 1600 begins by initializing and validating parameters 1605, 1608. The WRITE function then queries whether the alias is open yet 1610. If the alias is open, the WRITE function queries whether the logical file name in the current request to WRITE function matches the logical file name already open on the alias 1615. If so, the WRITE function continues; otherwise, the WRITE function exits, indicating failure 1618. If the alias were found not open yet, the WRITE function opens the file and opens and reads the data dictionary 12 as required 1620. If the open succeeded 1625, the WRITE function continues; otherwise it exits 1628, indicating failure. If the RTEM 10 requested that the primary key of the record be built from ambient data 1630, the WRITE function attempts to do so 1635. If the key generation succeeds 1640, then the WRITE function continues; otherwise, it exits, indicating failure 1642. If, however, the RTEM 10 did not request that the primary key of the record be built from ambient data, the WRITE function continues. If there is a non-null primary key 1645, the WRITE function continues; otherwise it exits 1648, indicating failure. Assuming the WRITE function continues, it sets a write lock on a logical file 1650. Then, if it is re-writing the currently extracted record on this alias 1655, the WRITE function continues. If not, a check is made whether the record to be written already exists 1660. If the record exists, the WRITE function releases write lock and exits indicating failure 1665. If the record does not exist, the WRITE function continues. Assuming the WRITE function continues, it gets a list of extensions that currently apply to the present record 1670. It assigns values to sequencer fields 1675. It writes any appropriate BLOB or Memo field data and any appropriate extension set data to disk 1680. The WRITE function also writes the base record data to disk 1685. Then, it checks whether there are extensions that applied when the record was extracted, but that no longer apply 1690. If so, the WRITE function removes them 1692; otherwise it continue by clearing write lock and exiting 1695.

FUNCTION: REMOVE The REMOVE function 1700 begins by initializing and validating parameters 1705, 1708. The REMOVE function then queries whether the alias is open yet 1710. If the alias is open, the REMOVE function queries whether the logical file name in the current request to REMOVE function matches the logical file name already open on the alias 1715. If so, the REMOVE function continues; otherwise, the REMOVE function exits 1718, indicating failure. If the alias were found not open yet, the REMOVE function opens the file and opens and reads the data dictionary 12 as required 1720. If the open succeeded 1725, the REMOVE function continues; otherwise it exits, indicating failure 1728. If the RTEM 10 requested that the primary key of the record be built from ambient data 1730, the REMOVE function attempts to do so 1735. If the key generation succeeds 1740, then the REMOVE function continues; otherwise, it exits 1742, indicating failure. If, however, the RTEM 10 did not request that the primary key of the record be built from ambient data, the REMOVE function continues. Assuming the REMOVE function continues, it checks whether it is removing the currently extracted record from the present alias 1745. If so, the REMOVE function continues; if not, however, the REMOVE function extracts the base record data 1750. If the extract succeeded 1755, then the REMOVE function continues. If not, it exits, indicating failure 1758. Assuming the REMOVE function continues, it removes the base record data from disk 1760, removes any appropriate extension data set data from disk 1765 and removes any appropriate BLOB or Memo data from disk 1770, and then exits 1775.

FUNCTION: CLOSE The CLOSE function 1800, after initializing and validating parameters 1805, 1808, queries whether the RTEM 10 requested closing of all aliases 1810. If so, the CLOSE function retrieves a global list of open aliases 1815, otherwise it continues 1820 with a list of aliases provided by RTEM 10. For each alias in the list obtained in the previous step, CLOSE function closes the base record physical file, closes any applicable extension set physical files, clears all saved state information about this alias 1825 and exits 1830, indicating success.

FUNCTION: SHUT DOWN After initializing and validating parameters 1855, 1858, the SHUTDOWN function 1850 invokes the CLOSE function 1800 and requests it to close ALL aliases 1860. The SHUTDOWN function then closes all open data dictionaries 1865 and clears all cached data dictionary information 1870 and exits 1875, indicating success.

FUNCTION: GET KEY The GET KEY function 1900 initializes, validates parameters 1905, 1908 and queries whether the alias is open yet 1910. If so, the GET KEY function queries whether the last operation on the present alias is a successful EXTRACT 1915. If so, then GET KEY retrieves a current key 1920. If not, then GET KEY retrieves the next key 1925. If the attempt to retrieve the next key succeeds 1930, then GET KEY exits 1935, indicating success; otherwise, or if the last operation on this alias was not a successful extract, GET KEY exits 1940, 1942, indicating failure.

FUNCTION: GET FIRST KEY The GET FIRST KEY function 1950, after initializing and validating parameters 1955, 1958, queries whether the alias is yet open 1960. If so, GET FIRST KEY retrieves the first key 1965. If the retrieval of the first key succeeds 1970, then GET FIRST KEY exits 1975, indicating success; otherwise it exits 1980, indicating failure. If the alias was found not to be open yet, GET FIRST KEY exits 1985, indicating failure.

Several other functions, specifically GET PREVIOUS KEY, GET CURRENT KEY, GET NEXT KEY, GET LAST KEY, function nearly identically to the GET FIRST KEY function, but differ in the key that they return.

One advantage of the present invention is its ability to work with existing Legacy Code. "Legacy" is application software existing prior to the teachings of the present invention and which must be adapted in order to run in the RTEM/Model environment alongside the Models specifically developed using the present invention.

In order to adapt legacy software, the code is converted to be accessible to the DBAC 24, 30. To implement an initial conversion from legacy software to hybrid-legacy software (legacy software with calls to Models and Methods compatible with RTEM 10), all database accesses are changed to links to DBAC 24, 30. Validation checking is replaced by calls to "pre-write file-element validation" based upon pre-compiled data banks for Dictionary Segments of Data Dictionary 12. Writing to a file is accomplished by a single DBAC 24, 30 access using a list of files compiled by validity test routines. All presentation input and output is converted to use the UIO 26. The code is also converted to use the Data Dictionary 12. File usage information (i.e., files that are written, read from, extracted or deleted) is placed in the Data Dictionary 12. Variables in the legacy code are renamed to character identifications used in the Data Dictionary 12, for example, 32-bit identifications. References to where (e.g., program/line) and how (e.g., evaluated, printed (maskvalue), concatenated, transferred, dimmed, input, updated). During the legacy conversion process, only error correction changes are permitted to be made to the legacy software; no new logic is permitted to be added.

A Legacy Engine (Library) is created to file Logic Objects usable by the RTEM 10. "Transitional Objects," which are created during the transition from legacy software to software compatible with the approach implemented by RTEM 10, may be coupled to the legacy code to create "hybrid-legacy programs." The coupling is effected through the use of "Gates." As described above, Gates are placed into the legacy code in gaps between statements in the code, as described above in connection with the legacy conversion process. Given that no new logic may be added to legacy code, in accordance with an embodiment of the present invention, changes to the code that would involve new logic must be invoked by inserting a Gate that will enable or disable such new logic. The new logic is itself embodied in Models and/or Methods. An example of a conditional Gate to logic formatted for use with RTEM 10:

nnnnn DPCU-123456; Perform

"Get_list_of_active_Gates";

IF ACTIVE_GATES>0 THEN Perform "Gate_Control"

The call to "Get_list_of_active_gates" will build a list of all gates (or "gate-controlled" logic) that is valid for the current user; this evaluation will include all public as well as test objects that this user is registered to use. When the logic modification is acceptable for production, the object is simply made public; no changes to the applications are required.

The foregoing approach permits on-going analysis and "repair" of hybrid-legacy software. For example, with this approach, the following changes may be made to hybrid legacy software:

modifications to the Data Dictionary 12 to implement fixes;

variable Masking Lists can be created;

Year 2000 date conversion may be accomplished;

time units may be modified;

old Masks may be replaced;

potential overprints (e.g., on modified reports) may be addressed.

In addition, the following Hybrid-Legacy modifications can be made:

1. input fields and their associated logic can be added, bypassed or defaulted either through the use of Gates or by other means;
2. new fields may be added to existing File Records:
   a. using the Elastic Database capability (described in connection with the function of the DBAC 24, 30);
   b. fields in existing file records may be removed;
   for example, fields that are obsolete should be defaulted to a value by the DBAC 24, 30, and not removed immediately but rather at a later time using the Elastic Database capability;
3. new file reads, writes, extracts, and other operations may be added, even during testing, wherein conditional invocations are used (a new file is defined as a new object); and
4. Legacy logic may be cut out, invalidated or bypassed and branched past using normal condition testing logic.

The foregoing sets forth an embodiment of the method, system, and data structures for software application development that illustrates the principles of the present invention. Additional aspects, features and advantages of the invention will be apparent to those skilled in the art.

What is claimed is:

1. A computer-implemented system for running applications software, the system having a processor, a memory, and a storage medium, the system comprising:

a plurality of Models stored in the storage medium, the Models each containing data including references to one or more Objects; and a Run Time Events Manager adapted for loading into memory from the storage medium a selected one of the plurality of Models, reading the data of the selected Model, and when a reference to an Object is read, invoking and executing the Object, wherein the Models are part of a set of Models created according to a registration process wherein a Model is registered only if the Model does not contain a reference to a Method that can invoke another Method, and wherein the Run Time Events Manager can access only Models that have been registered according to the registration process.

2. A computer-implemented method for operating a database system comprising the steps of:

a. loading a Base Record having one or more fields from a Base File;

b. checking a Variation Set run-time map for the presence of a Variation Set corresponding to the Base File; and c. if a Variation Set is present, retrieving data from the Variation Set.

3. The computer-implemented method for operating a database system of claim 2, wherein the step of retrieving data from the Variation Set further comprises the steps of:

checking whether conditions for the Variation Set exist; and if the conditions for the retrieved Variation Set exist and are met, retrieving the data from the Variation Set which applies to the Base Record.

4. The computer-implemented system of claim 1, in which the Models comprise:

a. a first type of Model that forms a Paradigm; and b. a second type of Model that is a Variant of the Paradigm model.

5. The computer-implemented system of claim 4, in which Variant Models have one or more associated conditions that must be satisfied for the Variant Model to be processed by the Run Time Events Manager.

6. The computer-implemented system of claim 5, in which the Run Time Events Manager is further adapted for:

a. checking, when a paradigm Model has been invoked, the presence of a Variant model for that paradigm Model;

b. if a variant Model is present, retrieving that Model;

c. checking whether the conditions for the retrieved Variant Model exist; and d. if the conditions for the retrieved Variant Model exist, processing the Variant Model.

7. The computer-implemented system of claim 6, in which the Run Time Events Manager is adapted for repeating steps b–d until no further Variant Models associated with a paradigm Model, and for which Variant Models the associated conditions exist.

8. The computer-implemented system of claim 1, in which the Run Time Events Manager is adapted for processing actions external to the Models after processing each Object in a Model.

9. A computer-implemented database system, the system having a processor, a memory, and a storage medium, the system comprising:

a Base File stored in the storage medium, the Base File containing a plurality of base records, each Base Record having one or more fields;

at least one Variation Set stored in the storage medium corresponding to the Base File; and the system programmed to implement a Variation Set run-time map adapted for determining which Variation Set applies to a particular Base Record.

10. The computer-implemented database system of claim 9, in which the Variation Set has one or more associated conditions that must be satisfied for the Variation Set to apply to a particular Base Record.

11. The computer-implemented database system of claim 10, in which the Variation Set run-time map includes a Condition Field List, a Condition Group List, and a Variation Group List.

* * * * *

UNITED STATES PATENT AND TRADEMARK OFFICE
CERTIFICATE OF CORRECTION

PATENT NO. : 6,125,442
DATED : September 26, 2000
INVENTOR(S) : Maves et al.

It is certified that error appears in the above-identified patent and that said Letters Patent is hereby corrected as shown below:

Title page,
Insert Item -- [60] Related U.S. Application Data,
Provisional application no. 60/032,833, filed on Dec. 13, 1996. --.

Signed and Sealed this

Thirtieth Day of August, 2005

JON W. DUDAS
*Director of the United States Patent and Trademark Office*